United States Patent
Yakumaru et al.

(10) Patent No.: US 11,332,836 B2
(45) Date of Patent: May 17, 2022

(54) HYDROGEN SYSTEM

(71) Applicant: Panasonic Intellectual Property Management Co., Ltd., Osaka (JP)

(72) Inventors: Yuuichi Yakumaru, Nara (JP); Hiroaki Fujii, Nara (JP); Atsushi Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 516 days.

(21) Appl. No.: 16/270,715

(22) Filed: Feb. 8, 2019

(65) Prior Publication Data

US 2019/0271090 A1 Sep. 5, 2019

(30) Foreign Application Priority Data

Mar. 1, 2018 (JP) .............................. JP2018-036641
May 31, 2018 (JP) .............................. JP2018-105238
Jun. 21, 2018 (JP) .............................. JP2018-117788

(51) Int. Cl.
*C25B 15/02* (2021.01)
*C25B 1/04* (2021.01)
(Continued)

(52) U.S. Cl.
CPC ............ *C25B 15/02* (2013.01); *C01B 3/0005* (2013.01); *C01B 3/02* (2013.01); *C01B 3/34* (2013.01);
(Continued)

(58) Field of Classification Search
CPC ......... C25B 1/04; C25B 15/02; C01B 3/0005; C01B 3/02; C01B 3/34; C01B 2203/0227; Y02E 60/32; Y02E 60/36
See application file for complete search history.

(56) References Cited

U.S. PATENT DOCUMENTS 7,275,569 B2    10/2007   Hobbs
2010/0219066 A1*  9/2010  Takeuchi .................. C25B 1/04
                                                          204/242

(Continued)

FOREIGN PATENT DOCUMENTS

JP      2003-047175         2/2003
JP      2005-324584         11/2005
(Continued)

OTHER PUBLICATIONS

The Extended European Search Report dated Jul. 18, 2019 for the related European Patent Application No. 19158030.7.

*Primary Examiner* — Ciel P Contreras
(74) *Attorney, Agent, or Firm* — McDermott Will & Emery LLP

(57) ABSTRACT

A hydrogen system including: a hydrogen production apparatus that produces hydrogen; a hydrogen storage apparatus that stores produced hydrogen; a first flow path, wherein hydrogen discharged from the hydrogen production apparatus flows into the hydrogen storage apparatus through the first flow path; a second flow path, wherein hydrogen discharged from the hydrogen storage apparatus flows into a hydrogen-using apparatus through the second flow path; a casing that houses the hydrogen production apparatus, the hydrogen storage apparatus, the first flow path and at least part of the second flow path; a third flow path, wherein hydrogen discharged from at least one of the hydrogen production apparatus, the hydrogen storage apparatus, the first flow path and the at least part of the second flow path flows outside the casing through the third flow path; a first valve provided in the third flow path; and a controller that opens the first valve.

32 Claims, 29 Drawing Sheets

(51) Int. Cl.
C01B 3/02 (2006.01)
C01B 3/00 (2006.01)
C01B 3/34 (2006.01)

(52) U.S. Cl.
CPC ........ C25B 1/04 (2013.01); *C01B 2203/0227* (2013.01)

(56) References Cited

U.S. PATENT DOCUMENTS

2012/0255868 A1* 10/2012 Takeuchi .................. C25B 9/05
   205/628
2016/0068976 A1   3/2016 Yoshida et al.
2016/0377342 A1* 12/2016 Mermelstein ............. C25B 1/04
   62/617

FOREIGN PATENT DOCUMENTS

| JP | 2016-056397 | 4/2016 |
| JP | 2016-094948 | 5/2016 |

* cited by examiner

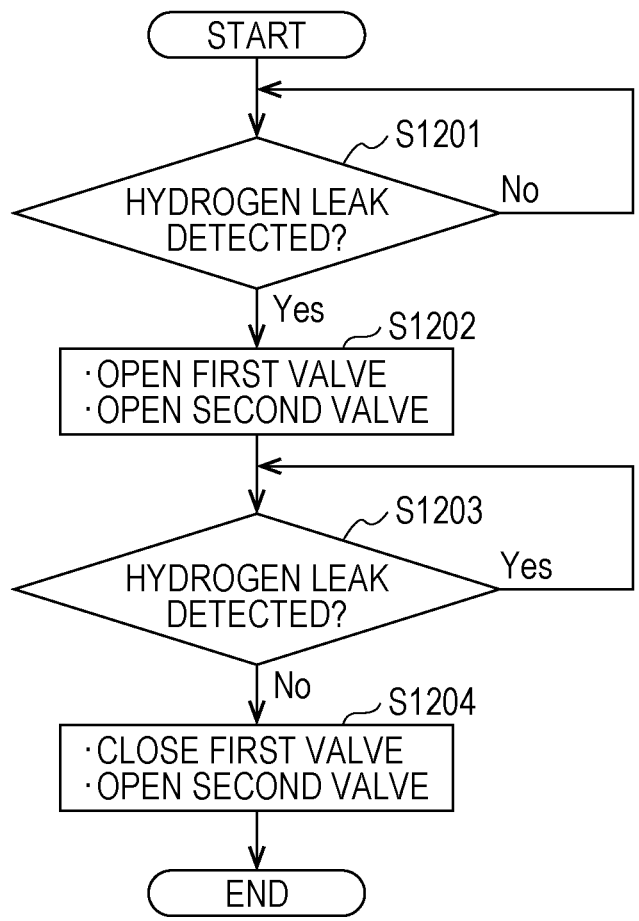

HYDROGEN SYSTEM

BACKGROUND

1. Technical Field

The present disclosure relates to a hydrogen system.

2. Description of the Related Art

In recent years, due to environmental problems such as global warming and energy problems such as the depletion of petroleum resources, hydrogen energy has been attracting attention as a clean alternative energy source for replacing fossil fuels. Only water is emitted when hydrogen is combusted, and carbon dioxide, nitrogen oxides, and the like that are causes for global warming are not discharged, and therefore there is expectation for hydrogen as clean energy.

In this regard, fuel cells for automobile power sources, fuel cells for private household power generation, and the like are being commercialized as apparatuses that use hydrogen as a fuel (hereinafter, hydrogen-using apparatuses).

So, in the coming hydrogen society, when hydrogen is to be supplied to hydrogen-using apparatuses, it will be necessary for the production of hydrogen and the storage of hydrogen to be carried out in a highly efficient manner.

Thus, such hydrogen systems including both a hydrogen production apparatus and a hydrogen storage apparatus have been proposed (for example, see Japanese Unexamined Patent Application Publication Nos. 2016-56397, 2005-324584, and 2003-47175).

In the hydrogen system of Japanese Unexamined Patent Application Publication No. 2016-56397, a hydrogen production apparatus (water electrolysis apparatus) and a hydrogen storage apparatus (storage tank) are respectively housed in two chambers partitioned by an inner wall inside a casing, and hydrogen leak countermeasure apparatuses such as a hydrogen sensor and a ventilator are provided in each of the chambers. An appropriate countermeasure can thereby be taken if a hydrogen leak occurs in the chambers.

In the hydrogen systems of Japanese Unexamined Patent Application Publication Nos. 2005-324584 and 2003-47175, both a hydrogen production apparatus and a hydrogen storage apparatus are housed inside a casing without being partitioned by an inner wall.

Furthermore, hydrogen has a wide combustion range compared to fossil fuels such as methane, and therefore it is necessary for care to be taken when handling hydrogen so that the hydrogen does not ignite due to an abnormality of a hydrogen storage tank.

For example, in the hydrogen storage system of Japanese Unexamined Patent Application Publication No. 2016-94948, it is proposed to open an opening/closing section that ventilates between the inside and outside of a hydrogen storage tank when the vibration, heat, temperature, or strain of the outer shell of the hydrogen storage tank has fallen outside a predetermined range. Thus, by emitting hydrogen inside the hydrogen storage tank to outside, it is possible to reduce the risk of hydrogen ignition caused by an abnormality of some kind in the outer shell of the hydrogen storage tank.

SUMMARY

The present disclosure addresses the problem of being able to discharge hydrogen from inside an apparatus to outside a casing in an appropriate manner compared to a conventional hydrogen system. For example, one non-limiting and exemplary embodiment provides a hydrogen system that is capable of responding to a hydrogen leak inside a casing in an appropriate manner compared to a conventional hydrogen system. Furthermore, for example, one non-limiting and exemplary embodiment provides a hydrogen system with which apparatus size and cost can be reduced compared to a conventional hydrogen system.

In one general aspect, the techniques disclosed here feature a hydrogen system that includes: a hydrogen production apparatus that produces hydrogen; a hydrogen storage apparatus that stores hydrogen produced by the hydrogen production apparatus; a first flow path, wherein hydrogen that is discharged from the hydrogen production apparatus flows into the hydrogen storage apparatus through the first flow path; a second flow path, wherein hydrogen that is discharged from the hydrogen storage apparatus flows into a hydrogen-using apparatus through the second flow path; a casing that houses the hydrogen production apparatus, the hydrogen storage apparatus, the first flow path and at least part of the second flow path; a third flow path, wherein hydrogen that is discharged from at least one of the hydrogen production apparatus, the hydrogen storage apparatus, the first flow path and the at least part of the second flow path flows outside the casing through the third flow path; a first valve that is provided in the third flow path; and a controller that opens the first valve.

A hydrogen system of an aspect of the present disclosure demonstrates the effect that hydrogen can be discharged from inside an apparatus to outside a casing in an appropriate manner compared to a conventional hydrogen system. For example, a hydrogen system of an aspect of the present disclosure demonstrates the effect of being able to respond to a hydrogen leak inside a casing in an appropriate manner compared to a conventional hydrogen system. Furthermore, for example, a hydrogen system of an aspect of the present disclosure demonstrates the effect of it being possible for apparatus size and cost to be reduced compared to a conventional hydrogen system.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 12B is a flowchart depicting an example of the operation of a hydrogen system of a working example of the tenth embodiment;

DETAILED DESCRIPTION

Figure 1:
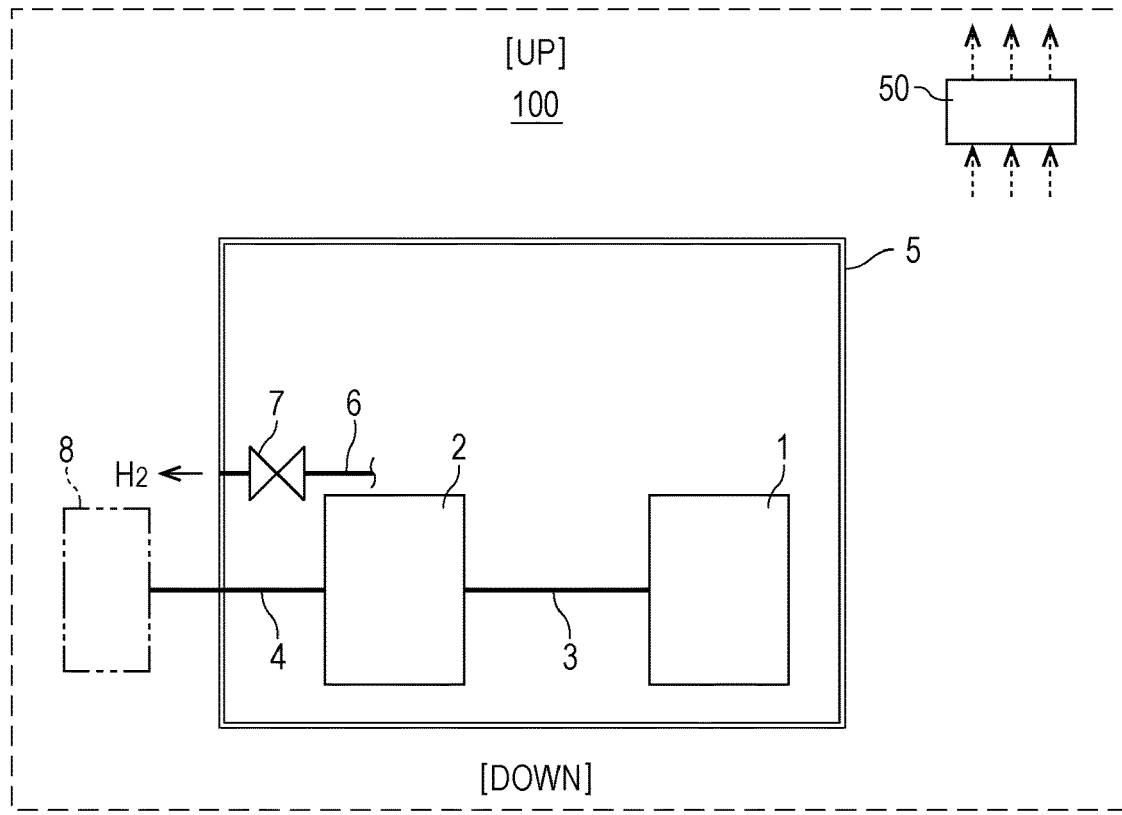
FIG. 1 is a drawing depicting an example of a hydrogen system of a first embodiment.

In the hydrogen system of Japanese Unexamined Patent Application Publication No. 2016-56397, as mentioned above, hydrogen leak countermeasure apparatuses are provided in each of two chambers partitioned by an inner wall inside a casing. Therefore, the configuration of the hydrogen system tends to become complex, and reductions in the size and cost of the hydrogen system are not always achieved to a sufficient degree. Meanwhile, in the hydrogen systems of Japanese Unexamined Patent Application Publication Nos. 2005-324584 and 2003-47175, consideration is not given to responding to a hydrogen leak inside a casing.

Thus, the inventors carried out a diligent investigation into a total hydrogen system with which an appropriate response to a hydrogen leak inside a casing can be implemented and apparatus size and cost can be reduced, and arrived at an aspect of the present disclosure described hereinafter.

In other words, a hydrogen system of a first aspect of the present disclosure includes: a hydrogen production apparatus that produces hydrogen; a hydrogen storage apparatus that stores hydrogen produced by the hydrogen production apparatus; a first flow path, wherein hydrogen that is discharged from the hydrogen production apparatus flows into the hydrogen storage apparatus through the first flow path; a second flow path, wherein hydrogen that is discharged from the hydrogen storage apparatus flows into a hydrogen-using apparatus through the second flow path; a casing that houses the hydrogen production apparatus, the hydrogen storage apparatus, the first flow path and at least part of the second flow path; a third flow path, wherein hydrogen that is discharged from at least one of the hydrogen production apparatus, the hydrogen storage apparatus, the first flow path and the at least part of the second flow path flows outside the casing through the third flow path; a first valve that is provided in the third flow path; and a controller that opens the first valve.

According to this configuration, in the hydrogen system of the present aspect, hydrogen can be discharged from inside an apparatus to outside the casing in an appropriate manner compared to a conventional hydrogen system. For example, in the hydrogen system of the present aspect, it is possible to respond to a hydrogen leak inside a casing in an appropriate manner compared to a conventional hydrogen system. Furthermore, for example, in the hydrogen system of the present aspect, it is possible for apparatus size and cost to be reduced compared to a conventional hydrogen system.

Specifically, in the hydrogen system of the present aspect, as an example, an inner wall (partition wall) for partitioning the space in which the hydrogen production apparatus and the hydrogen storage apparatus are present is not provided in the casing, and the hydrogen production apparatus, the hydrogen storage apparatus, the first flow path, and at least part of the second flow path are provided inside the one casing. Thus, in the hydrogen system of the present aspect, it is possible to reduce apparatus size and cost compared to a case where the casing is configured so as to partition the space in which the hydrogen production apparatus and the hydrogen storage apparatus are present.

Furthermore, in the hydrogen system of the present aspect, as an example, in a case where a hydrogen leak has occurred inside the casing due to a cause of some kind from at least one of the hydrogen production apparatus, the hydrogen storage apparatus, at least part of the second flow path, and the first flow path, by merely opening the first valve, the hydrogen present in at least one of the hydrogen production apparatus, the hydrogen storage apparatus, at least part of the second flow path, and the first flow path can be discharged outside the casing via the third flow path.

For a hydrogen system of a second aspect of the present disclosure, in the hydrogen system of the first aspect, there may be included a detector that detects a hydrogen leak inside the casing, and the controller, if a hydrogen leak is detected by the detector, may open the first valve.

According to this configuration, in the hydrogen system of the present aspect, hydrogen present in at least one of the hydrogen production apparatus, the hydrogen storage apparatus, at least part of the second flow path, and the first flow path can be discharged outside the casing via the third flow path at the timing of an appropriate time when a hydrogen leak is detected by the detector.

Furthermore, when a hydrogen leak has occurred inside the casing, the first valve provided in the third flow path can be opened based on the one detector inside the casing. Thus, in the hydrogen system of the present aspect, it is possible to reduce apparatus size and cost compared to a configuration in which a detector is provided in each of two chambers inside a casing in which the hydrogen production apparatus and the hydrogen storage apparatus are respectively housed, for example.

For a hydrogen system of a third aspect of the present disclosure, in the hydrogen system of the first aspect, there may be included a detector that detects a hydrogen leak inside the casing, and a ventilator that ventilates inside the casing, and the controller, if a hydrogen leak is detected by the detector, may stop the operation of the hydrogen production apparatus and activate the ventilator, and thereafter, if a hydrogen leak is detected by the detector, may open the first valve.

That is, in the hydrogen system of the present aspect, after the operation of the hydrogen production apparatus has been stopped and the ventilator has been activated, if a hydrogen leak has been detected by the detector, the first valve is opened and the ventilator is also activated. However, after the operation of the hydrogen production apparatus has been stopped and the ventilator has been activated, if a hydrogen leak is no longer detected by the detector, the operation of the ventilator is stopped. Thus, in the hydrogen system of the present aspect, when a hydrogen leak has been detected by the detector, there is a possibility that the amount of hydrogen to be discharged outside the casing can be reduced compared to a case where the first valve is opened without confirming whether or not a hydrogen leak is no longer detected by the detector due to the operation of the ventilator.

For a hydrogen system of a fourth aspect of the present disclosure, in the hydrogen system of any one aspect of the first to third aspects, the third flow path may branch from the first flow path.

According to this configuration, in the hydrogen system of the present aspect, the third flow path branches from the first flow path passing through the hydrogen production apparatus and the hydrogen storage apparatus, and therefore a setting can be implemented so that hydrogen is selectively discharged outside the casing from either one or both of the hydrogen production apparatus and the hydrogen storage apparatus.

For a hydrogen system of a fifth aspect of the present disclosure, in the hydrogen system of the fourth aspect, there may be included a second valve provided in the first flow path downstream from a branching location to the third flow path.

According to this configuration, in the hydrogen system of the present aspect, by controlling the opening and closing of the second valve when the first valve is open, hydrogen can be selectively discharged outside the casing from either one of the hydrogen production apparatus and the hydrogen storage apparatus.

For a hydrogen system of a sixth aspect of the present disclosure, in the hydrogen system of the fourth aspect, a first coupling and a second coupling may be provided in the first flow path, and the third flow path may branch from the first flow path between the first coupling and the second coupling.

According to this configuration, in the hydrogen system of the present aspect, the third flow path can be provided in a simple manner in terms of the configuration if provided between the first coupling and the second coupling, that is, between couplings.

For a hydrogen system of a seventh aspect of the present disclosure, in the hydrogen system of the fifth aspect, there may be included a detector that detects a hydrogen leak inside the casing, and the controller, if a hydrogen leak is detected by the detector, may stop the operation of the hydrogen production apparatus and open the first valve, and thereafter, if a hydrogen leak is detected by the detector, may open the second valve.

That is, in the hydrogen system of the present aspect, if a hydrogen leak is detected by the detector also after the operation of the hydrogen production apparatus has been stopped and hydrogen has been discharged outside the casing from the hydrogen production apparatus, the second valve is opened and hydrogen is discharged outside the casing from the hydrogen storage apparatus. Thus, in the hydrogen system of the present aspect, when a hydrogen leak has been detected by the detector, there is a possibility that the amount of hydrogen to be discharged outside the casing can be reduced compared to a hydrogen system not provided with the second valve.

For a hydrogen system of an eighth aspect of the present disclosure, in the hydrogen system of any one aspect of the first to seventh aspects, the third flow path may be connected to an upper section of the casing.

According to this configuration, in the hydrogen system of the present aspect, by connecting the third flow path at an upper section of the casing, it is possible to reduce problems when hydrogen is discharged outside the casing from the third flow path, compared to a case where the third flow path is connected at a lower section of the casing. For example, it is possible to reduce the possibility of hydrogen that has been discharged outside the casing coming into contact with an ignition source that is present outside the casing. This is because hydrogen discharged outside the casing diffuses upward, and therefore, if the third flow path is connected at the upper section of the casing, the possibility of coming into contact with an ignition source in the periphery of the lower section of the casing decreases.

For a hydrogen system of a ninth aspect of the present disclosure, in the hydrogen system of the eighth aspect, the third flow path may be connected to an upper surface of the casing.

According to this configuration, in the hydrogen system of the present aspect, it is possible to reduce problems when hydrogen is discharged outside the casing from the third flow path, compared to a case where the third flow path is connected to a side surface of the casing. For example, the possibility of hydrogen discharged outside the casing from the third flow path coming into contact with an ignition source can be reduced even in a case where an ignition source is present in the periphery of a side surface of the casing, for example. Furthermore, the third flow path can be formed using a straight pipe that extends in the vertical direction, and therefore hydrogen, which is lighter than air, can be smoothly discharged outside the casing.

For a hydrogen system of a tenth aspect of the present disclosure, in the hydrogen system of any one aspect of the second, third, and seventh aspects, the detector may be provided on an upper surface of the casing.

According to this configuration, in the hydrogen system of the present aspect, by providing the detector on the upper surface of the casing, hydrogen, which is lighter than air, can be detected effectively compared to a case where a detector is not provided in such a location.

A diligent investigation was carried out into discharging hydrogen in an appropriate manner outside the casing from inside an apparatus such as the hydrogen production apparatus and the hydrogen storage apparatus, and the following findings were obtained.

For example, in Japanese Unexamined Patent Application Publication No. 2016-56397, in a case where there is a hydrogen leak inside each chamber, a fan is activated and hydrogen inside the casing is thereby discharged outside the casing. Generally, when a hydrogen leak has occurred inside a casing, time is required for a fan to be activated and the hydrogen concentration inside the casing to be reduced to less than the combustible range. Consequently, time is required for a worker to undertake recovery work when a hydrogen leak has occurred inside a casing. Furthermore, for example, in Japanese Unexamined Patent Application Publication Nos. 2016-56397, 2005-324584, 2003-47175, and 2016-94948, there is no description regarding the role of a booster for pressurizing hydrogen when performing the discharge of hydrogen from inside an apparatus to outside a casing that accompanies maintenance or the like.

Thus, for a hydrogen system of an eleventh aspect of the present disclosure, in the hydrogen system of any one aspect of the first to tenth aspects, there may be included a booster with which hydrogen produced by the hydrogen production apparatus is pressurized and supplied to the hydrogen storage apparatus, and the third flow path may branch from the first flow path downstream from the booster.

According to this configuration, in the hydrogen system of the present aspect, hydrogen can be discharged from inside an apparatus to outside the casing in an appropriate manner compared to a conventional hydrogen system. For example, by setting the open state of the first valve and the operating state of the booster as appropriate, it becomes possible for hydrogen inside the hydrogen production apparatus and inside the hydrogen storage apparatus to be discharged outside the casing at an appropriate time via the third flow path.

For a hydrogen system of a twelfth aspect of the present disclosure, in the hydrogen system of any one aspect of the first to eleventh aspects, there may be included a third valve that is provided in the first flow path upstream from a branching location to the third flow path.

According to this configuration, in the hydrogen system of the present aspect, hydrogen can be discharged from inside an apparatus to outside the casing in an appropriate manner compared to a conventional hydrogen system. For example, by setting the open/closed states of the first valve and the third valve as appropriate, it becomes possible for hydrogen inside the hydrogen production apparatus and inside the hydrogen storage apparatus to be discharged outside the casing at an appropriate time via the third flow path.

For a hydrogen system of a thirteenth aspect of the present disclosure, in the hydrogen system of the fifth aspect or the seventh aspect, the controller may open the first valve and the second valve.

According to this configuration, in the hydrogen system of the present aspect, by opening the first valve and the second valve, hydrogen can be discharged outside the casing from inside the hydrogen production apparatus and inside the hydrogen storage apparatus in an appropriate manner compared to a conventional hydrogen system.

For a hydrogen system of a fourteenth aspect of the present disclosure, in the hydrogen system of the thirteenth aspect, there may be included a detector that detects a hydrogen leak inside the casing, and the controller, if a hydrogen leak is detected inside the casing, may open the first valve and the second valve.

According to this configuration, in the hydrogen system of the present aspect, when a hydrogen leak has occurred inside the casing, hydrogen is discharged directly outside the casing from the third flow path, and therefore a hydrogen leak state can be promptly eliminated. Thus, the possibility of hydrogen igniting can be reduced.

For a hydrogen system of a fifteenth aspect of the present disclosure, in the hydrogen system of the fifth aspect, the controller may close the second valve together with opening the first valve.

According to this configuration, in the hydrogen system of the present aspect, by opening the first valve, hydrogen can be discharged outside the casing from inside the hydrogen production apparatus in an appropriate manner compared to a conventional hydrogen system. It should be noted that, at such time, communication between inside the hydrogen storage apparatus and outside the casing is blocked by the second valve, and therefore the hydrogen inside the hydrogen storage apparatus is not discharged outside the casing via the third flow path.

For a hydrogen system of a sixteenth aspect of the present disclosure, in the hydrogen system of the fifteenth aspect, there may be included a detector that detects a hydrogen leak inside the casing, and the controller, if a hydrogen leak is detected inside the casing, may close the second valve together with opening the first valve.

According to this configuration, in the hydrogen system of the present aspect, if a hydrogen leak occurs inside the casing, communication between inside the hydrogen storage apparatus and outside the casing is blocked by the second valve, and therefore the hydrogen inside the hydrogen storage apparatus is not discharged outside the casing via the third flow path. That is, in the hydrogen system of the present aspect, in recovery work carried out by a worker when a hydrogen leak has occurred inside the casing from a region other than the hydrogen storage apparatus, the hydrogen inside the hydrogen storage apparatus can be preserved.

For a hydrogen system of a seventeenth aspect of the present disclosure, in the hydrogen system of the twelfth aspect, the controller may open the first valve, a second valve that is provided in the first flow path downstream from a branching location to the third flow path, and the third valve.

According to this configuration, in the hydrogen system of the present aspect, by opening the first valve, the second valve, and the third valve, hydrogen can be discharged outside the casing from inside the hydrogen production apparatus and inside the hydrogen storage apparatus in an appropriate manner compared to a conventional hydrogen system.

For a hydrogen system of an eighteenth aspect of the present disclosure, in the hydrogen system of the seventeenth aspect, there may be included a detector that detects a hydrogen leak inside the casing, and the controller, if a hydrogen leak is detected inside the casing, may open the first valve, the second valve, and the third valve.

According to this configuration, in the hydrogen system of the present aspect, when a hydrogen leak has occurred inside the casing, hydrogen is discharged directly outside the casing from the third flow path, and therefore a hydrogen leak state can be promptly eliminated. Thus, the possibility of hydrogen igniting can be reduced.

For a hydrogen system of a nineteenth aspect of the present disclosure, in the hydrogen system of the twelfth aspect, the controller may close the third valve together with opening the first valve and a second valve that is provided in the first flow path downstream from a branching location to the third flow path.

According to this configuration, in the hydrogen system of the present aspect, by opening the first valve and the second valve, hydrogen can be discharged outside the casing from inside the hydrogen storage apparatus in an appropriate manner compared to a conventional hydrogen system. It should be noted that, at such time, communication between inside the hydrogen production apparatus and outside the casing is blocked by the third valve, and therefore the hydrogen inside the hydrogen production apparatus is not discharged outside the casing via the third flow path.

For a hydrogen system of a twentieth aspect of the present disclosure, in the hydrogen system of the nineteenth aspect, there may be included a detector that detects a hydrogen leak inside the casing, and the controller, if a hydrogen leak is detected inside the casing, may close the third valve together with opening the second valve.

According to this configuration, in the hydrogen system of the present aspect, if a hydrogen leak occurs inside the casing, communication between inside the hydrogen production apparatus and outside the casing is blocked by the third valve, and therefore the hydrogen inside the hydrogen production apparatus is not discharged outside the casing via the third flow path. That is, in the hydrogen system of the present aspect, in recovery work carried out by a worker when a hydrogen leak has occurred inside the casing from a region other than the hydrogen production apparatus, the hydrogen inside the hydrogen production apparatus can be preserved.

For a hydrogen system of a twenty first aspect of the present disclosure, in the hydrogen system of the twelfth aspect, the controller may close a second valve that is provided in the first flow path downstream from a branching location to the third flow path, together with opening the first valve and the third valve.

According to this configuration, in the hydrogen system of the present aspect, by opening the first valve and the third valve, hydrogen can be discharged outside the casing from inside the hydrogen production apparatus in an appropriate manner compared to a conventional hydrogen system. It should be noted that, at such time, communication between inside the hydrogen storage apparatus and outside the casing is blocked by the second valve, and therefore the hydrogen inside the hydrogen storage apparatus is not discharged outside the casing via the third flow path.

For a hydrogen system of a twenty second aspect of the present disclosure, in the hydrogen system of the twenty first aspect, there may be included a detector that detects a hydrogen leak inside the casing, and the controller, if a hydrogen leak is detected inside the casing, may close the second valve together with opening the first valve and the third valve.

According to this configuration, in the hydrogen system of the present aspect, if a hydrogen leak occurs inside the casing, communication between inside the hydrogen storage apparatus and outside the casing is blocked by the second valve, and therefore the hydrogen inside the hydrogen storage apparatus is not discharged outside the casing via the third flow path. That is, in the hydrogen system of the present aspect, in recovery work carried out by a worker when a hydrogen leak has occurred inside the casing from a region other than the hydrogen storage apparatus, the hydrogen inside the hydrogen storage apparatus can be preserved.

For a hydrogen system of a twenty third aspect of the present disclosure, in the hydrogen system of the eleventh aspect, the controller may activate the booster when the first valve is open.

According to this configuration, in the hydrogen system of the present aspect, for example, when the first valve is opened, hydrogen inside the hydrogen production apparatus can be discharged outside the casing via the third flow path in an appropriate manner by means of the pressurizing operation of the booster. Thus, a worker is able to carry out maintenance work or the like for the hydrogen production apparatus quickly and easily.

For a hydrogen system of a twenty fourth aspect of the present disclosure, in the hydrogen system of the eleventh aspect, the controller may activate the booster when the first valve and a second valve that is provided in the first flow path downstream from a branching location to the third flow path are open.

According to this configuration, in the hydrogen system of the present aspect, for example, when the first valve and the second valve are opened, hydrogen inside the hydrogen storage apparatus can be discharged outside the casing via the third flow path in an appropriate manner by means of the pressurizing operation of the booster. Thus, a worker is able to carry out maintenance work or the like for the hydrogen storage apparatus quickly and easily.

For a hydrogen system of a twenty fifth aspect of the present disclosure, in the hydrogen system of the eleventh aspect, the controller may activate the booster when the first valve is open and a second valve that is provided in the first flow path downstream from a branching location to the third flow path is closed.

According to this configuration, in the hydrogen system of the present aspect, for example, when the first valve is opened due to maintenance of the hydrogen production apparatus or the like, hydrogen inside the hydrogen production apparatus can be discharged outside the casing via the third flow path in an appropriate manner by means of the pressurizing operation of the booster. Furthermore, when the first valve is opened, in a case where maintenance of the hydrogen storage apparatus is not necessary, communication between inside the hydrogen storage apparatus and outside the casing is blocked by the second valve, and therefore the hydrogen inside the hydrogen storage apparatus can be preserved.

For a hydrogen system of a twenty sixth aspect of the present disclosure, in the hydrogen system of the eleventh aspect, the controller may activate the booster when the first valve, a second valve that is provided in the first flow path downstream from a branching location to the third flow path, and a third valve that is provided in the first flow path upstream from the branching location to the third flow path are open.

According to this configuration, in the hydrogen system of the present aspect, for example, when the first valve, the second valve, and the third valve are opened, hydrogen inside the hydrogen production apparatus can be discharged outside the casing via the third flow path in an appropriate manner by means of the pressurizing operation of the booster. Thus, a worker is able to carry out maintenance work or the like for the hydrogen production apparatus quickly and easily.

For a hydrogen system of a twenty seventh aspect of the present disclosure, in the hydrogen system of the eleventh aspect, the controller may not activate the booster when a third valve that is provided in the first flow path upstream from a branching location to the third flow path is closed together with the first valve and a second valve that is provided in the first flow path downstream from the branching location to the third flow path being open.

According to this configuration, in the hydrogen system of the present aspect, when the third valve is closed due to maintenance of the hydrogen storage apparatus or the like, the possibility of the booster provided between the hydrogen production apparatus and the third valve being damaged can be reduced by not activating the booster. Furthermore, it is possible to reduce the power required for the operation of the booster.

For a hydrogen system of a twenty eighth aspect of the present disclosure, in the hydrogen system of the eleventh aspect, the booster may be activated when a second valve that is provided in the first flow path downstream from a branching location to the third flow path is closed together with the first valve and a third valve that is provided in the first flow path upstream from the branching location to the third flow path being open.

According to this configuration, in the hydrogen system of the present aspect, for example, when the first valve and the third valve are opened due to maintenance of the hydrogen production apparatus or the like, hydrogen inside the hydrogen production apparatus can be discharged outside the casing via the third flow path in an appropriate manner by means of the pressurizing operation of the booster. Furthermore, when the first valve and the third valve are opened, in a case where maintenance of the hydrogen storage apparatus is not necessary, communication between inside the hydrogen storage apparatus and outside the casing is blocked by the second valve, and therefore the hydrogen inside the hydrogen storage apparatus can be preserved.

A diligent investigation was carried out into the discharge of hydrogen that accompanies the maintenance of a hydrogen system, and the following findings were obtained. For example, there are cases where maintenance of the hydrogen storage apparatus is not necessary when maintenance of the hydrogen production apparatus of the hydrogen system is to be carried out, and therefore, if hydrogen inside the hydrogen storage apparatus of the hydrogen system is discharged outside, there is a possibility of there being a loss due to discharging the hydrogen inside the hydrogen storage apparatus.

Thus, for a hydrogen system of a twenty ninth aspect of the present disclosure, in the hydrogen system of the fifth aspect, there is included a receiver that receives a signal from outside, and the controller, based on input received by the receiver, executes either of a first mode in which the first valve and the second valve are opened, and a second mode in which the second valve is closed and the first valve is opened.

According to this configuration, in the hydrogen system of the present aspect, the discharge of hydrogen that accompanies maintenance can be carried out in a more appropriate manner than with a conventional hydrogen system.

For example, in the hydrogen system of the present aspect, when maintenance of the hydrogen production apparatus of the hydrogen system is to be carried out, the controller executes the second mode in which the second valve is closed and the first valve is opened, on the basis of input received by the receiver. Thereupon, communication between inside the hydrogen storage apparatus and outside the casing is blocked by the second valve, and therefore the hydrogen inside the hydrogen storage apparatus is not discharged outside the casing via the third flow path.

Thus, in the hydrogen system of the present aspect, in a case where maintenance of the hydrogen storage apparatus is not necessary when maintenance of the hydrogen production apparatus of the hydrogen system is to be carried out, the hydrogen inside the hydrogen storage apparatus can be preserved.

For a hydrogen system of a thirtieth aspect of the present disclosure, in the hydrogen system of the twenty ninth aspect, there may be included a booster with which hydrogen produced by the hydrogen production apparatus is pressurized and supplied to the hydrogen storage apparatus, the third flow path may branch from the first flow path downstream from the booster, and the controller may activate the booster in the first mode and the second mode.

According to this configuration, in the hydrogen system of the present aspect, in the first mode and the second mode, hydrogen inside the hydrogen production apparatus can be discharged outside the casing via the third flow path in an appropriate manner by means of the pressurizing operation of the booster.

For a hydrogen system of a thirty first aspect of the present disclosure, in the hydrogen system of the twenty ninth aspect, there may be included a third valve that is provided in the first flow path upstream from the branching location to the third flow path, in the first mode, the third valve may also be opened in addition to the first valve and the second mode, and, in the second mode, the third valve may also be opened in addition to the first valve, and the controller, based on input received by the receiver, may execute any of the first mode, the second mode, and a third mode in which the third valve is closed and the first valve and the second valve are opened.

According to this configuration, in the hydrogen system of the present aspect, when a worker is to carry out maintenance of either one or both of the hydrogen production apparatus and the hydrogen storage apparatus, it is possible for the hydrogen production apparatus and/or the hydrogen storage apparatus to be set to a state in which hydrogen can be discharged outside the casing by the controller executing any of the first mode, the second mode, and the third mode on the basis of input received by the receiver. Thus, the worker is able to carry out maintenance work for the hydrogen production apparatus and/or the hydrogen storage apparatus without hindrance.

Specifically, when maintenance of both the hydrogen production apparatus and the hydrogen storage apparatus is to be carried out, by executing the first mode, the inside of the hydrogen production apparatus and the inside of the hydrogen storage apparatus are in communication with outside the casing. It thereby becomes possible for hydrogen inside the hydrogen production apparatus and inside the hydrogen storage apparatus to be discharged outside the casing via the third flow path.

Furthermore, when maintenance of the hydrogen production apparatus is to be carried out, by executing the second mode, inside the hydrogen production apparatus is in communication with outside the casing together with communication between inside the hydrogen storage apparatus and outside the casing being blocked by the second valve. It thereby becomes possible for hydrogen inside the hydrogen production apparatus to be discharged outside the casing via the third flow path.

Furthermore, when maintenance of the hydrogen storage apparatus is to be carried out, by executing the third mode, inside the hydrogen storage apparatus is in communication with outside the casing together with communication between inside the hydrogen production apparatus and outside the casing being blocked by the third valve. It thereby becomes possible for hydrogen inside the hydrogen storage apparatus to be discharged outside the casing via the third flow path.

For a hydrogen system of a thirty second aspect of the present disclosure, in the hydrogen system of the thirty first aspect, there may be included a booster with which hydrogen produced by the hydrogen production apparatus is pressurized and supplied to the hydrogen storage apparatus, the third flow path may branch from the first flow path downstream from the booster, the third valve may be provided in the first flow path between the booster and the branching location to the third flow path, and the controller may activate the booster in the first mode and the second mode, and may not activate the booster in the third mode.

According to this configuration, in the hydrogen system of the present aspect, in the first mode and the second mode, hydrogen inside the hydrogen production apparatus can be discharged outside the casing via the third flow path in an appropriate manner by means of the pressurizing operation of the booster.

Furthermore, it is often the case that hydrogen gas is stored in a high pressure state in the hydrogen storage apparatus. In this case, in the third mode, when the first valve and the second valve are opened while the third valve is closed, the hydrogen inside the hydrogen storage apparatus can be discharged outside the casing via the third flow path in an appropriate manner by means of the hydrogen gas pressure in the hydrogen storage apparatus. Thus, in the hydrogen system of the present aspect, in the third mode, the power required for the operation of the booster can be reduced by not activating the booster. Furthermore, in the third mode, when the third valve is closed, the possibility of the booster provided between the hydrogen production apparatus and the third valve being damaged can be reduced by not activating the booster.

Hereinafter, embodiments of the present disclosure will be described with reference to the appended drawings. It should be noted that the embodiments described hereinafter all represent an example of the aforementioned aspects. Thus, the shapes, the materials, the constituent elements, the arrangement positions and modes of connection of the constituent elements, and the like given hereinafter are merely examples, and do not restrict the aforementioned aspects unless mentioned in the claims. Furthermore, constituent elements that are not mentioned in the independent claims representing the most significant concepts of the aforementioned aspects from among the constituent elements described hereinafter are described as optional constituent elements. Furthermore, there are cases where descriptions are omitted for configurations denoted by the same reference numerals. To aid understanding of the drawings, the constituent elements therein are depicted in a schematic manner, and therefore there are cases where shapes, dimension ratios, and the like are not accurately displayed. In an operation, the order and the like of each process can be changed as required. Furthermore, other publicly-known processes can be added as required.

First Embodiment

[Device Configuration]

FIG. 1 is a drawing depicting an example of a hydrogen system of a first embodiment.

It should be noted that [up] and [down] are taken as being as depicted in FIG. 1, and it is assumed that gravity acts from [up] to [down] (the same is also true in other drawings).

In the example depicted in FIG. 1, a hydrogen system 100 includes a hydrogen production apparatus 1, a hydrogen storage apparatus 2, a first flow path 3, a second flow path 4, a casing 5, a third flow path 6, a first valve 7, and a controller 50. It should be noted that there are cases where a hydrogen-using apparatus 8 depicted by means of a two-dot chain line is provided.

The hydrogen production apparatus 1 is an apparatus that produces hydrogen. The hydrogen production apparatus 1 may have any kind of configuration provided that hydrogen can be produced. The hydrogen produced by the hydrogen production apparatus 1 is not restricted to hydrogen gas having a hydrogen concentration of approximately 100%, and may be a hydrogen-containing gas. A possible example of a hydrogen-containing gas is a reformed gas generated by means of a reforming reaction such as methane gas, hydrogen gas including water vapor generated by means of the electrolysis of water, or the like.

Thus, a possible example of the hydrogen production apparatus 1 is a water electrolysis apparatus that generates hydrogen by means of the electrolysis of water, but there is no restriction thereto. A water electrolysis apparatus may generate hydrogen using power generated by means of a renewable energy such as sunlight. Furthermore, any type of water electrolysis method may be adopted for the water electrolysis apparatus. A possible example of the water electrolysis method is alkaline water electrolysis, solid polymer water electrolysis, solid oxide water electrolysis, or the like.

Although not depicted, it should be noted that the equipment necessary for hydrogen to be generated by the water electrolysis apparatus are provided, as appropriate. For example, a water pump for supplying water to the water electrolysis apparatus, an electrolyte film for conducting protons generated by means of the electrolysis of water, and the like may be provided. Furthermore, a catalyst layer may be provided on each main surface of the electrolyte film. A voltage applying device that applies a voltage between these catalyst layers may then be provided.

The hydrogen storage apparatus 2 is an apparatus that stores hydrogen produced by the hydrogen production apparatus 1. The hydrogen storage apparatus 2 may have any kind of configuration provided that hydrogen produced by the hydrogen production apparatus 1 can be stored. A possible example of the hydrogen storage apparatus 2 is a tank but there is no restriction thereto.

The first flow path 3 is a flow path that has flowing therein hydrogen that is discharged from the hydrogen production apparatus 1 and flows into the hydrogen storage apparatus 2. That is, hydrogen produced by the hydrogen production apparatus 1 is supplied to the hydrogen storage apparatus 2 via the first flow path 3, and is temporarily stored in the hydrogen storage apparatus 2.

The second flow path 4 is a flow path that has flowing therein hydrogen that is discharged from the hydrogen storage apparatus 2 and flows into the hydrogen-using apparatus 8. That is, hydrogen stored in the hydrogen storage apparatus 2 is supplied to the hydrogen-using apparatus 8 via the second flow path 4. Thus, the second flow path 4 may be extended from inside the casing 5, through a wall section of the casing 5, to the hydrogen-using apparatus 8. It should be noted that a possible example of the hydrogen-using apparatus 8 is a fuel cell that generates electricity with hydrogen as a fuel.

The casing 5 is a container that houses the hydrogen production apparatus 1, the hydrogen storage apparatus 2, at least part of the second flow path 4, and the first flow path 3. In the present example, as depicted in FIG. 1, an inner wall (partition wall) for partitioning the space in which the hydrogen production apparatus 1 and the hydrogen storage apparatus 2 are present is not provided in the casing 5.

Although not depicted, it should be noted that the entirety of the second flow path 4 may be housed inside the casing 5. In this case, the hydrogen-using apparatus 8 may be housed inside the casing 5. That is, the hydrogen-using apparatus 8 may be provided beside the hydrogen system 100 outside the casing 5 as in FIG. 1, or the hydrogen system 100 may include the hydrogen-using apparatus 8 inside the casing 5.

The third flow path 6 is a flow path that has flowing therein hydrogen that is discharged outside the casing 5 from at least one of the hydrogen production apparatus 1, the hydrogen storage apparatus 2, at least part of the second flow path 4, and the first flow path 3.

Although not depicted, it should be noted that the upstream end of the third flow path 6 may be connected at any location inside the casing 5 provided that hydrogen produced by the hydrogen production apparatus 1 is present therein. For example, the upstream end of the third flow path 6 may be connected to the hydrogen production apparatus 1, may be connected to the first flow path 3, may be connected to the hydrogen storage apparatus 2, or may be connected to at least part of the second flow path 4 inside the casing 5. Furthermore, the downstream end of the third flow path 6 may be connected at any location of the casing 5 but is desirably connected to a portion of the casing 5 that is higher than the central section of the casing 5 in the vertical direction. The details thereof will be described at a later point.

The first valve 7 is a valve provided in the third flow path 6. A possible example of the first valve 7 is an electromagnetic valve but there is no restriction thereto.

The controller 50 opens the first valve 7. That is, the opening and closing of the first valve 7 is controlled by the controller 50. The controller 50 may have any kind of configuration provided that it has a control function. The controller 50 may include an arithmetic circuit (not depicted) and a storage circuit (not depicted) that stores a control program, for example. A possible example of the arithmetic circuit unit is an MPU, a CPU, or the like. A possible example of the storage circuit is a memory or the like. The controller 50 may be constituted by an individual controller that implements centralized control, or may be constituted by a plurality of controllers that cooperate with each other to implement distributed control.

[Operation]

Hereinafter, an example of the operation of the hydrogen system 100 of the present embodiment will be described with reference to FIG. 1.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

First, the first valve 7 is closed during operation of the hydrogen system 100. Then, during operation of the hydrogen system 100, hydrogen ($H_2$) produced by the hydrogen production apparatus 1 is supplied to the hydrogen storage apparatus 2 via the first flow path 3 and temporarily stored in the hydrogen storage apparatus 2.

Hydrogen stored in the hydrogen storage apparatus 2 is supplied to the hydrogen-using apparatus 8 via the second flow path 4 at an appropriate time. Thereupon, the hydrogen is used by the hydrogen-using apparatus 8. For example, if the hydrogen-using apparatus 8 is a fuel cell, the hydrogen supplied from the hydrogen storage apparatus 2 is used as fuel for the fuel cell, and power is generated by the fuel cell.

Here, the controller 50 opens the first valve 7 in a case where a hydrogen leak has occurred inside the casing 5 due to a cause of some kind from at least one of the hydrogen production apparatus 1, the hydrogen storage apparatus 2, at least part of the second flow path 4, and the first flow path 3.

According to the above, with the hydrogen system 100 of the present embodiment, it is possible to respond to a hydrogen leak inside the casing 5 in an appropriate manner and to reduce apparatus size and cost compared to a conventional hydrogen system.

Specifically, an inner wall (partition wall) for partitioning the space in which the hydrogen production apparatus 1 and the hydrogen storage apparatus 2 are present is not provided in the casing 5, and the hydrogen production apparatus 1, the hydrogen storage apparatus 2, the first flow path 3, part of the second flow path 4, the third flow path 6, and the first valve 7 are provided inside the one casing 5. Thus, with the hydrogen system 100 of the present embodiment, it is possible to reduce apparatus size and cost compared to a case where the casing 5 is configured so as to partition the space in which the hydrogen production apparatus and the hydrogen storage apparatus are present.

Furthermore, with the hydrogen system 100 of the present embodiment, in a case where a hydrogen leak has occurred inside the casing 5 due to a cause of some kind from at least one of the hydrogen production apparatus 1, the hydrogen storage apparatus 2, at least part of the second flow path 4, and part of the first flow path 3, by merely opening the first valve 7, the hydrogen present in at least one of the hydrogen production apparatus 1, the hydrogen storage apparatus 2, at least part of the second flow path 4, and the first flow path 3 can be discharged outside the casing 5 via the third flow path 6. It should be noted that the operation of the hydrogen production apparatus 1 may be stopped when the first valve is open.

Second Embodiment

Figure 2:
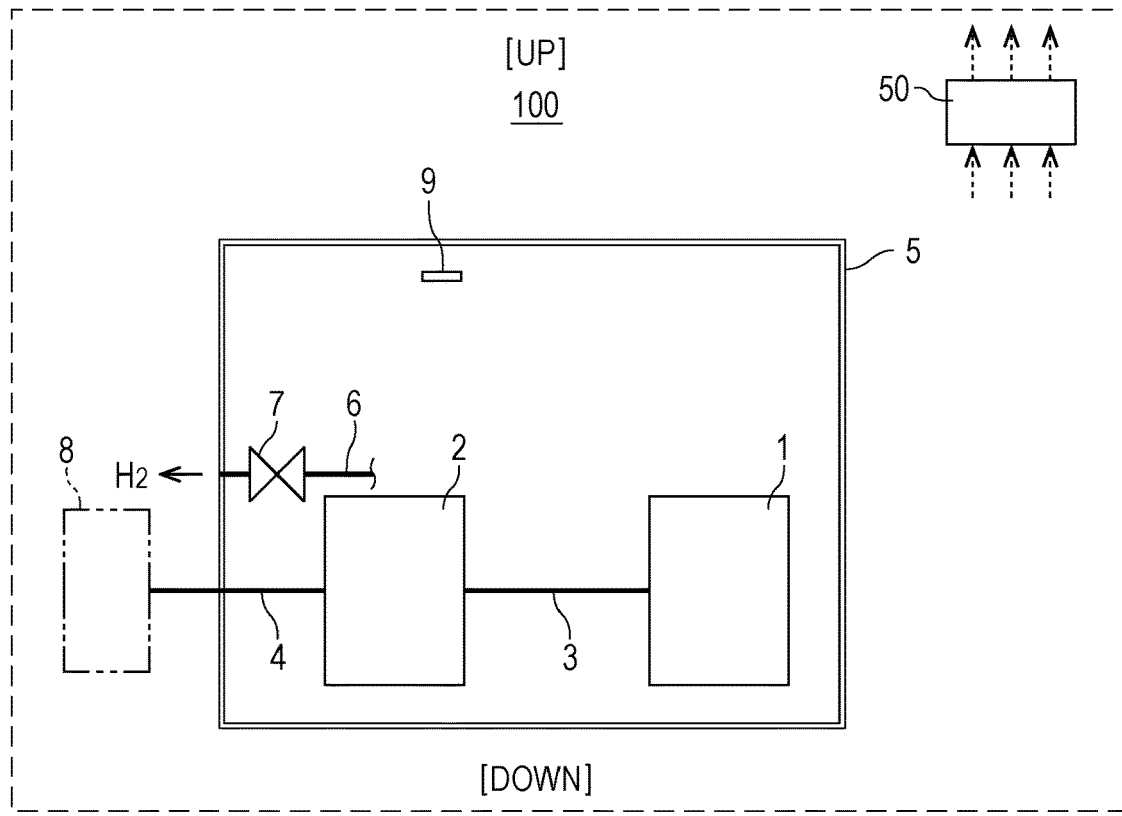
FIG. 2 is a drawing depicting an example of a hydrogen system of a second embodiment.

FIG. 2 is a drawing depicting an example of a hydrogen system of a second embodiment.

In the example depicted in FIG. 2, the hydrogen system 100 includes the hydrogen production apparatus 1, the hydrogen storage apparatus 2, the first flow path 3, the second flow path 4, the casing 5, the third flow path 6, the first valve 7, a detector 9, and the controller 50.

Here, the hydrogen production apparatus 1, the hydrogen storage apparatus 2, the first flow path 3, the second flow path 4, the casing 5, the third flow path 6, the first valve 7, and the hydrogen-using apparatus 8 are similar to those in the first embodiment and therefore will not be described.

The detector 9 is a sensor that detects a hydrogen leak inside the casing 5. The detector 9 may have any kind of configuration provided that a hydrogen leak inside the casing 5 can be detected. A possible example of the detector 9 is a contact combustion-type hydrogen sensor in which an oxidation catalyst is included in a metal porous sintered body. It should be noted that the detector 9 is not restricted to the aforementioned hydrogen sensor, and may be any kind of sensor provided that it is possible to detect that a hydrogen leak has occurred inside the casing 5. For example, if a hydrogen leak occurs inside the casing 5, there is a change in the gas pressure in the flow path in which the hydrogen inside the casing 5 is present, and therefore a pressure gauge (not depicted) provided in the flow path can also be used as the detector 9. The detector 9 may be a sensor which detects that a hydrogen leak has occurred inside the casing 5 indirectly in a manner similar to this pressure gauge.

Here, hydrogen that has leaked inside the casing 5 remains in a case where a hydrogen leak has occurred due to a cause of some kind from at least one of the hydrogen production apparatus 1, the hydrogen storage apparatus 2, at least part of the second flow path 4, and the first flow path 3. Thereupon, a hydrogen leak is detected by the detector 9 inside the casing 5. Thus, the controller 50 opens the first valve 7 when the hydrogen leak is detected by the detector 9. It should be noted that, at such time, the operation of the hydrogen production apparatus 1 may be stopped.

According to the above, with the hydrogen system 100 of the present embodiment, hydrogen present in at least one of the hydrogen production apparatus 1, the hydrogen storage apparatus 2, at least part of the second flow path 4, and the first flow path 3 can be discharged outside the casing 5 via the third flow path 6 at the timing of an appropriate time when a hydrogen leak is detected by the detector 9.

Furthermore, when a hydrogen leak has occurred inside the casing 5, the first valve 7 provided in the third flow path 6 can be opened based on the one detector 9 inside the casing 5. Thus, with the hydrogen system 100 of the present embodiment, it is possible to reduce apparatus size and cost compared to a configuration in which a detector is provided in each of two chambers inside a casing in which the hydrogen production apparatus 1 and the hydrogen storage apparatus 2 are respectively housed, for example.

Except for the aforementioned feature, the hydrogen system 100 of the present embodiment may be similar to the hydrogen system 100 of the first embodiment.

Third Embodiment

Figure 3A:
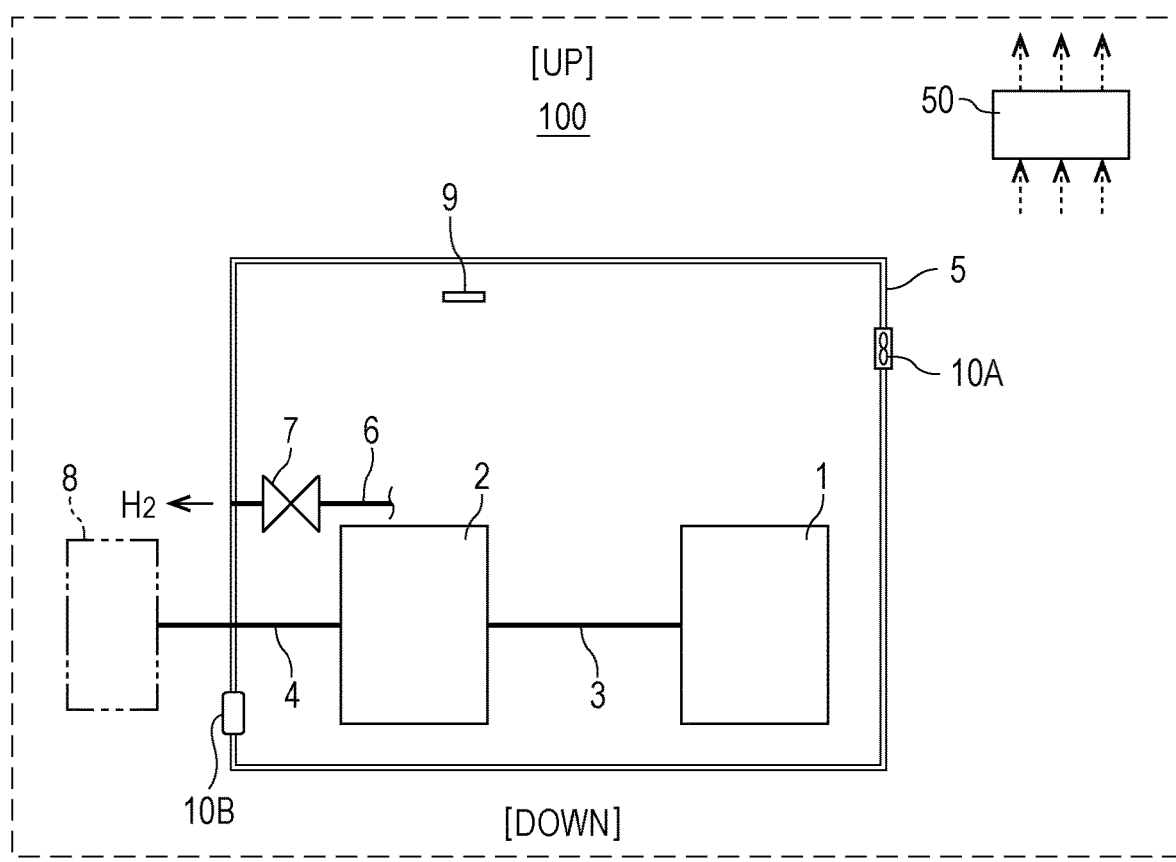
FIG. 3A is a drawing depicting an example of a hydrogen system of a third embodiment.

FIG. 3A is a drawing depicting an example of a hydrogen system of a third embodiment.

In the example depicted in FIG. 3A, the hydrogen system 100 includes the hydrogen production apparatus 1, the hydrogen storage apparatus 2, the first flow path 3, the second flow path 4, the casing 5, the third flow path 6, the first valve 7, the detector 9, a ventilator 10A, and the controller 50.

Here, the hydrogen production apparatus 1, the hydrogen storage apparatus 2, the first flow path 3, the second flow path 4, the casing 5, the third flow path 6, the first valve 7, and the hydrogen-using apparatus 8 are similar to those in the first embodiment and therefore will not be described. Furthermore, the detector 9 is similar to that in the second embodiment and therefore will not be described.

The ventilator 10A is an apparatus that ventilates inside the casing 5. The ventilator 10A may have any kind of configuration provided that inside the casing 5 can be ventilated. For example, the ventilator 10A is provided in the casing 5 and may be a general ventilation apparatus capable of discharging air inside the casing 5 to be replaced with external air that flows in from an air supply opening 10B provided in a wall section of the casing 5. A possible example of the ventilator 10A is an axial-flow type of fan motor but there is no restriction thereto.

The controller 50, if a hydrogen leak is detected by the detector 9, stops the operation of the hydrogen production apparatus 1 and activates the ventilator 10A, and thereafter, if a hydrogen leak is detected by the detector 9, opens the first valve 7. However, if a hydrogen leak is not detected by the detector 9 at such time, the controller 50 stops the operation of the ventilator 10A.

Hereinafter, an example of the operation of the hydrogen system 100 of the present embodiment will be described in detail.

Figure 3B:
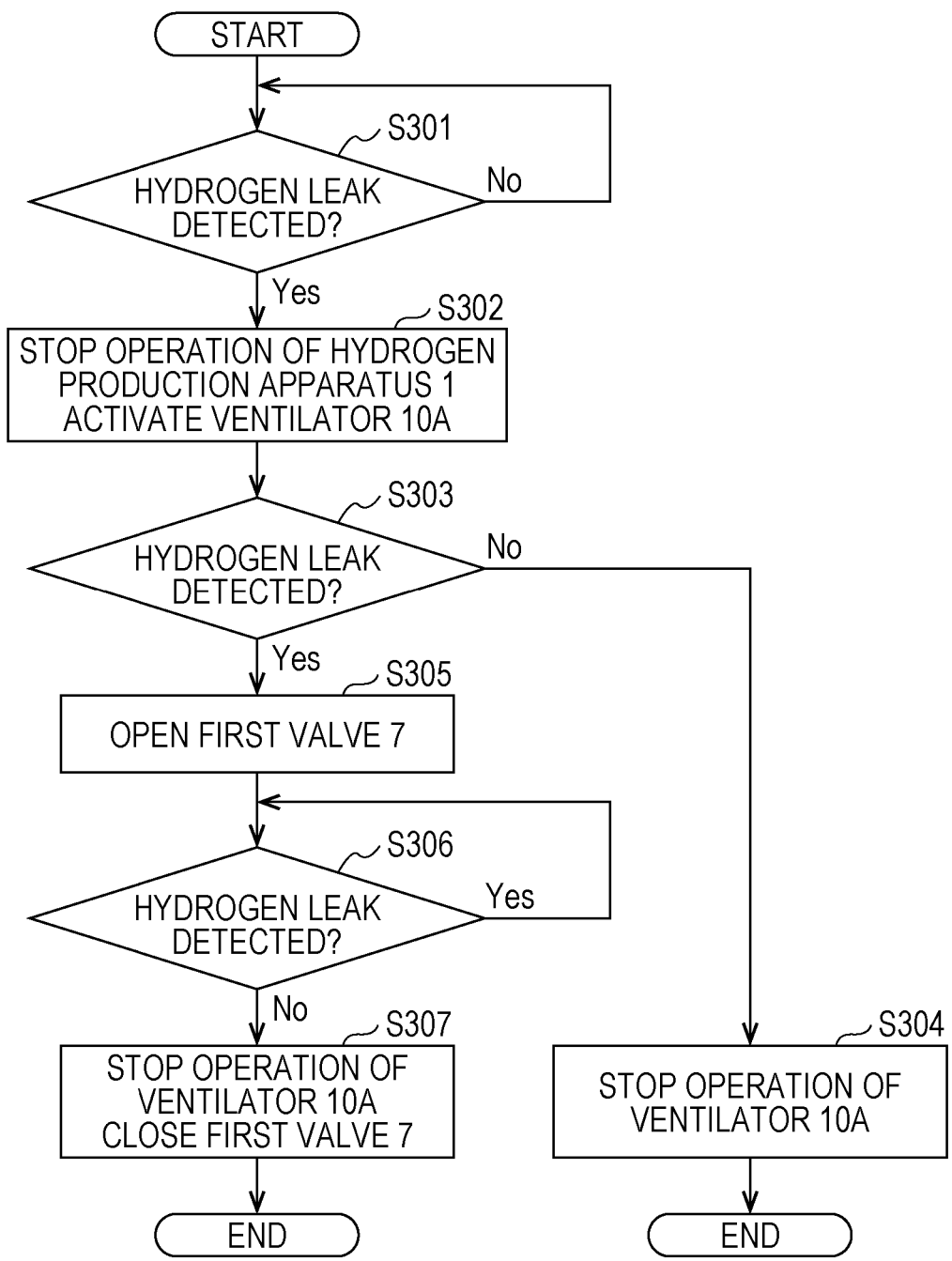
FIG. 3B is a flowchart depicting an example of the operation of the hydrogen system of the third embodiment.

FIG. 3B is a flowchart depicting an example of the operation of the hydrogen system of the third embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

First, the first valve 7 is closed during operation of the hydrogen system 100. Then, during operation of the hydrogen system 100, hydrogen produced by the hydrogen production apparatus 1 is supplied to the hydrogen storage apparatus 2 via the first flow path 3 and temporarily stored in the hydrogen storage apparatus 2. Hydrogen stored in the hydrogen storage apparatus 2 is supplied to the hydrogen-using apparatus 8 via the second flow path 4 at an appropriate time.

In this state, in step S301, it is determined whether or not a hydrogen leak is detected by the detector 9.

If a hydrogen leak is not detected by the detector 9 ("no" in step S301), the present state is maintained.

If a hydrogen leak has been detected by the detector 9 ("yes" in step S301), in step S302, the operation of the hydrogen production apparatus 1 is stopped and the ventilator 10A is activated (on). Thus, air containing hydrogen inside the casing 5 is discharged outside the casing 5, and external air from the air supply opening 10B flows inside the casing 5. It should be noted that the ventilator 10A may be activated not only after a hydrogen leak has been detected by the detector 9 but also during the operation of the hydrogen production apparatus 1 before a hydrogen leak is detected by the detector 9.

Here, when the ventilator 10A is active during the operation of the hydrogen production apparatus 1, if the operation of the hydrogen system 100 is stopped normally, the operation of the ventilator 10A is also stopped together with stopping the operation of the hydrogen production apparatus 1. In contrast, as in the present example, if a hydrogen leak has been detected by the detector 9, the ventilator 10A is activated even when the operation of the hydrogen production apparatus 1 is stopped. That is, when the operation of the hydrogen system 100 is stopped normally, the amount of ventilation carried out by the ventilator 10A after the operation of the hydrogen production apparatus 1 has been stopped is low compared to when the operation of the hydrogen system 100 is stopped abnormally due to the detection of a hydrogen leak. It should be noted that the stoppage timing for the operation of the ventilator 10A when the operation of the hydrogen system 100 is stopped normally may be the same time as when the operation of the hydrogen production apparatus 1 is stopped, or may be before or after when the operation of the hydrogen production apparatus 1 is stopped.

Next, in step S303, it is determined whether or not a hydrogen leak is detected by the detector 9.

If a hydrogen leak is not detected by the detector 9 ("no" in step S303), in step S304, the operation of the ventilator 10A is stopped.

If a hydrogen leak has been detected by the detector 9 ("yes" in step S303), in step S305, the first valve 7 is opened. Thus, hydrogen present in at least one of the hydrogen production apparatus 1, the hydrogen storage apparatus 2, at least part of the second flow path 4, and the first flow path 3 can be discharged outside the casing 5 via the third flow path 6.

Next, in step S306, it is determined whether or not a hydrogen leak is detected by the detector 9.

If a hydrogen leak has been detected by the detector 9 ("yes" in step S306), the present state is maintained.

If a hydrogen leak is not detected by the detector 9 ("no" in step S306), in step S307, the operation of the ventilator 10A is stopped and the first valve 7 is closed.

According to above, in the hydrogen system 100 of the present embodiment, after the operation of the hydrogen production apparatus 1 has been stopped and the ventilator 10A has been activated, if a hydrogen leak has been detected by the detector 9, the first valve 7 is opened and the ventilator 10A is also activated. However, after the operation of the hydrogen production apparatus 1 has been stopped and the ventilator 10A has been activated, if a hydrogen leak is no longer detected by the detector 9, the operation of the ventilator 10A is stopped. Thus, in the hydrogen system 100 of the present embodiment, when a hydrogen leak has been detected by the detector 9, there is a possibility that the amount of hydrogen to be discharged outside the casing 5 can be reduced compared to a case where the first valve 7 is opened without confirming whether or not a hydrogen leak is no longer detected by the detector 9 due to the operation of the ventilator 10A.

Except for the aforementioned feature, the hydrogen system 100 of the present embodiment may be similar to the hydrogen system 100 of the first embodiment or the second embodiment.

Fourth Embodiment

Figure 4:
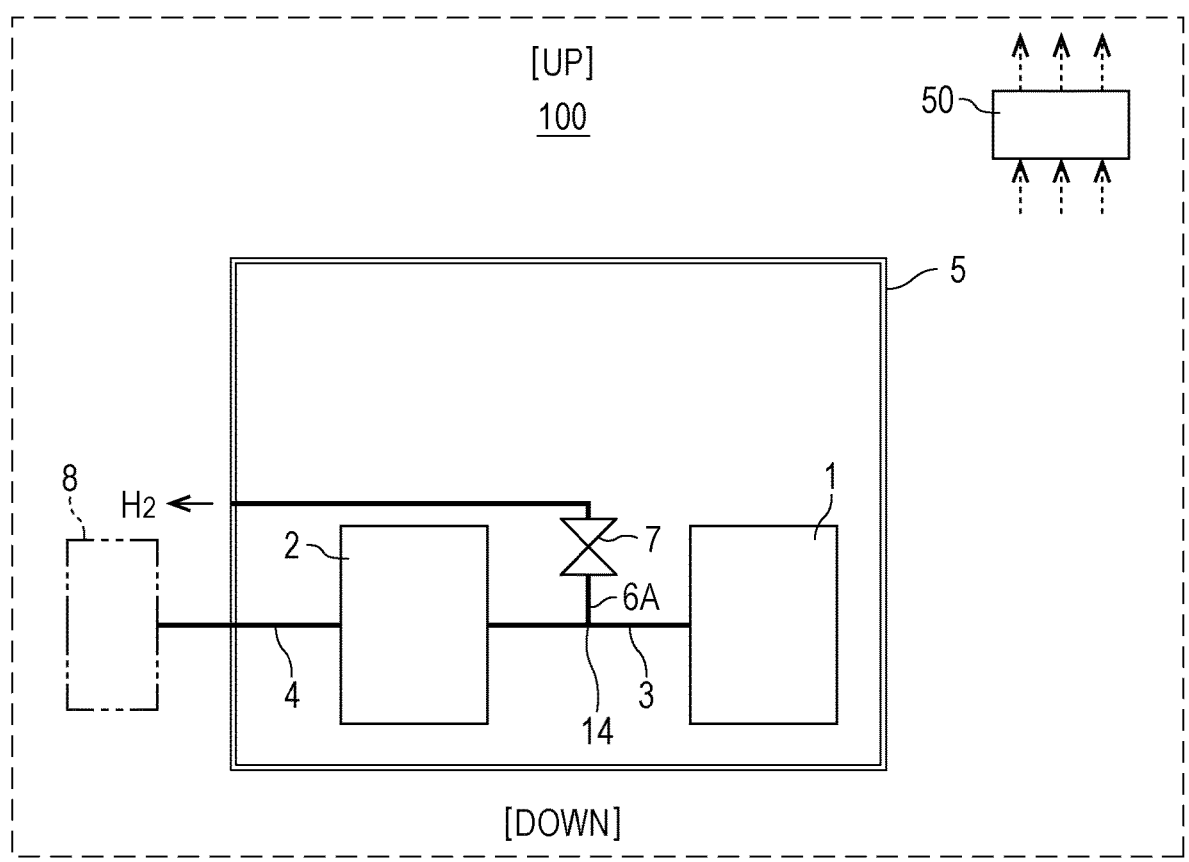
FIG. 4 is a drawing depicting an example of a hydrogen system of a fourth embodiment.

FIG. 4 is a drawing depicting an example of a hydrogen system of a fourth embodiment.

In the example depicted in FIG. 4, the hydrogen system 100 includes the hydrogen production apparatus 1, the hydrogen storage apparatus 2, the first flow path 3, the second flow path 4, the casing 5, a third flow path 6A, the first valve 7, and the controller 50.

Here, the hydrogen production apparatus 1, the hydrogen storage apparatus 2, the first flow path 3, the second flow path 4, the casing 5, the first valve 7, the hydrogen-using apparatus 8, and the controller 50 are similar to those in the first embodiment and therefore will not be described.

The third flow path 6A is a flow path branching from the first flow path 3. That is, the upstream end of the third flow path 6A is connected to the first flow path 3.

According to the above, in the hydrogen system 100 of the present embodiment, the third flow path 6A branches from the first flow path 3 passing through the hydrogen production apparatus 1 and the hydrogen storage apparatus 2, and therefore a setting can be implemented so that hydrogen is selectively discharged outside the casing 5 from either one or both of the hydrogen production apparatus 1 and the hydrogen storage apparatus 2.

For example, by providing a valve (not shown) nearer to the hydrogen production apparatus 1 than a branching location 14 to the third flow path 6A, and controlling the opening and closing of this valve when a hydrogen leak has occurred inside the casing 5 and the first valve 7 has been opened, it is possible to select either one of discharging hydrogen from only the hydrogen storage apparatus 2 and discharging hydrogen from the hydrogen production apparatus 1 and the hydrogen storage apparatus 2.

Another example is similar to working example 1 mentioned later and therefore a detailed description thereof is omitted. It should be noted that the operation of the hydrogen production apparatus 1 may be stopped when the first valve 7 is open.

Except for the aforementioned feature, the hydrogen system 100 of the present embodiment may be similar to the hydrogen system 100 of any of the first to third embodiments. For example, although the detector 9 (see FIG. 2) that detects a hydrogen leak inside the casing 5 is not depicted in FIG. 4, this kind of detector 9 may be provided in the hydrogen system 100 of FIG. 4. Furthermore, for example, although the ventilator 10A (see FIG. 3A) that ventilates inside the casing 5 is not depicted in FIG. 4, this kind of ventilator 10A may be provided in the hydrogen system 100 of FIG. 4.

FIRST WORKING EXAMPLE

Figure 5A:
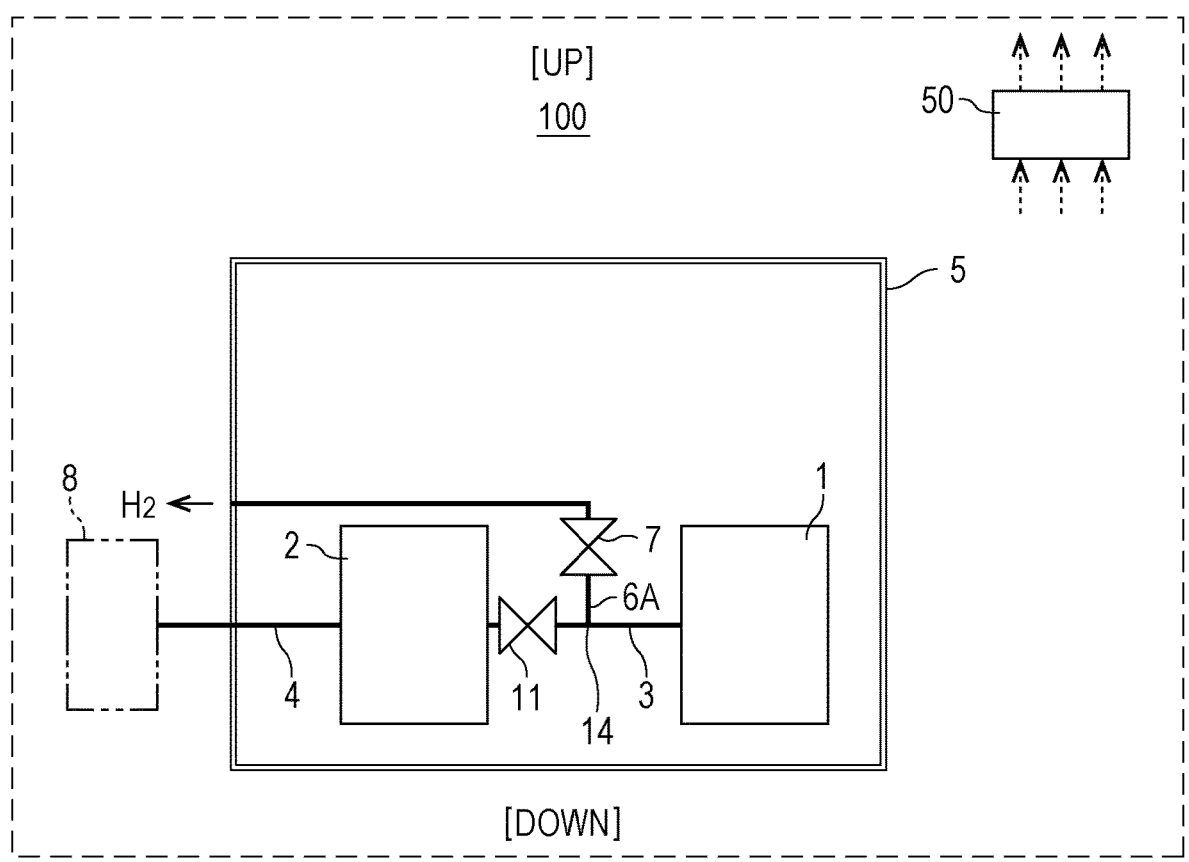
FIG. 5A is a drawing depicting an example of a hydrogen system of a first working example of the fourth embodiment.

FIG. 5A is a drawing depicting an example of a hydrogen system of a first working example of the fourth embodiment.

In the example depicted in FIG. 5A, the hydrogen system 100 includes the hydrogen production apparatus 1, the hydrogen storage apparatus 2, the first flow path 3, the second flow path 4, the casing 5, the third flow path 6A, the first valve 7, a second valve 11, and the controller 50.

Here, the hydrogen production apparatus 1, the hydrogen storage apparatus 2, the first flow path 3, the second flow path 4, the casing 5, the first valve 7, the hydrogen-using apparatus 8, and the controller 50 are similar to those in the first embodiment and therefore will not be described. Furthermore, the third flow path 6A is similar to that in the fourth embodiment and therefore will not be described.

The second valve 11 is a valve provided in the first flow path 3 downstream from the branching location 14 to the third flow path 6. That is, the second valve 11 is provided in the first flow path 3 between the hydrogen storage apparatus 2 and the branching location 14. A possible example of the second valve 11 is an electromagnetic valve but there is no restriction thereto.

According to the above, in the hydrogen system 100 of the present working example, if a hydrogen leak occurs inside the casing 5, by opening the first valve 7 and controlling the opening and closing of the second valve 11 when the first valve 7 is open, it is possible to select between discharging hydrogen from the hydrogen production apparatus 1 to outside the casing 5 and discharging hydrogen from the hydrogen production apparatus 1 and the hydrogen storage apparatus 2 to outside the casing 5.

Specifically, for example, by opening the first valve 7 and closing the second valve 11, hydrogen is discharged from only the hydrogen production apparatus 1. Conversely, by opening the first valve 7 and opening the second valve 11, hydrogen is discharged from not only the hydrogen production apparatus 1 but also the hydrogen storage apparatus 2. It should be noted that the operation of the hydrogen production apparatus 1 may be stopped when the first valve 7 is open.

Except for the aforementioned feature, the hydrogen system 100 of the present working example may be similar to the hydrogen system 100 of the fourth embodiment. For example, although the detector 9 (see FIG. 2) that detects a hydrogen leak inside the casing 5 is not depicted in FIG. 5A, this kind of detector 9 may be provided in the hydrogen system 100 of FIG. 5A. Furthermore, for example, although the ventilator 10A (see FIG. 3A) that ventilates inside the casing 5 is not depicted in FIG. 5A, this kind of ventilator 10A may be provided in the hydrogen system 100 of FIG. 5A.

SECOND WORKING EXAMPLE

The hydrogen system 100 of the present working example is similar to the hydrogen system 100 of the first working example of the fourth embodiment except for the detector 9 (see FIG. 2) being provided inside the casing 5 and the control content of the controller 50 described hereinafter.

If a hydrogen leak is detected by the detector 9, the controller 50 stops the operation of the hydrogen production apparatus 1 and opens the first valve 7. Thereafter, if a hydrogen leak is detected by the detector 9, the controller 50 opens the second valve 11. However, at such time, if a hydrogen leak is not detected by the detector 9, the controller 50 closes the first valve 7. That is, in the hydrogen system 100 of the present working example, if a hydrogen leak is detected by the detector 9 also after the operation of the hydrogen production apparatus 1 has been stopped and hydrogen has been discharged outside the casing 5 from the hydrogen production apparatus 1, the second valve 11 is opened and hydrogen is discharged outside the casing 5 from the hydrogen storage apparatus 2.

Hereinafter, an example of the operation of the hydrogen system 100 of the present working example will be described in detail.

Figure 5B:
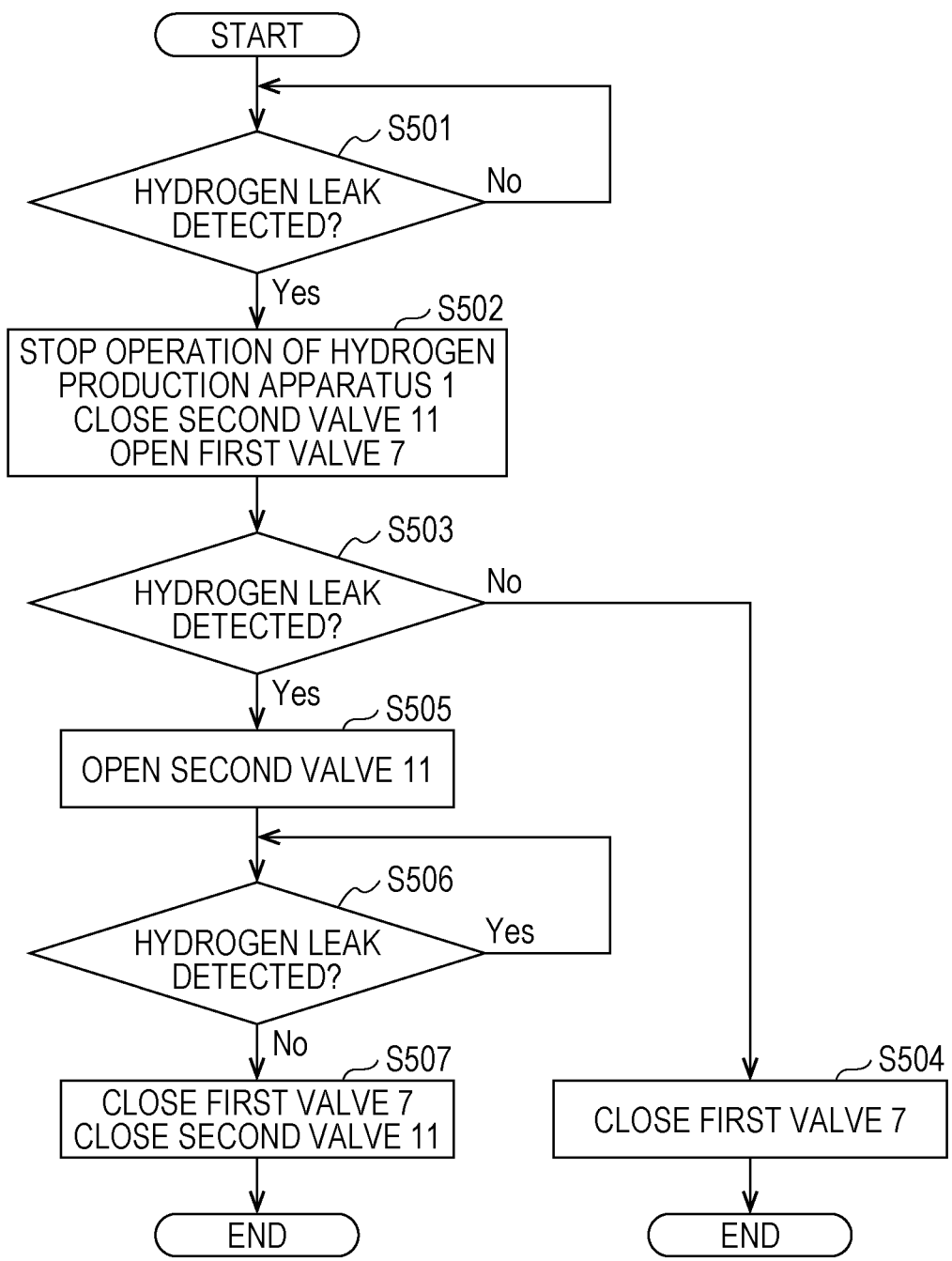
FIG. 5B is a flowchart depicting an example of the operation of a hydrogen system of a second working example of the fourth embodiment.

FIG. 5B is a flowchart depicting an example of the operation of the hydrogen system of a second working example of the fourth embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

First, the first valve 7 is closed and the second valve 11 is open during operation of the hydrogen system 100. Then, during operation of the hydrogen system 100, hydrogen produced by the hydrogen production apparatus 1 is supplied to the hydrogen storage apparatus 2 via the first flow path 3 and temporarily stored in the hydrogen storage apparatus 2. Hydrogen stored in the hydrogen storage apparatus 2 is supplied to the hydrogen-using apparatus 8 via the second flow path 4 at an appropriate time.

In this state, in step S501, it is determined whether or not a hydrogen leak is detected by the detector 9.

If a hydrogen leak is not detected by the detector 9 ("no" in step S501), the present state is maintained.

If a hydrogen leak has been detected by the detector 9 ("yes" in step S501), in step S502, the operation of the hydrogen production apparatus 1 is stopped, the second valve 11 is closed, and the first valve 7 is opened. Thus, hydrogen present in the hydrogen production apparatus 1 can be discharged outside the casing 5 via the third flow path 6A.

Next, in step S503, it is determined whether or not a hydrogen leak is detected by the detector 9.

If a hydrogen leak is not detected by the detector 9 ("no" in step S503), in step S504, the first valve 7 is closed.

If a hydrogen leak has been detected by the detector 9 ("yes" in step S503), in step S505, the second valve 11 is opened. Thus, hydrogen present in the hydrogen storage apparatus 2 can be discharged outside the casing 5 via the third flow path 6A.

Next, in step S506, it is determined whether or not a hydrogen leak is detected by the detector 9.

If a hydrogen leak has been detected by the detector 9 ("yes" in step S506), the present state is maintained.

If a hydrogen leak is not detected by the detector 9 ("no" in step S506), in step S507, the first valve 7 and the second valve 11 are closed.

According to the above, in the hydrogen system 100 of the present working example, if a hydrogen leak occurs inside the casing 5, by opening the first valve 7 and controlling the opening and closing of the second valve 11 when the first valve 7 is open, it is possible to select between discharging hydrogen from the hydrogen production apparatus 1 to outside the casing 5 and discharging hydrogen from the hydrogen production apparatus 1 and the hydrogen storage apparatus 2 to outside the casing 5.

Thus, in the hydrogen system 100 of the present working example, when a hydrogen leak has been detected by the detector 9, there is a possibility that the amount of hydrogen to be discharged outside the casing 5 can be reduced compared to a hydrogen system 100 not provided with the second valve 11.

It should be noted that the present working example may be structurally designed so that the amount of hydrogen than can be stored inside the hydrogen storage apparatus 2 is greater than the amount of hydrogen that can be stored inside the hydrogen production apparatus 1. Specifically, the volume inside the hydrogen storage apparatus 2 is greater than the volume of the hydrogen flow path inside the hydrogen production apparatus 1.

At such time, in the hydrogen system 100 of the present working example, there is a possibility that the amount of hydrogen to be discharged outside the casing 5 can be reduced compared to a case where hydrogen is preferentially discharged outside the casing 5 from the hydrogen storage apparatus 2 when a hydrogen leak has occurred.

Except for the aforementioned feature, the hydrogen system 100 of the present working example may be similar to the hydrogen system 100 of the first working example of the fourth embodiment.

MODIFIED EXAMPLE

Figure 6:
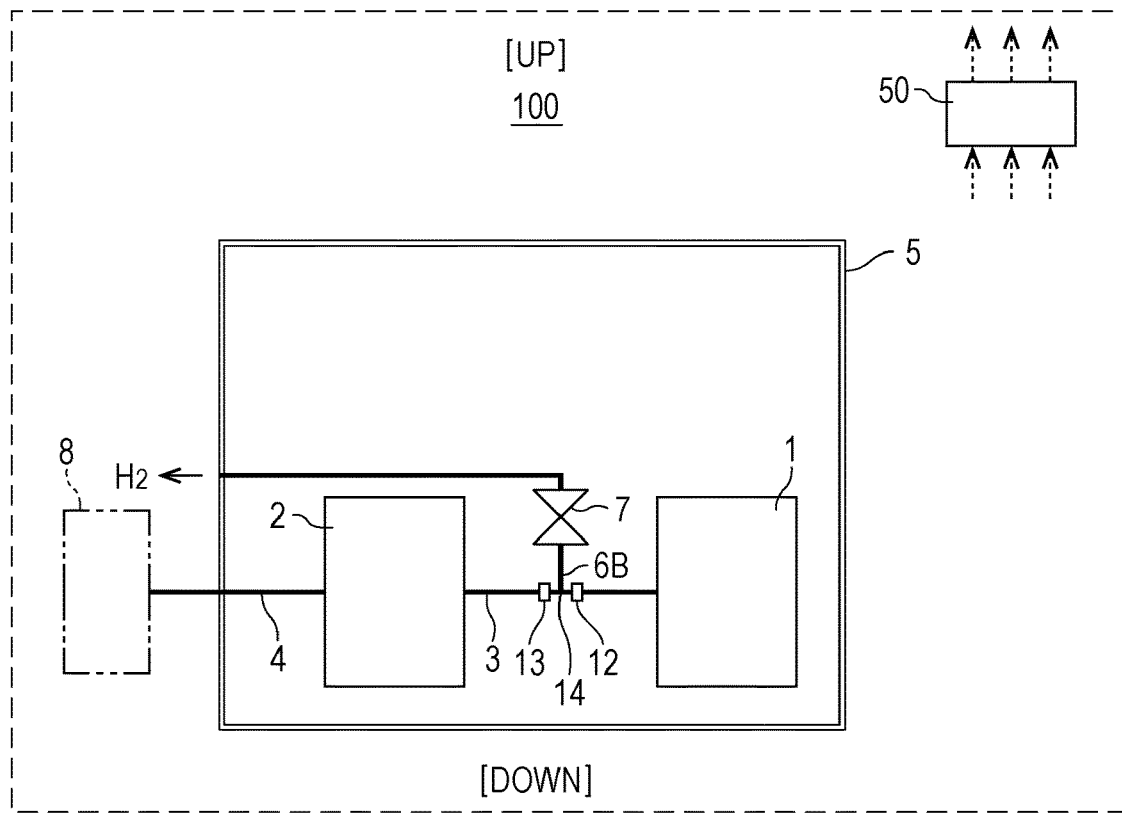
FIG. 6 is a drawing illustrating an example of a hydrogen system of a modified example of the fourth embodiment.

FIG. 6 is a drawing illustrating an example of a hydrogen system of a modified example of the fourth embodiment.

In the example depicted in FIG. 6, the hydrogen system 100 includes the hydrogen production apparatus 1, the hydrogen storage apparatus 2, the first flow path 3, the second flow path 4, the casing 5, a third flow path 6B, the first valve 7, a first coupling 12, a second coupling 13, and the controller 50.

Here, the hydrogen production apparatus 1, the hydrogen storage apparatus 2, the first flow path 3, the second flow path 4, the casing 5, the first valve 7, the hydrogen-using apparatus 8, and the controller 50 are similar to those in the first embodiment and therefore will not be described.

In the hydrogen system 100 of the present modified example, the first coupling 12 and the second coupling 13 are provided in the first flow path 3. Also, the third flow path 6B branches from the first flow path 3 between the first coupling 12 and the second coupling 13.

The first coupling 12 and the second coupling 13 are configured so that the first flow path 3 can be fastened to ensure that the hydrogen flowing along the first flow path 3 does not leak, and so that it is possible for the first flow path 3 to be detached by means of the first coupling 12 and the second coupling 13. It should be noted that a possible example of the first coupling 12 and the second coupling 13 is a pipe coupling, but there is no restriction thereto.

In the hydrogen system 100 of the present modified example, with consideration being given to the arrangement of flow paths that become comparatively long at the branching location 14 branching from the first flow path 3 to the third flow path 6B, the first coupling 12 and the second coupling 13 are provided respectively in the first flow paths 3 extending by predetermined lengths on both sides from the branching location 14.

Then, in order to form this kind of branch from the first flow path 3 to the third flow path 6B, first, the first coupling 12 is used to fasten one of the first flow paths 3 that extend from the branching location 14, to the first flow path 3 that connects to the hydrogen production apparatus 1. Next, the second coupling 13 is used to fasten the other of the first flow paths 3 that extend from the branching location 14, to the first flow path 3 that connects to the hydrogen storage apparatus 2.

According to the above, in the hydrogen system 100 of the present embodiment, the third flow path 6B can be provided in a simple manner in terms of the configuration if provided between the first coupling 12 and the second coupling 13, that is, between couplings. In other words, it is possible to improve the ease of the assembly and maintenance of the piping constituting the branching location 14 compared to a case where the first coupling 12 and the second coupling 13 are not provided in the first flow path 3.

Except for the aforementioned feature, the hydrogen system 100 of the present modified example may be similar to the hydrogen system 100 of the fourth embodiment. For example, although the detector 9 (see FIG. 2) that detects a hydrogen leak inside the casing 5 is not depicted in FIG. 6, this kind of detector 9 may be provided in the hydrogen system 100 of FIG. 6. Furthermore, for example, although the ventilator 10A (see FIG. 3A) that ventilates inside the casing 5 is not depicted in FIG. 6, this kind of ventilator 10A may be provided in the hydrogen system 100 of FIG. 6.

Fifth Embodiment

Figure 7:
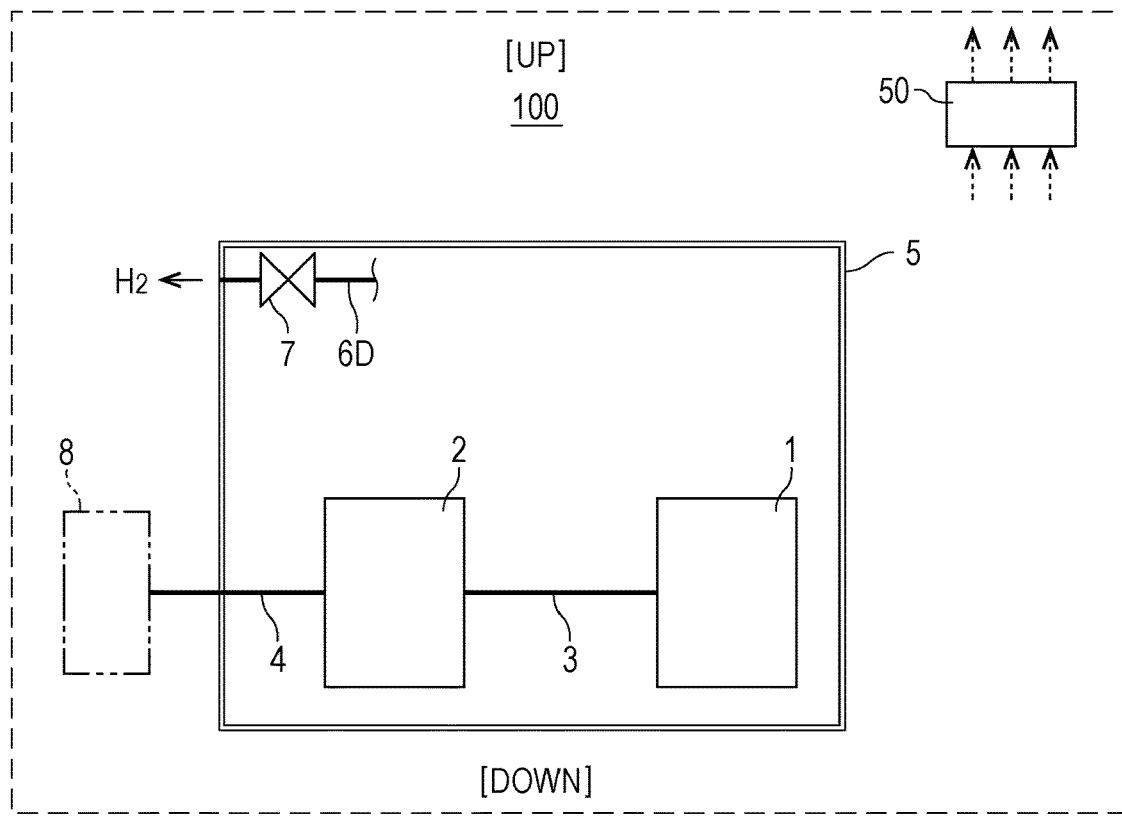
FIG. 7 is a drawing depicting an example of a hydrogen system of a fifth embodiment.

FIG. 7 is a drawing depicting an example of a hydrogen system of a fifth embodiment.

In the example depicted in FIG. 7, the hydrogen system 100 includes the hydrogen production apparatus 1, the hydrogen storage apparatus 2, the first flow path 3, the second flow path 4, the casing 5, a third flow path 6D, the first valve 7, and the controller 50.

Here, the hydrogen production apparatus 1, the hydrogen storage apparatus 2, the first flow path 3, the second flow path 4, the casing 5, the first valve 7, the hydrogen-using apparatus 8, and the controller 50 are similar to those in the first embodiment and therefore will not be described.

In the hydrogen system 100 of the present embodiment, the third flow path 6D is connected to the upper section of the casing. Specifically, the downstream end of the third flow path 6 is connected to a side surface of the upper casing 5 that is higher than the central section of the casing 5 in the vertical direction. It should be noted that, similar to the hydrogen system 100 of the first embodiment, the upstream end of the third flow path 6D may be connected at any location provided that hydrogen produced by the hydrogen production apparatus 1 is present therein.

According to the above, in the hydrogen system 100 of the present embodiment, by connecting the third flow path 6 at an upper section of the casing, it is possible to reduce problems when hydrogen is discharged outside the casing 5 from the third flow path 6, compared to a case where the third flow path 6 is connected at a lower section of the casing.

For example, it is possible to reduce the possibility of hydrogen that has been discharged outside the casing 5 coming into contact with an ignition source that is present outside the casing 5. This is because hydrogen discharged outside the casing 5 diffuses upward, and therefore, if the third flow path 6 is connected at the upper section of the casing, the possibility of coming into contact with an ignition source in the periphery of the lower section of the casing decreases. As an example, in a case where the overall height of the casing 5 of the hydrogen system 100 is 2 m or higher, the possibility of hydrogen discharged outside the casing 5 from the third flow path 6 coming into contact with an ignition source can be reduced even when an ignition source is present within approximately 2 m from the ground. It should be noted that this overall height is exemplary and is not restricted to the present example.

Except for the aforementioned feature, the hydrogen system 100 of the present embodiment may be similar to the hydrogen system 100 of any of the first to fourth embodiments, the first and second working examples of the fourth embodiment, and the modified example of the fourth embodiment. For example, although the detector 9 (see FIG. 2) that detects a hydrogen leak inside the casing 5 is not depicted in FIG. 7, this kind of detector 9 may be provided in the hydrogen system 100 of FIG. 7. Furthermore, for example, although the ventilator 10A (see FIG. 3A) that ventilates inside the casing 5 is not depicted in FIG. 7, this kind of ventilator 10A may be provided in the hydrogen system 100 of FIG. 7. Furthermore, for example, although the second valve 11 (see FIG. 5A) of the first flow path 3 and the first coupling 12 and second coupling 13 (see FIG. 6) of the first flow path 3 are not depicted in FIG. 7, this kind of second valve 11, first coupling 12, and second coupling 13 may be provided in the hydrogen system 100 of FIG. 7.

Sixth Embodiment

Figure 8:
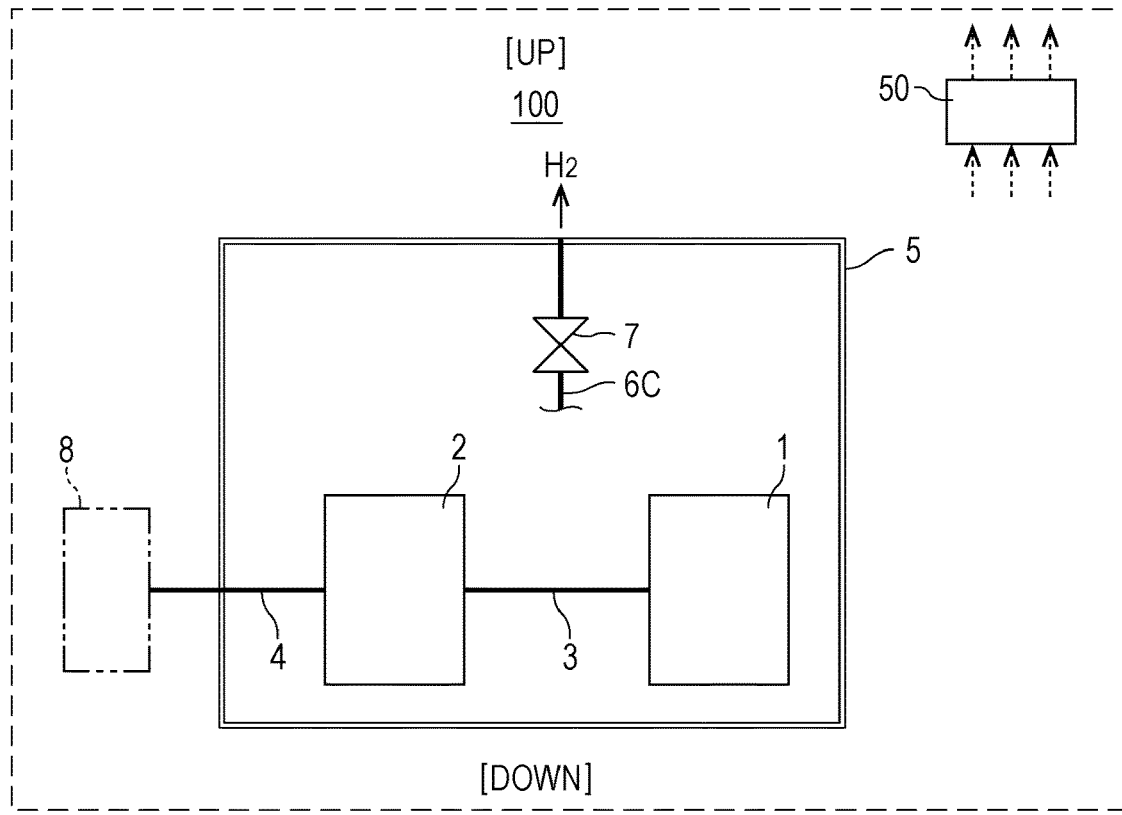
FIG. 8 is a drawing depicting an example of a hydrogen system of a sixth embodiment.

FIG. 8 is a drawing depicting an example of a hydrogen system of a sixth embodiment.

In the example depicted in FIG. 8, the hydrogen system 100 includes the hydrogen production apparatus 1, the hydrogen storage apparatus 2, the first flow path 3, the second flow path 4, the casing 5, a third flow path 6C, the first valve 7, and the controller 50.

Here, the hydrogen production apparatus 1, the hydrogen storage apparatus 2, the first flow path 3, the second flow path 4, the casing 5, the first valve 7, the hydrogen-using apparatus 8, and the controller 50 are similar to those in the first embodiment and therefore will not be described.

In the hydrogen system 100 of the present embodiment, the third flow path 6C is connected to the upper surface of the casing 5. It should be noted that, similar to the hydrogen system 100 of the first embodiment, the upstream end of the third flow path 6C may be connected at any location provided that hydrogen produced by the hydrogen production apparatus 1 is present therein. Furthermore, as depicted in FIG. 8, the connection location of the downstream end of the third flow path 6C may be in the substantially central section of the upper surface of the casing 5, but this is exemplary and is not restricted to the present example.

According to the above, in the hydrogen system 100 of the present embodiment, it is possible to reduce problems when hydrogen is discharged outside the casing 5 from the third flow path 6C, compared to a case where the third flow path 6C is connected to a side surface of the casing 5. The possibility of hydrogen discharged outside the casing 5 from the third flow path 6C coming into contact with an ignition source can be reduced even in a case where an ignition source is present in the periphery of a side surface of the casing 5, for example. Furthermore, the third flow path 6C can be formed using a straight pipe that extends in the vertical direction, and therefore hydrogen, which is lighter than air, can be smoothly discharged outside the casing 5.

Except for the aforementioned feature, the hydrogen system 100 of the present embodiment may be similar to the hydrogen system 100 of any of the first to fourth embodiments, the first and second working examples of the fourth embodiment, the modified example of the fourth embodiment, and the fifth embodiment. For example, although the detector 9 (see FIG. 2) that detects a hydrogen leak inside the casing 5 is not depicted in FIG. 8, this kind of detector 9 may be provided in the hydrogen system 100 of FIG. 8. Furthermore, for example, although the ventilator 10A (see FIG. 3A) that ventilates inside the casing 5 is not depicted in FIG. 8, this kind of ventilator 10A may be provided in the hydrogen system 100 of FIG. 8. Furthermore, for example, although the second valve 11 (see FIG. 5A) of the first flow path 3 and the first coupling 12 and second coupling 13 (see FIG. 6) of the first flow path 3 are not depicted in FIG. 8, this kind of second valve 11, first coupling 12, and second coupling 13 may be provided in the hydrogen system 100 of FIG. 8.

Seventh Embodiment

Figure 9:
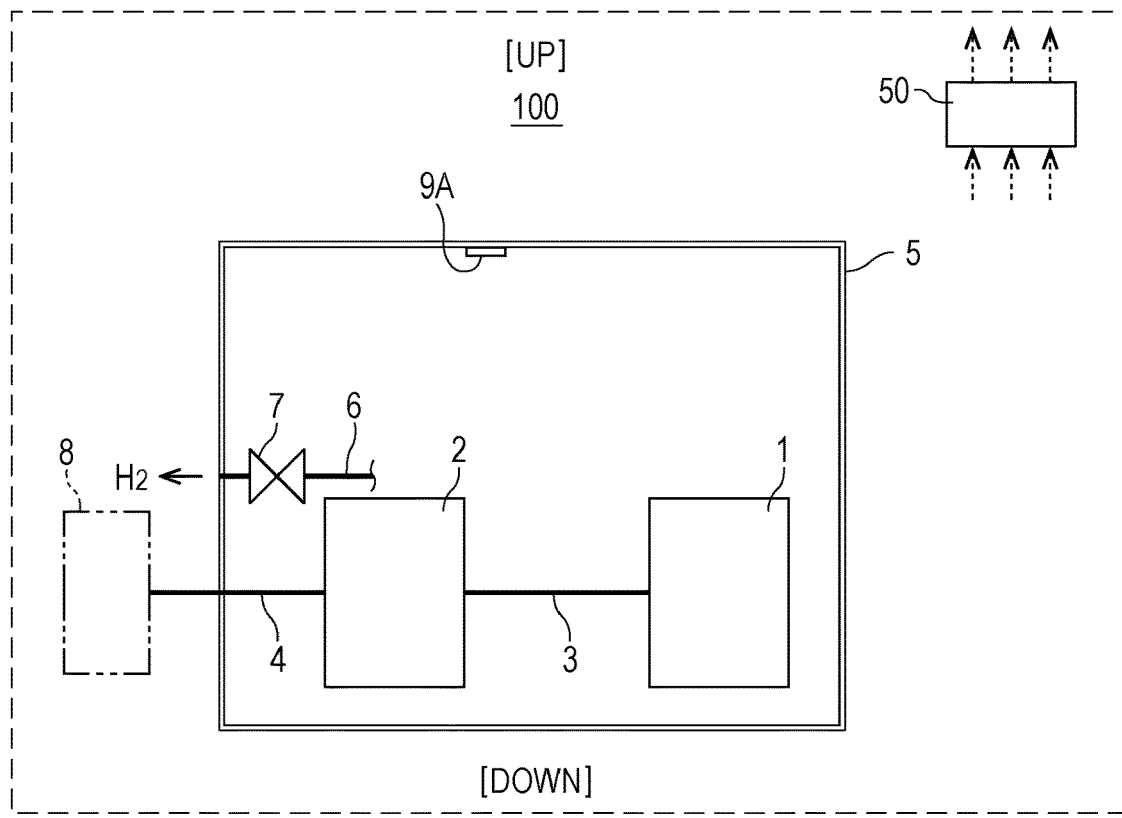
FIG. 9 is a drawing depicting an example of a hydrogen system of a seventh embodiment.

FIG. 9 is a drawing depicting an example of a hydrogen system of a seventh embodiment.

In the example depicted in FIG. 9, the hydrogen system 100 includes the hydrogen production apparatus 1, the hydrogen storage apparatus 2, the first flow path 3, the second flow path 4, the casing 5, the third flow path 6, the first valve 7, a detector 9A, and the controller 50.

Here, the hydrogen production apparatus 1, the hydrogen storage apparatus 2, the first flow path 3, the second flow path 4, the casing 5, the third flow path 6, the first valve 7, the hydrogen-using apparatus 8, and the controller 50 are similar to those in the first embodiment and therefore will not be described.

In the hydrogen system 100 of the present embodiment, the detector 9A is provided on an upper surface of the casing 5. That is, the detector 9A, which detects a hydrogen leak inside the casing 5, is attached to the inner surface of a top plate constituting the upper surface of the casing 5. It should be noted that, similar to the hydrogen system 100 of the second embodiment, a possible example of the detector 9A is a contact combustion-type hydrogen sensor in which an oxidation catalyst is included in a metal porous sintered body, but there is no restriction thereto.

According to the above, in the hydrogen system 100 of the present embodiment, by providing the detector 9A on the upper surface of the casing 5, hydrogen, which is lighter than air, can be detected effectively compared to a case where a detector is not provided in such a location. That is, when a hydrogen leak has occurred inside the casing 5, hydrogen, which is lighter than air, remains in the upper section rather than the lower section of the casing 5, and therefore providing the detector 9A on the upper surface of the casing 5 makes it easier for a hydrogen leak to be detected by the detector 9A.

Except for the aforementioned feature, the hydrogen system 100 of the present embodiment may be similar to the hydrogen system 100 of any of the first to fourth embodiments, the first and second working examples of the fourth embodiment, the modified example of the fourth embodiment, the fifth embodiment, and the sixth embodiment. For example, although the ventilator 10A (see FIG. 3A) that ventilates inside the casing 5 is not depicted in FIG. 9, this kind of ventilator 10A may be provided in the hydrogen system 100 of FIG. 9. Furthermore, for example, although the second valve 11 (see FIG. 5A) of the first flow path 3 and the first coupling 12 and second coupling 13 (see FIG. 6) of the first flow path 3 are not depicted in FIG. 9, this kind of second valve 11, first coupling 12, and second coupling 13 may be provided in the hydrogen system 100 of FIG. 9. Furthermore, in FIG. 9, the third flow path 6 is connected to a side surface of the casing 5, but there is no restriction thereto. The third flow path 6 may be connected to the upper surface of the casing 5.

Eighth Embodiment

Figure 10:
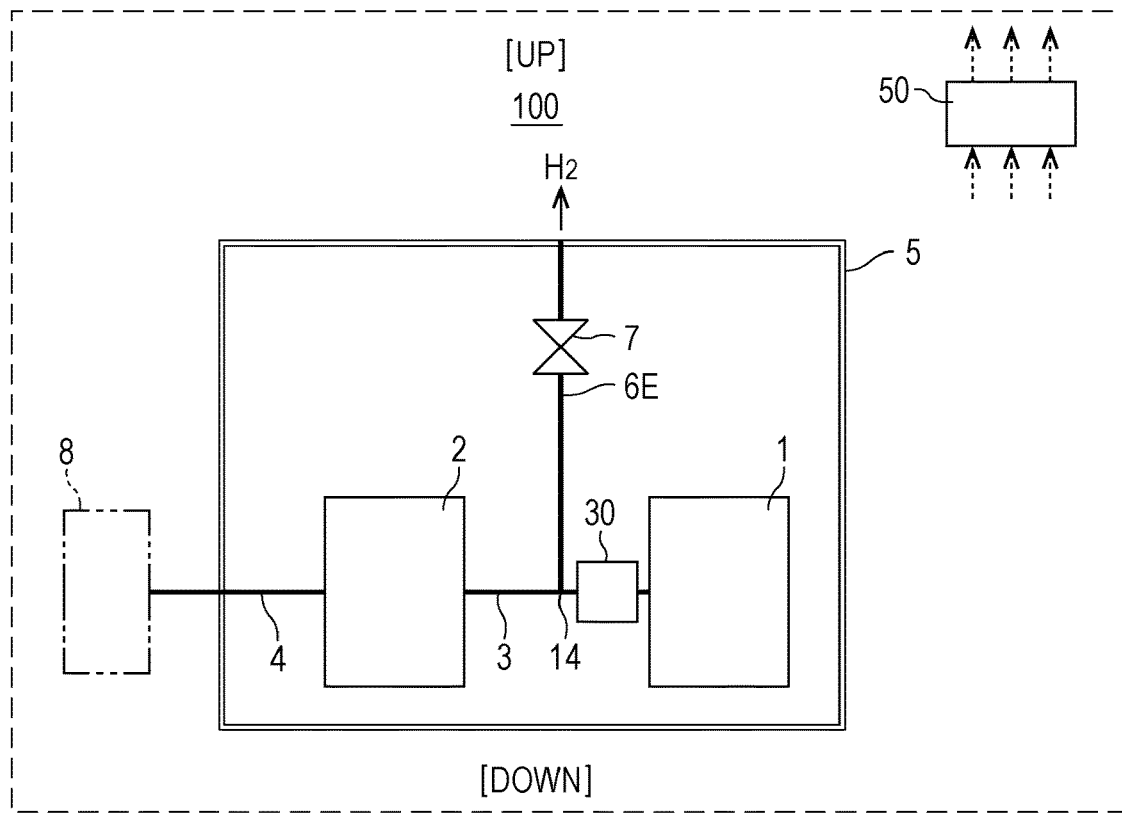
FIG. 10 is a drawing depicting an example of a hydrogen system of an eighth embodiment.

FIG. 10 is a drawing depicting an example of a hydrogen system of an eighth embodiment.

In the example depicted in FIG. 10, the hydrogen system 100 includes the hydrogen production apparatus 1, the hydrogen storage apparatus 2, the first flow path 3, the second flow path 4, the casing 5, a third flow path 6E, the first valve 7, a booster 30, and the controller 50.

Here, the hydrogen production apparatus 1, the hydrogen storage apparatus 2, the first flow path 3, the second flow path 4, the casing 5, and the first valve 7 are similar to those in the first embodiment and therefore will not be described.

The booster 30 is an apparatus with which hydrogen produced by the hydrogen production apparatus 1 is pressurized and supplied to the hydrogen storage apparatus 2. It should be noted that the controller 50 may control the operation of the booster 30.

The booster 30 may have any kind of configuration provided that hydrogen produced by the hydrogen production apparatus 1 can be pressurized and supplied to the hydrogen storage apparatus 2. The booster 30, for example, may be an electrochemical booster apparatus implemented using a solid polymer membrane, or may be a mechanical booster apparatus. Both types of booster apparatus are publicly known and therefore will not be described in detail.

Furthermore, in the hydrogen system 100 of the present embodiment, the third flow path 6E is a flow path that branches from the first flow path 3 downstream from the booster 30. That is, the upstream end of the third flow path 6E is connected to the first flow path 3 between the booster 30 and the hydrogen storage apparatus 2. It should be noted that, here, the downstream end of the third flow path 6E is connected to the upper surface of the casing 5, but there is no restriction thereto. The downstream end of the third flow path 6E may be connected to any location of the casing 5.

According to the above, in the hydrogen system 100 of the present embodiment, hydrogen can be discharged from inside an apparatus to outside the casing 5 in an appropriate manner compared to a conventional hydrogen system. For example, by setting the open state of the first valve 7 and the operating state of the booster 30 as appropriate, it becomes possible for hydrogen inside the hydrogen production apparatus 1 and inside the hydrogen storage apparatus 2 to be discharged outside the casing 5 at an appropriate time via the third flow path 6E.

Except for the aforementioned feature, the hydrogen system 100 of the present embodiment may be similar to the hydrogen system 100 of any of the first to fourth embodiments, the first and second working examples of the fourth embodiment, the modified example of the fourth embodiment, and the fifth to seventh embodiments.

Ninth Embodiment

Figure 11:
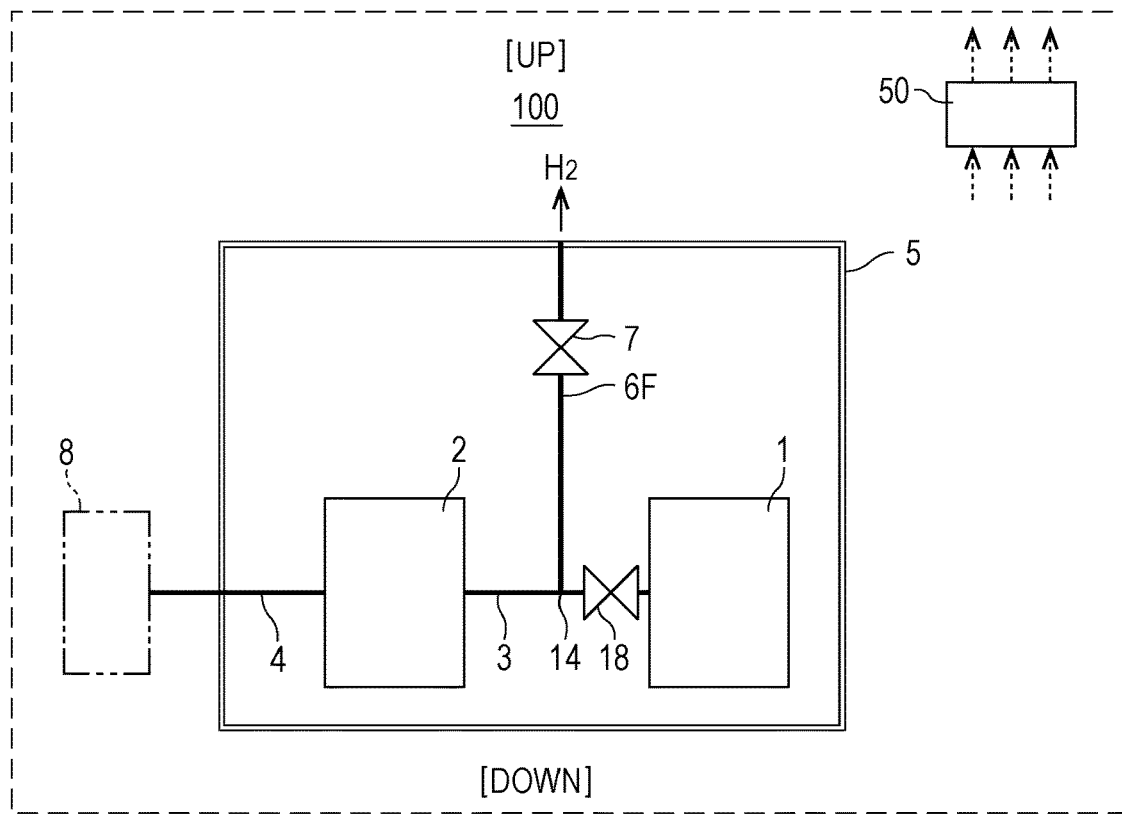
FIG. 11 is a drawing depicting an example of a hydrogen system of a ninth embodiment.

FIG. 11 is a drawing depicting an example of a hydrogen system of a ninth embodiment.

In the example depicted in FIG. 11, the hydrogen system 100 includes the hydrogen production apparatus 1, the hydrogen storage apparatus 2, the first flow path 3, the second flow path 4, the casing 5, a third flow path 6F, the first valve 7, a third valve 18, and the controller 50.

Here, the hydrogen production apparatus 1, the hydrogen storage apparatus 2, the first flow path 3, the second flow path 4, the casing 5, and the first valve 7 are similar to those in the first embodiment and therefore will not be described.

The third valve 18 is a valve provided in the first flow path 3 upstream from the branching location 14 to the third flow path 6F. A possible example of the third valve 18 is an electromagnetic valve but there is no restriction thereto. The controller 50 may control the opening and closing operation of the third valve 18.

Furthermore, in the hydrogen system 100 of the present embodiment, the third flow path 6F is a flow path that branches from the first flow path 3 between the third valve 18 and the hydrogen storage apparatus 2. It should be noted that, here, the downstream end of the third flow path 6F is connected to the upper surface of the casing 5, but there is no restriction thereto. The downstream end of the third flow path 6F may be connected to any location of the casing 5.

According to the above, in the hydrogen system 100 of the present embodiment, hydrogen can be discharged from inside an apparatus to outside the casing 5 in an appropriate manner compared to a conventional hydrogen system. For example, by setting the open/closed states of the first valve 7 and the third valve 18 as appropriate, it becomes possible for hydrogen inside the hydrogen production apparatus 1 and inside the hydrogen storage apparatus 2 to be discharged outside the casing at an appropriate time via the third flow path 6E.

Except for the aforementioned feature, the hydrogen system 100 of the present embodiment may be similar to the hydrogen system 100 of any of the first to fourth embodiments, the first and second working examples of the fourth embodiment, the modified example of the fourth embodiment, and the fifth to eighth embodiments.

Tenth Embodiment

Figure 12A:
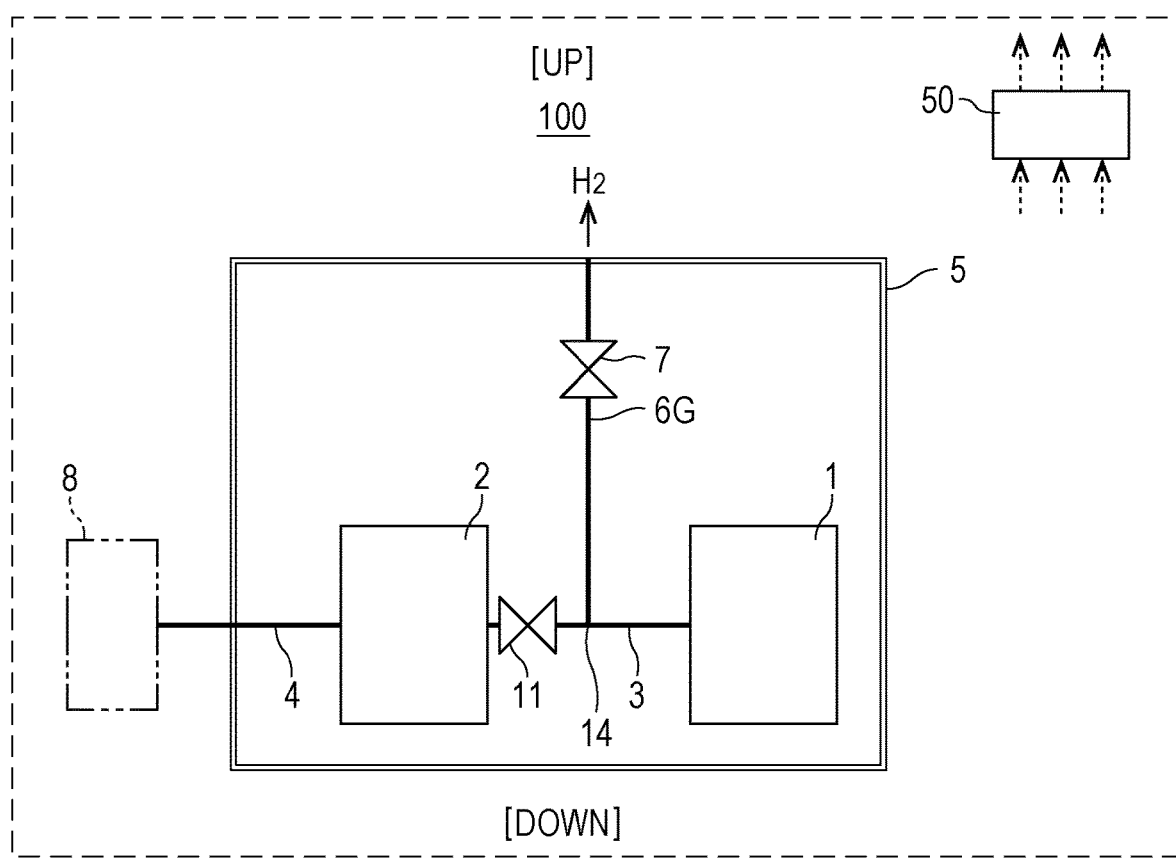
FIG. 12A is a drawing depicting an example of a hydrogen system of a tenth embodiment.

FIG. 12A is a drawing depicting an example of a hydrogen system of a tenth embodiment.

In the example depicted in FIG. 12A, the hydrogen system 100 includes the hydrogen production apparatus 1, the hydrogen storage apparatus 2, the first flow path 3, the second flow path 4, the casing 5, a third flow path 6G, the first valve 7, the second valve 11, and the controller 50.

Here, the hydrogen production apparatus 1, the hydrogen storage apparatus 2, the first flow path 3, the second flow path 4, the casing 5, and the first valve 7 are similar to those in the first embodiment and therefore will not be described. The second valve 11 is similar to that in the first working example of the fourth embodiment and therefore will not be described.

In the hydrogen system 100 of the present embodiment, the third flow path 6G is a flow path that branches from the first flow path 3 between the second valve 11 and the hydrogen production apparatus 1. It should be noted that, here, the downstream end of the third flow path 6G is connected to the upper surface of the casing 5, but there is no restriction thereto. The downstream end of the third flow path 6G may be connected to any location of the casing 5.

The controller 50 opens the first valve 7 and the second valve 11, for example. That is, it is preferable for the first valve 7 and the second valve 11 to be opened for hydrogen to be discharged outside the casing 5 from inside the hydrogen production apparatus 1 and inside the hydrogen storage apparatus 2. At such time, the operation of the hydrogen production apparatus 1 may be stopped. Thereafter, by closing the first valve 7, the operation of the hydrogen system 100 may be resumed at an appropriate time.

It should be noted that the necessity of opening the first valve 7 and the second valve 11 increases in a case where a hydrogen leak inside the casing 5 has been detected, a case where maintenance of the hydrogen system 100 is to be carried out, or the like, but there is not restriction thereto. The case of the former will be described using a working example.

As mentioned above, in the hydrogen system 100 of the present embodiment, by opening the first valve 7 and the second valve 11, hydrogen can be discharged outside the casing 5 from inside the hydrogen production apparatus 1 and inside the hydrogen storage apparatus 2 in an appropriate manner compared to a conventional hydrogen system.

The controller 50 closes the second valve 11 together with opening the first valve 7, for example. That is, it is preferable to close the second valve 11 together with opening the first valve 7 for hydrogen to be discharged outside the casing 5 from inside the hydrogen production apparatus 1. At such time, the operation of the hydrogen production apparatus 1 may be stopped. Thereafter, by opening the second valve 11 together with closing the first valve 7, the operation of the hydrogen system 100 may be resumed at an appropriate time.

It should be noted that the necessity of closing the second valve 11 together with opening the first valve 7 increases in a case where a hydrogen leak inside the casing 5 has been detected, a case where maintenance of the hydrogen system 100 is to be carried out, or the like, but there is not restriction thereto. The case of the former will be described using a modified example.

As mentioned above, in the hydrogen system 100 of the present embodiment, by opening the first valve 7, hydrogen can be discharged outside the casing 5 from inside the hydrogen production apparatus 1 in an appropriate manner compared to a conventional hydrogen system. It should be noted that, at such time, communication between inside the hydrogen storage apparatus 2 and outside the casing 5 is blocked by the second valve 11, and therefore the hydrogen inside the hydrogen storage apparatus 2 is not discharged outside the casing via the third flow path 6G.

Except for the aforementioned feature, the hydrogen system 100 of the present embodiment may be similar to the hydrogen system 100 of any of the first to fourth embodiments, the first and second working examples of the fourth embodiment, the modified example of the fourth embodiment, and the fifth to ninth embodiments.

WORKING EXAMPLE

The hydrogen system 100 of the present working example is similar to the hydrogen system 100 of the tenth embodiment except for the inclusion of the detector 9 that detects a hydrogen leak inside the casing 5 and the control content of the controller 50 described hereinafter. It should be noted that the detector 9 is similar to that in the second embodiment and therefore will not be described.

If a hydrogen leak is detected by the detector 9, the controller 50 opens the first valve 7 and the second valve 11.

Hereinafter, an example of the operation of the hydrogen system 100 of the working example of the present embodiment will be described in detail.

FIG. 12B is a flowchart depicting an example of the operation of a hydrogen system of the working example of the tenth embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

The first valve 7 is closed and the second valve 11 is open during operation of the hydrogen system 100. Then, during operation of the hydrogen system 100, hydrogen produced by the hydrogen production apparatus 1 is supplied to the hydrogen storage apparatus 2 via the first flow path 3 and temporarily stored in the hydrogen storage apparatus 2.

Here, in step S1201, it is determined whether or not a hydrogen leak has been detected by the detector 9.

If a hydrogen leak is not detected by the detector 9 ("no" in step S1201), the present state is maintained.

If a hydrogen leak has been detected by the detector 9 ("yes" in step S1201), in step S1202, the first valve 7 and the second valve 11 are opened. During operation of the hydrogen system 100, the first valve 7 is closed and the second valve 11 is open, and therefore, in step S1202, the open/closed state of the first valve 7 is switched from closed to open and the open/closed state of the second valve 11 is maintained as it is. Thus, hydrogen can be discharged outside the casing 5 from the first flow path 3 via the third flow path 6G. It should be noted that the booster 30 (see FIG. 10) may be activated when the first valve 7 and the second valve 11 are open. Furthermore, at such time, the operation of the hydrogen production apparatus 1 is stopped.

The detector 9 used in step S1201 may be a hydrogen sensor provided inside the casing 5, or may be a pressure gauge provided in a flow path in which hydrogen inside the casing 5 is present. In a case where this detector 9 is the former hydrogen sensor, it is possible to know that a hydrogen leak has occurred inside the casing 5 due to the hydrogen concentration in the air inside the casing 5 entering within a hydrogen concentration range that can be detected by this sensor. In a case where the detector 9 is the latter pressure gauge, it is possible to indirectly know that a hydrogen leak has occurred inside the casing 5 due to the pressure detected by the pressure gauge decreasing by a predetermined value or more.

Next, in step S1203, it is once again determined whether or not a hydrogen leak has been detected by the detector 9.

If a hydrogen leak has been detected by the detector 9 ("yes" in step S1203), the present state is maintained.

If a hydrogen leak is no longer detected by the detector 9 ("no" in step S1203), in step S1204, the first valve 7 is closed and the second valve 11 is opened. In step S1202, the first valve 7 and the second valve 11 are open, and therefore, in step S1204, the open/closed state of the first valve 7 is switched from open to closed and the open/closed state of the second valve 11 is maintained as it is.

The detector 9 used in step S1203 may be a hydrogen sensor provided inside the casing 5, or may be a pressure gauge provided in a flow path in which hydrogen inside the casing 5 is present. In a case where this detector 9 is the former hydrogen sensor, it is possible to know that a hydrogen leak inside the casing 5 has been eliminated due to the hydrogen concentration in the air inside the casing 5 no longer being within the aforementioned hydrogen concentration range. Consequently, in this case, once the hydrogen leak inside the casing 5 has stopped, the hydrogen concentration falls outside the aforementioned hydrogen concentration range after the inside of the casing 5 has been ventilated by an undepicted ventilator, and therefore, with a hydrogen sensor, compared to a pressure gauge, there is a possibility of there being a time lag to the hydrogen leak no longer being detected in the determination of step S1203. In a case where the detector 9 is the latter pressure gauge, it is possible to indirectly know that the hydrogen leak inside the casing 5 has been eliminated due to a pressure P detected by the pressure gauge reaching a predetermined pressure Pm. For example, it is preferable for the predetermined pressure Pm to be set to atmospheric pressure (for example, 0.1 MPa). That is, when the pressure P reaches atmospheric pressure, it may be determined that there is no hydrogen leak caused by a pressure difference (hereinafter, the pressure difference) between the spatial pressure (atmospheric pressure) inside the casing 5 and the pressure inside a region of the casing 5 in which hydrogen is present. The predetermined pressure Pm here is exemplary and is not restricted to the present example. It should be noted that, during operation of the hydrogen system 100, it is often the case that hydrogen is filled in a high pressure state in the hydrogen storage apparatus 2. Thus, in this case, the amount of strain caused by hydrogen gas pressure on the container surface of the hydrogen storage apparatus 2 correlates to the pressure P detected by the pressure gauge. Therefore, the determination as to whether this pressure P has reached the predetermined pressure Pm can also be estimated using the amount of strain measured by a strain gauge provided on the container surface of the hydrogen storage apparatus 2. It should be noted that, in a case where the booster 30 has been activated in step S1202, the operation of the booster 30 may be stopped in step S1204. Thereafter, the operation of the hydrogen system 100 may be resumed at an appropriate time.

As mentioned above, in the hydrogen system 100 of the present working example, hydrogen can be discharged from inside an apparatus to outside the casing 5 in an appropriate manner compared to a conventional hydrogen system. For example, by setting the open/closed states of the first valve 7 and the second valve 11 as appropriate, it becomes possible for hydrogen inside the hydrogen production apparatus 1 and inside the hydrogen storage apparatus 2 to be discharged outside the casing 5 at an appropriate time via the third flow path 6G. Specifically, in the hydrogen system 100 of the present working example, when a hydrogen leak has occurred inside the casing 5, hydrogen is discharged directly outside the casing 5 from the third flow path 6G, and therefore a hydrogen leak state can be promptly eliminated. Thus, the possibility of hydrogen igniting can be reduced.

Except for the aforementioned feature, the hydrogen system 100 of the present working example may be similar to the hydrogen system 100 of the tenth embodiment.

MODIFIED EXAMPLE

The hydrogen system 100 of the present modified example is similar to the hydrogen system 100 of the tenth embodiment except for the inclusion of the detector 9 that detects a hydrogen leak inside the casing 5 and the control content of the controller 50 described hereinafter. It should be noted that the detector 9 is similar to that in the second embodiment and therefore will not be described.

If a hydrogen leak is detected by the detector 9, the controller 50 closes the second valve 11 together with opening the first valve 7.

Hereinafter, an example of the operation of the hydrogen system 100 of the present modified example will be described in detail.

Figure 12C:
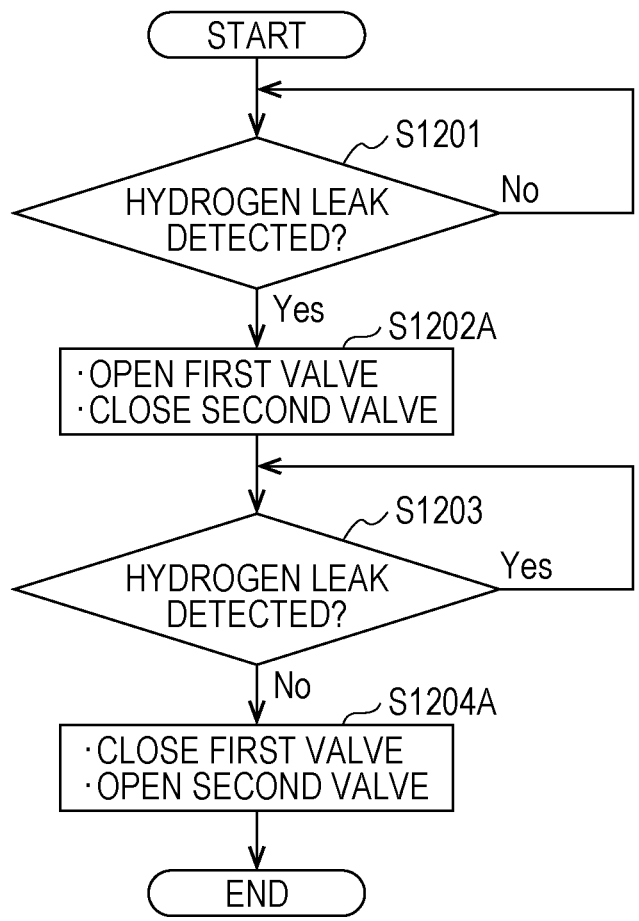
FIG. 12C is a flowchart depicting an example of the operation of a hydrogen system of a modified example of the tenth embodiment.

FIG. 12C is a flowchart depicting an example of the operation of the hydrogen system of the modified example of the tenth embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

Steps S1201 and S1203 in FIG. 12C are similar to steps S1201 and S1203 in FIG. 12B and therefore will not be described in detail.

The first valve 7 is closed and the second valve 11 is open during operation of the hydrogen system 100. Then, during operation of the hydrogen system 100, hydrogen produced by the hydrogen production apparatus 1 is supplied to the hydrogen storage apparatus 2 via the first flow path 3 and temporarily stored in the hydrogen storage apparatus 2.

Here, if a hydrogen leak has been detected by the detector 9 ("yes" in step S1201), in step S1202A, the first valve 7 is opened and the second valve 11 is closed. During operation of the hydrogen system 100, the first valve 7 is closed and the second valve 11 is open, and therefore, in step S1202A, the open/closed state of the first valve 7 is switched from closed to open and the open/closed state of the second valve 11 is switched from open to closed. Thus, hydrogen in the hydrogen production apparatus 1 can be discharged outside the casing 5 from the first flow path 3 via the third flow path 6G. It should be noted that the booster 30 (see FIG. 10) may be activated when the first valve 7 is open and the second valve 11 is closed. Furthermore, at such time, the operation of the hydrogen production apparatus 1 is stopped.

Next, if a hydrogen leak is no longer detected by the detector 9 ("no" in step S1203), in step S1204A, the first valve 7 is closed and the second valve 11 is opened. In step S1202A, the first valve 7 is opened and the second valve 11 is closed, and therefore, in step S1204A, the open/closed state of the first valve 7 is switched from open to closed and the open/closed state of the second valve 11 is switched from closed to open. It should be noted that, in a case where the booster 30 has been activated in step S1202A, the operation of the booster 30 may be stopped in step S1204A. Thereafter, the operation of the hydrogen system 100 may be resumed at an appropriate time.

As mentioned above, in the hydrogen system 100 of the present modified example, if a hydrogen leak occurs inside the casing 5, communication between inside the hydrogen storage apparatus 2 and outside the casing 5 is blocked by the second valve 11, and therefore the hydrogen inside the hydrogen storage apparatus 2 is not discharged outside the casing 5 via the third flow path 6G. That is, in the hydrogen system 100 of the present modified example, in recovery work carried out by a worker when a hydrogen leak has occurred inside the casing 5 from a region other than the hydrogen storage apparatus 2, the hydrogen inside the hydrogen storage apparatus 2 can be preserved.

Except for the aforementioned feature, the hydrogen system 100 of the present modified example may be similar to the hydrogen system 100 of the tenth embodiment.

Eleventh Embodiment

Figure 13A:
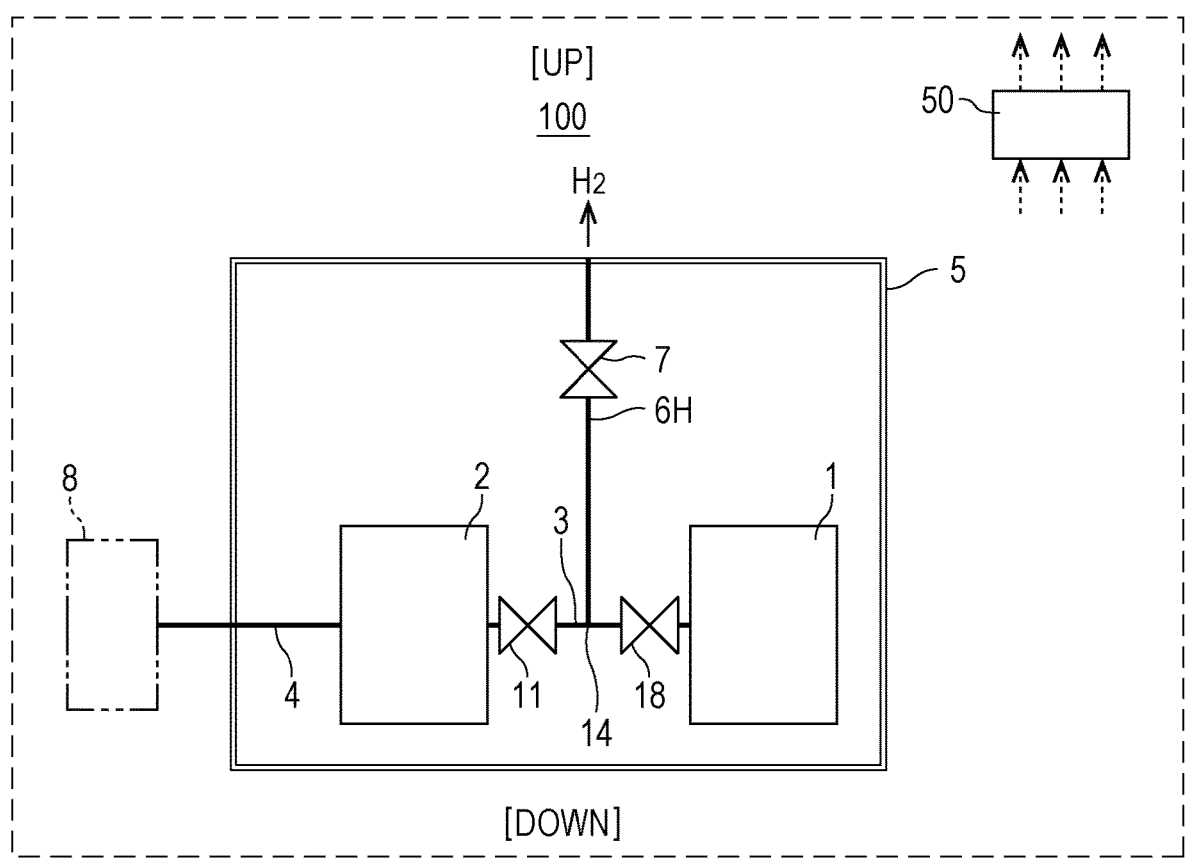
FIG. 13A is a drawing depicting an example of a hydrogen system of an eleventh embodiment.

FIG. 13A is a drawing depicting an example of a hydrogen system of an eleventh embodiment.

In the example depicted in FIG. 13A, the hydrogen system 100 includes the hydrogen production apparatus 1, the hydrogen storage apparatus 2, the first flow path 3, the second flow path 4, the casing 5, a third flow path 6H, the first valve 7, the second valve 11, the third valve 18, and the controller 50.

Here, the hydrogen production apparatus 1, the hydrogen storage apparatus 2, the first flow path 3, the second flow path 4, the casing 5, and the first valve 7 are similar to those in the first embodiment and therefore will not be described. The second valve 11 is similar to that in the first working example of the fourth embodiment and therefore will not be described. The third valve 18 is similar to that in the ninth embodiment and therefore will not be described.

In the hydrogen system 100 of the present embodiment, the third flow path 6H is a flow path that branches from the first flow path 3 between the second valve 11 and the third valve 18. It should be noted that, here, the downstream end of the third flow path 6H is connected to the upper surface of the casing 5, but there is no restriction thereto. The downstream end of the third flow path 6H may be connected to any location of the casing 5.

The controller 50 opens the first valve 7, the second valve 11, and the third valve 18, for example. That is, it is preferable for the first valve 7, the second valve 11, and the third valve 18 to be opened for hydrogen to be discharged outside the casing 5 from inside the hydrogen production apparatus 1 and inside the hydrogen storage apparatus 2. At such time, the operation of the hydrogen production apparatus 1 may be stopped. Thereafter, by closing the first valve 7, the operation of the hydrogen system 100 may be resumed at an appropriate time.

It should be noted that the necessity of opening the first valve 7, the second valve 11, and the third valve 18 increases in a case where a hydrogen leak inside the casing 5 has been detected, a case where maintenance of the hydrogen system 100 is to be carried out, or the like, but there is not restriction thereto. The case of the former will be described using a working example.

As mentioned above, in the hydrogen system 100 of the present embodiment, by opening the first valve 7, the second valve 11, and the third valve 18, hydrogen can be discharged outside the casing 5 from inside the hydrogen production apparatus 1 and inside the hydrogen storage apparatus 2 in an appropriate manner compared to a conventional hydrogen system.

The controller 50 closes the third valve 18 together with opening the first valve 7 and the second valve 11, for example. That is, it is preferable to close the third valve 18 together with opening the first valve 7 and the second valve 11 for hydrogen to be discharged outside the casing 5 from inside the hydrogen storage apparatus 2. At such time, the operation of the hydrogen production apparatus 1 may be stopped. Thereafter, by opening the third valve 18 together with closing the first valve 7, the operation of the hydrogen system 100 may be resumed at an appropriate time.

It should be noted that the necessity of closing the third valve 18 together with opening the first valve 7 and the second valve 11 increases in a case where a hydrogen leak inside the casing 5 has been detected, a case where maintenance of the hydrogen system 100 is to be carried out, or the like, but there is not restriction thereto. The case of the former will be described using a first modified example.

As mentioned above, in the hydrogen system 100 of the present embodiment, by opening the first valve 7 and the second valve 11, hydrogen can be discharged outside the casing from inside the hydrogen storage apparatus 2 in an appropriate manner compared to a conventional hydrogen system. It should be noted that, at such time, communication between inside the hydrogen production apparatus 1 and outside the casing 5 is blocked by the third valve 18, and therefore the hydrogen inside the hydrogen production apparatus 1 is not discharged outside the casing 5 via the third flow path 6H.

The controller 50 closes the second valve 11 together with opening the first valve 7 and the third valve 18, for example. That is, it is preferable to close the second valve 11 together with opening the first valve 7 and the third valve 18 for hydrogen to be discharged outside the casing 5 from inside the hydrogen production apparatus 1. Thereafter, by opening the second valve 11 together with closing the first valve 7, the operation of the hydrogen system 100 may be resumed at an appropriate time.

It should be noted that the necessity of closing the second valve 11 together with opening the first valve 7 and the third valve 18 increases in a case where a hydrogen leak inside the casing 5 has been detected, a case where maintenance of the hydrogen system 100 is to be carried out, or the like, but there is not restriction thereto. The case of the former will be described using a second modified example.

As mentioned above, in the hydrogen system 100 of the present embodiment, by opening the first valve 7 and the third valve 18, hydrogen can be discharged outside the casing 5 from inside the hydrogen production apparatus 1 in an appropriate manner compared to a conventional hydrogen system. It should be noted that, at such time, communication between inside the hydrogen storage apparatus 2 and outside the casing 5 is blocked by the second valve 11, and therefore the hydrogen inside the hydrogen storage apparatus 2 is not discharged outside the casing 5 via the third flow path 6H.

Except for the aforementioned feature, the hydrogen system 100 of the present embodiment may be similar to the hydrogen system 100 of any of the first to fourth embodiments, the first and second working examples of the fourth embodiment, the modified example of the fourth embodiment, the fifth to tenth embodiments, the working example of the tenth embodiment, and the modified example of the tenth embodiment.

WORKING EXAMPLE

The hydrogen system 100 of the present working example is similar to the hydrogen system 100 of the eleventh embodiment except for the inclusion of the detector 9 that detects a hydrogen leak inside the casing 5 and the control content of the controller 50 described hereinafter. It should be noted that the detector 9 is similar to that in the second embodiment and therefore will not be described.

If a hydrogen leak is detected by the detector 9, the controller 50 opens the first valve 7, the second valve 11, and the third valve 18.

Hereinafter, an example of the operation of the hydrogen system 100 of the present working example will be described in detail.

Figure 13B:
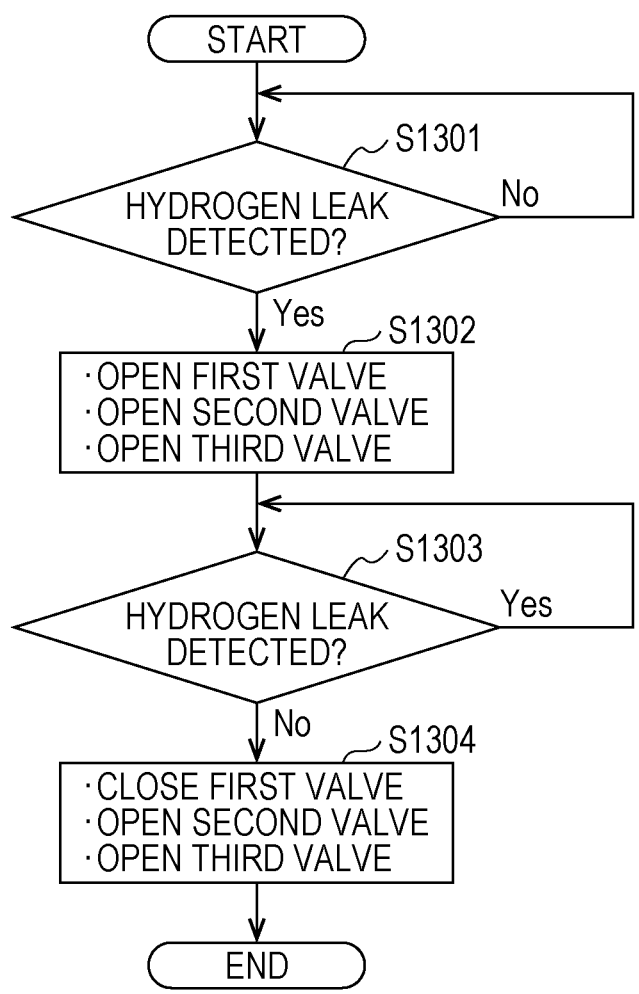
FIG. 13B is a flowchart depicting an example of the operation of a hydrogen system of a working example of the eleventh embodiment.

FIG. 13B is a flowchart depicting an example of the operation of the hydrogen system of a working example of the eleventh embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

Steps S1301 and S1303 in FIG. 13B are similar to steps S1201 and S1203 in FIG. 12B and therefore will not be described in detail.

The first valve 7 is closed and the second valve 11 and the third valve 18 are open during operation of the hydrogen system 100. Then, during operation of the hydrogen system 100, hydrogen produced by the hydrogen production apparatus 1 is supplied to the hydrogen storage apparatus 2 via the first flow path 3 and temporarily stored in the hydrogen storage apparatus 2.

Here, if a hydrogen leak has been detected by the detector 9 ("yes" in step S1301), in step S1302, the first valve 7, the second valve 11, and the third valve 18 are opened. During operation of the hydrogen system 100, the first valve 7 is closed and the second valve 11 and the third valve 18 are open, and therefore, in step S1302, the open/closed state of the first valve 7 is switched from closed to open and the open/closed states of the second valve 11 and the third valve 18 are maintained as they are. Thus, hydrogen inside the hydrogen production apparatus 1 and inside the hydrogen storage apparatus 2 can be discharged outside the casing 5 from the first flow path 3 via the third flow path 6H. It should be noted that the booster 30 (see FIG. 10) may be activated when the first valve 7, the second valve 11, and the third valve 18 are open. Furthermore, at such time, the operation of the hydrogen production apparatus 1 is stopped.

Next, if a hydrogen leak is no longer detected by the detector 9 ("no" in step S1303), in step S1304, the first valve 7 is closed and the second valve 11 and the third valve 18 are opened.

In step S1302, the first valve 7, the second valve 11, and the third valve 18 are open, and therefore, in step S1304, the open/closed state of the first valve 7 is switched from open to closed and the open/closed states of the second valve 11 and the third valve 18 are maintained as they are. It should be noted that, in a case where the booster 30 has been activated in step S1302, the operation of the booster 30 may be stopped in step S1304. Thereafter, the operation of the hydrogen system 100 may be resumed at an appropriate time.

As mentioned above, in the hydrogen system 100 of the present working example, hydrogen can be discharged from inside an apparatus to outside the casing 5 in an appropriate manner compared to a conventional hydrogen system. For example, by setting the open/closed states of the first valve 7, the second valve 11, and the third valve 18 as appropriate, it becomes possible for hydrogen inside the hydrogen production apparatus 1 and inside the hydrogen storage apparatus 2 to be discharged outside the casing 5 at an appropriate time via the third flow path 6H. Specifically, in the hydrogen system 100 of the present working example, when a hydrogen leak has occurred inside the casing 5, hydrogen is discharged directly outside the casing 5 from the third flow path 6H, and therefore a hydrogen leak state can be promptly eliminated. Thus, the possibility of hydrogen igniting can be reduced.

Except for the aforementioned feature, the hydrogen system 100 of the present working example may be similar to the hydrogen system 100 of the eleventh embodiment.

FIRST MODIFIED EXAMPLE

The hydrogen system 100 of the present modified example is similar to the hydrogen system 100 of the eleventh embodiment except for the inclusion of the detector 9 that detects a hydrogen leak inside the casing 5 and the control content of the controller 50 described hereinafter. It should be noted that the detector 9 is similar to that in the second embodiment and therefore will not be described.

If a hydrogen leak is detected by the detector 9, the controller 50 closes the third valve 18 together with opening the first valve 7 and the second valve 11.

Hereinafter, an example of the operation of the hydrogen system 100 of the present modified example will be described in detail.

Figure 13C:
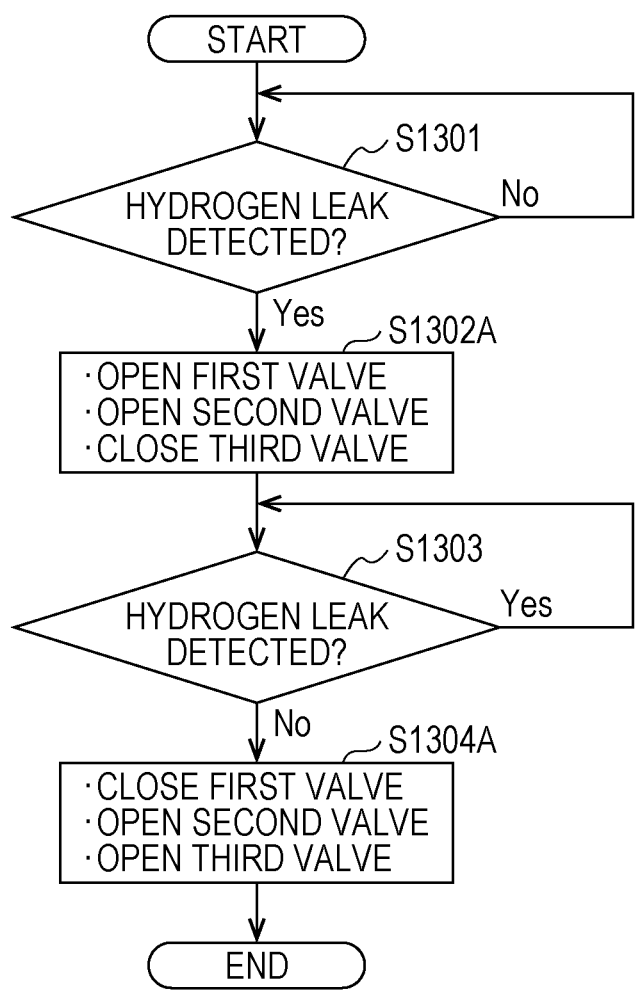
FIG. 13C is a flowchart depicting an example of the operation of a hydrogen system of a first modified example of the eleventh embodiment.

FIG. 13C is a flowchart depicting an example of the operation of the hydrogen system of a first modified example of the eleventh embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

Steps S1301 and S1303 in FIG. 13C are similar to steps S1201 and S1203 in FIG. 12B and therefore will not be described in detail.

The first valve 7 is closed and the second valve 11 and the third valve 18 are open during operation of the hydrogen system 100. Then, during operation of the hydrogen system 100, hydrogen produced by the hydrogen production apparatus 1 is supplied to the hydrogen storage apparatus 2 via the first flow path 3 and temporarily stored in the hydrogen storage apparatus 2.

Here, if a hydrogen leak has been detected by the detector 9 ("yes" in step S1301), in step S1302A, the first valve 7 and the second valve 11 are opened and the third valve 18 is closed.

During operation of the hydrogen system 100, the first valve 7 is closed and the second valve 11 and the third valve 18 are open, and therefore, in step S1302A, the open/closed state of the first valve 7 is switched from closed to open, the open/closed state of the third valve 18 is switched from open to closed, and the open/closed state of the second valve 11 is maintained as it is. Thus, hydrogen inside the hydrogen storage apparatus 2 can be discharged outside the casing 5 from the first flow path 3 via the third flow path 6H. It should be noted that, at such time, the operation of the booster 30 (see FIG. 10) and the hydrogen production apparatus 1 may be stopped.

Next, if a hydrogen leak is no longer detected by the detector 9 ("no" in step S1303), in step S1304A, the first valve 7 is closed and the second valve 11 and the third valve 18 are opened.

In step S1302A, the first valve 7 and the second valve 11 are open and the third valve 18 is closed, and therefore, in step S1304A, the open/closed state of the first valve 7 is switched from open to closed, and the open/closed state of the third valve 18 is switched from closed to open, and the open/closed state of the second valve 11 is maintained as it is. Thereafter, the operation of the hydrogen system 100 may be resumed at an appropriate time.

As mentioned above, in the hydrogen system 100 of the present modified example, if a hydrogen leak occurs inside the casing 5, communication between inside the hydrogen production apparatus 1 and outside the casing 5 is blocked by the third valve 18, and therefore the hydrogen inside the hydrogen production apparatus 1 is not discharged outside the casing 5 via the third flow path 6H. That is, in the hydrogen system 100 of the present modified example, in recovery work carried out by a worker when a hydrogen leak has occurred inside the casing 5 from a region other than the hydrogen production apparatus 1, the hydrogen inside the hydrogen production apparatus 1 can be preserved.

Except for the aforementioned feature, the hydrogen system 100 of the present modified example may be similar to the hydrogen system 100 of the eleventh embodiment.

SECOND MODIFIED EXAMPLE

The hydrogen system 100 of the present modified example is similar to the hydrogen system 100 of the eleventh embodiment except for the inclusion of the detector 9 that detects a hydrogen leak inside the casing 5 and the control content of the controller 50 described hereinafter. It should be noted that the detector 9 is similar to that in the second embodiment and therefore will not be described.

If a hydrogen leak is detected by the detector 9, the controller 50 closes the second valve 11 together with opening the first valve 7 and the third valve 18.

Hereinafter, an example of the operation of the hydrogen system 100 of the present modified example will be described in detail.

Figure 13D:
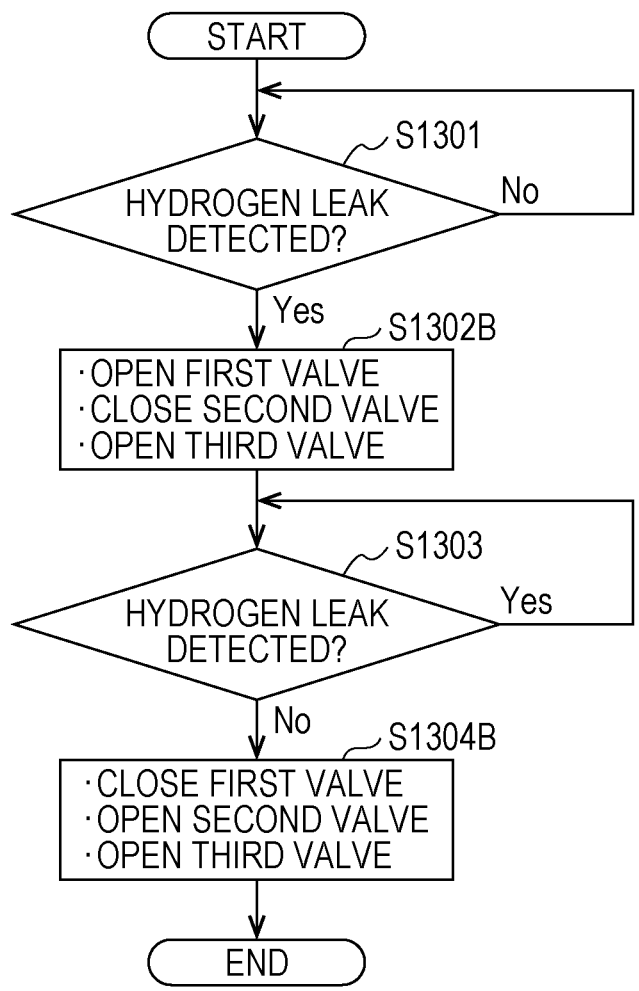
FIG. 13D is a flowchart depicting an example of the operation of a hydrogen system of a second modified example of the eleventh embodiment.

FIG. 13D is a flowchart depicting an example of the operation of the hydrogen system of a second modified example of the eleventh embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

Steps S1301 and S1303 in FIG. 13D are similar to steps S1201 and S1203 in FIG. 12B and therefore will not be described in detail.

The first valve 7 is closed and the second valve 11 and the third valve 18 are open during operation of the hydrogen system 100. Then, during operation of the hydrogen system 100, hydrogen produced by the hydrogen production apparatus 1 is supplied to the hydrogen storage apparatus 2 via the first flow path 3 and temporarily stored in the hydrogen storage apparatus 2.

Here, if a hydrogen leak has been detected by the detector 9 ("yes" in step S1301), in step S1302B, the first valve 7 and the third valve 18 are opened and the second valve 11 is closed.

During operation of the hydrogen system 100, the first valve 7 is closed and the second valve 11 and the third valve 18 are open, and therefore, in step S1302B, the open/closed state of the first valve 7 is switched from closed to open, the open/closed state of the second valve 11 is switched from open to closed, and the open/closed state of the third valve 18 is maintained as it is. Thus, hydrogen inside the hydrogen production apparatus 1 can be discharged outside the casing 5 from the first flow path 3 via the third flow path 6H. It should be noted that the booster 30 (see FIG. 10) may be activated when the second valve 11 is closed together with the first valve 7 and the third valve 18 being open. Furthermore, at such time, the operation of the hydrogen production apparatus 1 is stopped.

Next, if a hydrogen leak is no longer detected by the detector 9 ("no" in step S1303), in step S1304B, the first valve 7 is closed and the second valve 11 and the third valve 18 are opened.

In step S1302B, the first valve 7 and the third valve 18 are open and the second valve 11 is closed, and therefore, in step S1304B, the open/closed state of the first valve 7 is switched from open to closed, and the open/closed state of the second valve 11 is switched from closed to open, and the open/closed state of the third valve 18 is maintained as it is. It should be noted that, in a case where the booster 30 has been activated in step S1302B, the operation of the booster 30 may be stopped in step S1304B. Thereafter, the operation of the hydrogen system 100 may be resumed at an appropriate time.

As mentioned above, in the hydrogen system 100 of the present modified example, if a hydrogen leak occurs inside the casing 5, communication between inside the hydrogen storage apparatus 2 and outside the casing 5 is blocked by the second valve 11, and therefore the hydrogen inside the hydrogen storage apparatus 2 is not discharged outside the casing 5 via the third flow path 6H. That is, in the hydrogen system 100 of the present modified example, in recovery work carried out by a worker when a hydrogen leak has occurred inside the casing 5 from a region other than the hydrogen storage apparatus 2, the hydrogen inside the hydrogen storage apparatus 2 can be preserved.

Except for the aforementioned feature, the hydrogen system 100 of the present modified example may be similar to the hydrogen system 100 of the eleventh embodiment.

Twelfth Embodiment

Except for the control content of the controller 50 described hereinafter, the hydrogen system 100 of the present embodiment is similar to the hydrogen system 100 (FIG. 10) of the eighth embodiment.

The controller 50 activates the booster 30 when the first valve 7 is open.

Hereinafter, an example of the operation of the hydrogen system 100 of the present embodiment will be described in detail.

Figure 14:
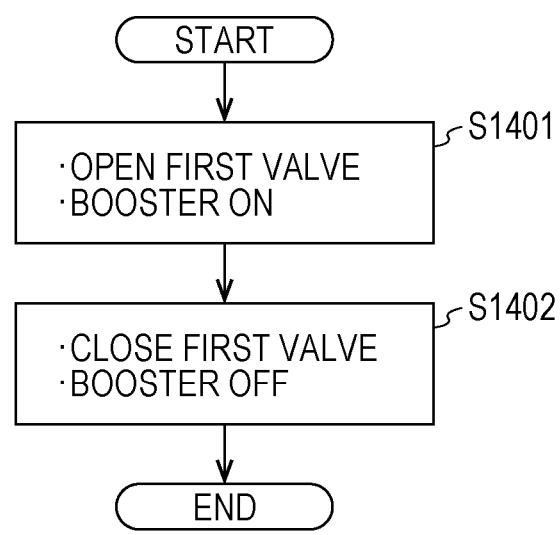
FIG. 14 is a flowchart depicting an example of the operation of a hydrogen system of a twelfth embodiment.

FIG. 14 is a flowchart depicting an example of the operation of the hydrogen system of the twelfth embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

The first valve 7 is closed during operation of the hydrogen system 100. Also, during operation of the hydrogen system 100, hydrogen produced by the hydrogen production apparatus 1 is pressurized by the booster 30 and supplied to the hydrogen storage apparatus 2. The high-pressure hydrogen supplied to the hydrogen storage apparatus 2 via the first flow path 3 is temporarily stored in the hydrogen storage apparatus 2.

Here, in step S1401, the first valve 7 is opened. Furthermore, in step S1401, the booster 30 is activated (on) when the first valve 7 is open. At such time, the operation of the hydrogen production apparatus 1 is stopped.

During operation of the hydrogen system 100, the booster 30 is activated together with the first valve 7 being closed, and therefore, in step S1401, the operating state of the booster 30 is maintained as it is together with the open/closed state of the first valve 7 being switched from closed to open. Thus, hydrogen can be discharged outside the casing 5 from the first flow path 3 via the third flow path 6E. Furthermore, hydrogen inside the hydrogen production apparatus 1 can be fed to the third flow path 6E by means of the pressurizing operation of the booster 30.

Next, in step S1402, the first valve 7 is closed. Furthermore, in step S1402, the operation of the booster 30 is stopped (off). In step S1401, the booster 30 is activated together with the first valve 7 being opened, and therefore, in step S1402, the operating state of the booster 30 is switched from on to off together with the open/closed state of the first valve 7 being switched from open to closed. Thereafter, the operation of the hydrogen system 100 may be resumed at an appropriate time.

As mentioned above, in the hydrogen system 100 of the present embodiment, when the first valve 7 is opened, hydrogen inside the hydrogen production apparatus 1 can be discharged outside the casing 5 via the third flow path 6E in an appropriate manner by means of the pressurizing operation of the booster 30. Thus, a worker is able to carry out maintenance work or the like for the hydrogen production apparatus 1 quickly and easily.

Except for the aforementioned feature, the hydrogen system 100 of the present embodiment may be similar to the hydrogen system 100 of the eighth embodiment.

Thirteenth Embodiment

Figure 15A:
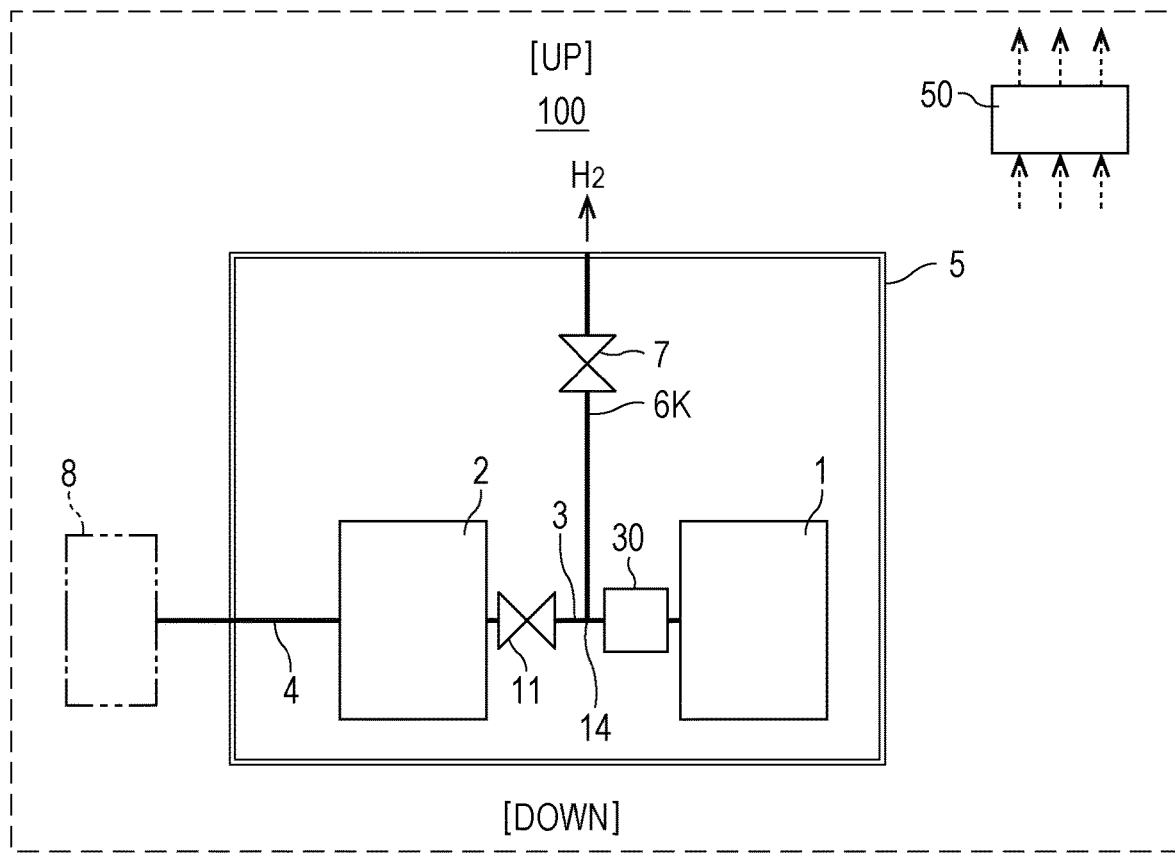
FIG. 15A is a drawing depicting an example of a hydrogen system of a thirteenth embodiment.

FIG. 15A is a drawing depicting an example of a hydrogen system of a thirteenth embodiment.

In the example depicted in FIG. 15A, the hydrogen system 100 includes the hydrogen production apparatus 1, the hydrogen storage apparatus 2, the first flow path 3, the second flow path 4, the casing 5, a third flow path 6K, the first valve 7, the second valve 11, the booster 30, and the controller 50.

Here, the hydrogen production apparatus 1, the hydrogen storage apparatus 2, the first flow path 3, the second flow path 4, the casing 5, and the first valve 7 are similar to those in the first embodiment and therefore will not be described. The booster 30 is similar to that in the eighth embodiment and therefore will not be described. The second valve 11 is similar to that in the first working example of the fourth embodiment and therefore will not be described.

In the hydrogen system 100 of the present embodiment, the third flow path 6K is a flow path that branches from the first flow path 3 downstream from the booster 30, and the booster 30 is provided in the first flow path 3 between the hydrogen production apparatus 1 and the branching location 14. That is, the upstream end of the third flow path 6K is connected to the first flow path 3 between the second valve 11 and the booster 30. It should be noted that, here, the downstream end of the third flow path 6K is connected to the upper surface of the casing 5, but there is no restriction thereto. The downstream end of the third flow path 6K may be connected to any location of the casing 5.

Furthermore, the controller 50 activates the booster 30 when the first valve 7 and the second valve 11 are open.

Hereinafter, an example of the operation of the hydrogen system 100 of the present embodiment will be described in detail.

Figure 15B:
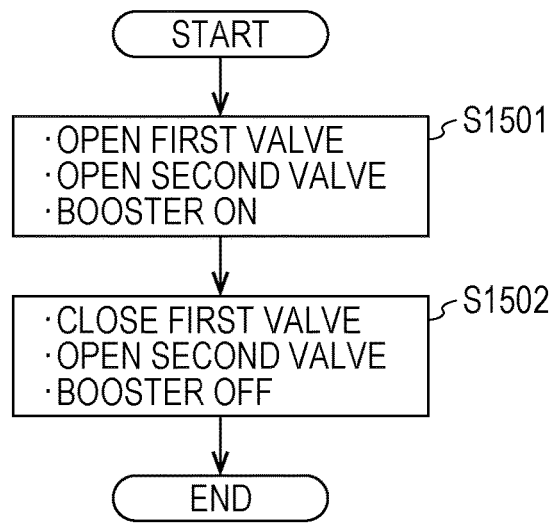
FIG. 15B is a flowchart depicting an example of the operation of the hydrogen system of the thirteenth embodiment.

FIG. 15B is a flowchart depicting an example of the operation of the hydrogen system of the thirteenth embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

The first valve 7 is closed and the second valve 11 is open during operation of the hydrogen system 100. Also, during operation of the hydrogen system 100, hydrogen produced by the hydrogen production apparatus 1 is pressurized by the booster 30 and supplied to the hydrogen storage apparatus 2. The high-pressure hydrogen supplied to the hydrogen storage apparatus 2 via the first flow path 3 is temporarily stored in the hydrogen storage apparatus 2.

Here, in step S1501, the first valve 7 and the second valve 11 are opened. Furthermore, in step S1501, the booster 30 is activated (on) when the first valve 7 and the second valve 11 are open. At such time, the operation of the hydrogen production apparatus 1 is stopped.

During operation of the hydrogen system 100, the booster 30 is activated together with the first valve 7 being closed and the second valve 11 being opened, and therefore, in step S1501, the operating state of the booster 30 is maintained as it is together with the open/closed state of the first valve 7 being switched from closed to open and the open/closed state of the second valve 11 being maintained as it is. Thus, hydrogen inside the hydrogen production apparatus 1 and inside the hydrogen storage apparatus 2 can be discharged outside the casing 5 from the first flow path 3 via the third flow path 6K. Furthermore, hydrogen inside the hydrogen production apparatus 1 can be fed to the third flow path 6K by means of the pressurizing operation of the booster 30.

Next, in step S1502, the first valve 7 is closed and the second valve 11 is opened. Furthermore, in step S1502, the operation of the booster 30 is stopped (off). In step S1501, the booster 30 is activated together with the first valve 7 and the second valve 11 being opened, and therefore, in step S1502, the operating state of the booster 30 is switched from on to off together with the open/closed state of the first valve 7 being switched from open to closed and the open/closed state of the second valve 11 being maintained as it is. Thereafter, the operation of the hydrogen system 100 may be resumed at an appropriate time.

As mentioned above, in the hydrogen system 100 of the present embodiment, when the first valve 7 and the second valve 11 are opened, hydrogen inside the hydrogen production apparatus 1 can be discharged outside the casing 5 via the third flow path 6K in an appropriate manner by means of the pressurizing operation of the booster 30. Thus, a worker is able to carry out maintenance work or the like for the hydrogen production apparatus 1 quickly and easily.

Except for the aforementioned feature, the hydrogen system 100 of the present embodiment may be similar to the hydrogen system 100 of any of the first to fourth embodiments, the first and second working examples of the fourth embodiment, the modified example of the fourth embodiment, the fifth to tenth embodiments, the modified example of the tenth embodiment, the eleventh embodiment, the first and second modified examples of the eleventh embodiment, and the twelfth embodiment.

MODIFIED EXAMPLE

Except for the control content of the controller 50 described hereinafter, the hydrogen system 100 of the present modified example is similar to the hydrogen system 100 of the thirteenth embodiment.

The controller 50 activates the booster 30 when the first valve 7 is open and the second valve 11 is closed.

Hereinafter, an example of the operation of the hydrogen system 100 of the present embodiment will be described in detail.

Figure 15C:
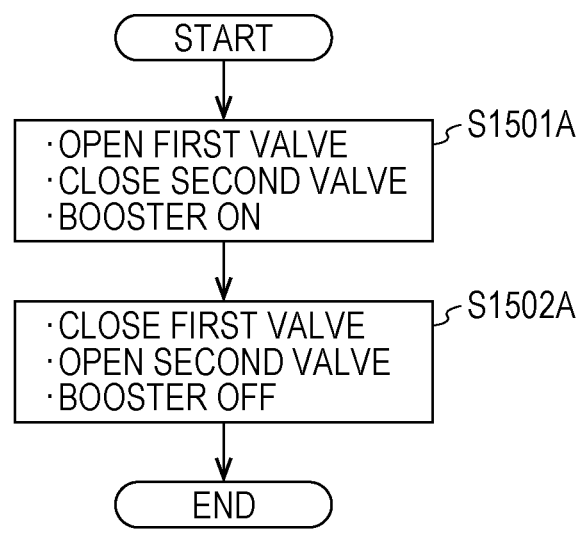
FIG. 15C is a flowchart depicting an example of the operation of a hydrogen system of a modified example of the thirteenth embodiment.

FIG. 15C is a flowchart depicting an example of the operation of the hydrogen system of a modified example of the thirteenth embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

The first valve 7 is closed and the second valve 11 is open during operation of the hydrogen system 100. Also, during operation of the hydrogen system 100, hydrogen produced by the hydrogen production apparatus 1 is pressurized by the booster 30 and supplied to the hydrogen storage apparatus 2. The high-pressure hydrogen supplied to the hydrogen storage apparatus 2 via the first flow path 3 is temporarily stored in the hydrogen storage apparatus 2.

Here, in step S1501A, the first valve 7 is opened and the second valve 11 is closed. Furthermore, in step S1501A, the booster 30 is activated (on) when the first valve 7 is opened and the second valve 11 is closed. At such time, the operation of the hydrogen production apparatus 1 is stopped.

During operation of the hydrogen system 100, the booster 30 is activated together with the first valve 7 being closed and the second valve 11 being opened, and therefore, in step S1501A, the operating state of the booster 30 is maintained as it is together with the open/closed state of the first valve 7 being switched from closed to open and the open/closed state of the second valve 11 being switched from open to closed. Thus, hydrogen inside the hydrogen production apparatus 1 can be discharged outside the casing 5 from the first flow path 3 via the third flow path 6K. Furthermore, hydrogen inside the hydrogen production apparatus 1 can be fed to the third flow path 6K by means of the pressurizing operation of the booster 30.

Next, in step S1502A, the first valve 7 is closed and the second valve 11 is opened. Furthermore, in step S1502A, the operation of the booster 30 is stopped (off).

In step S1501A, the booster 30 is activated together with the first valve 7 being opened and the second valve 11 being closed, and therefore, in step S1502A, the operating state of the booster 30 is switched from on to off together with the open/closed state of the first valve 7 being switched from open to closed and the open/closed state of the second valve 11 being switched from closed to open. Thereafter, the operation of the hydrogen system 100 may be resumed at an appropriate time.

As mentioned above, in the hydrogen system 100 of the present modified example, when the first valve 7 is opened due to maintenance of the hydrogen production apparatus 1 or the like, hydrogen inside the hydrogen production apparatus 1 can be discharged outside the casing 5 via the third flow path 6K in an appropriate manner by means of the pressurizing operation of the booster 30. Furthermore, when the first valve 7 is opened, in a case where maintenance of the hydrogen storage apparatus 2 is not necessary, communication between inside the hydrogen storage apparatus 2 and outside the casing 5 is blocked by the second valve 11, and therefore the hydrogen inside the hydrogen storage apparatus 2 can be preserved.

Except for the aforementioned feature, the hydrogen system 100 of the present modified example may be similar to the hydrogen system 100 of the thirteenth embodiment.

Fourteenth Embodiment

Figure 16A:
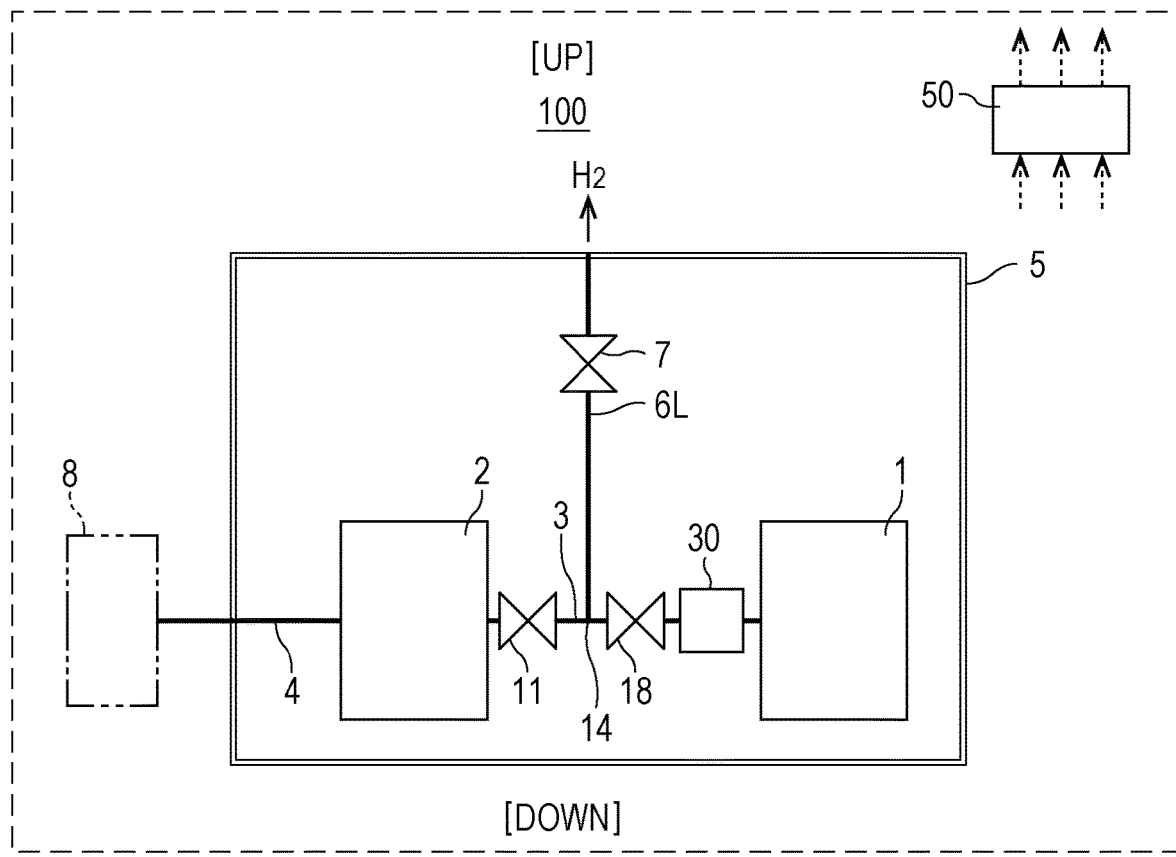
FIG. 16A is a drawing depicting an example of a hydrogen system of a fourteenth embodiment.

FIG. 16A is a drawing depicting an example of a hydrogen system of a fourteenth embodiment.

In the example depicted in FIG. 16A, the hydrogen system 100 includes the hydrogen production apparatus 1, the hydrogen storage apparatus 2, the first flow path 3, the second flow path 4, the casing 5, a third flow path 6L, the first valve 7, the second valve 11, the third valve 18, the booster 30, and the controller 50.

Here, the hydrogen production apparatus 1, the hydrogen storage apparatus 2, the first flow path 3, the second flow path 4, the casing 5, and the first valve 7 are similar to those in the first embodiment and therefore will not be described. The booster 30 is similar to that in the eighth embodiment and therefore will not be described. The second valve 11 is similar to that in the first working example of the fourth embodiment and therefore will not be described. The third valve 18 is similar to that in the ninth embodiment and therefore will not be described.

In the hydrogen system 100 of the present embodiment, the third flow path 6L is a flow path that branches from the first flow path 3 downstream from the booster 30, and the third valve 18 is provided in the first flow path 3 between the booster 30 and the branching location 14 to the third flow path 6L. That is, the booster 30 is provided in the first flow path 3 between the hydrogen production apparatus 1 and the third valve 18.

Furthermore, the controller 50 activates the booster 30 when the first valve 7, the second valve 11, and the third valve 18 are open.

It should be noted that, here, the downstream end of the third flow path 6L is connected to the upper surface of the casing 5, but there is no restriction thereto. The downstream end of the third flow path 6L may be connected to any location of the casing 5.

Hereinafter, an example of the operation of the hydrogen system 100 of the present embodiment will be described in detail.

Figure 16B:
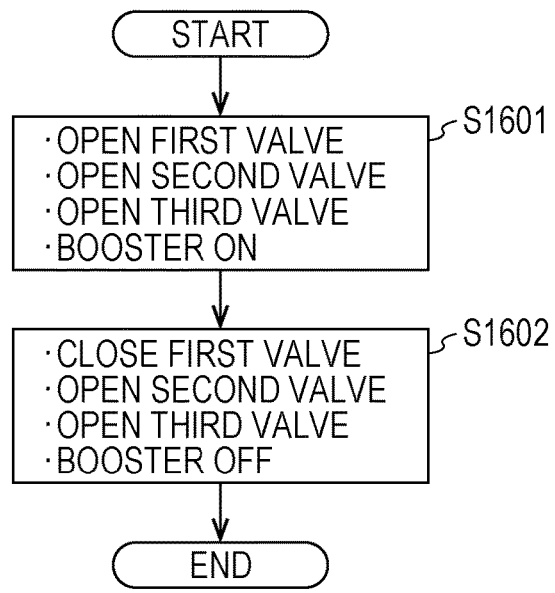
FIG. 16B is a flowchart depicting an example of the operation of the hydrogen system of the fourteenth embodiment.

FIG. 16B is a flowchart depicting an example of the operation of the hydrogen system of the fourteenth embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

The first valve 7 is closed and the second valve 11 and the third valve 18 are open during operation of the hydrogen system 100. Also, during operation of the hydrogen system 100, hydrogen produced by the hydrogen production apparatus 1 is pressurized by the booster 30 and supplied to the hydrogen storage apparatus 2. The high-pressure hydrogen supplied to the hydrogen storage apparatus 2 via the first flow path 3 is temporarily stored in the hydrogen storage apparatus 2.

Here, in step S1601, the first valve 7, the second valve 11, and the third valve 18 are opened. Furthermore, in step S1601, the booster 30 is activated (on) when the first valve 7, the second valve 11, and the third valve 18 are open. At such time, the operation of the hydrogen production apparatus 1 is stopped.

During operation of the hydrogen system 100, the booster 30 is activated together with the first valve 7 being closed and the second valve 11 and the third valve 18 being opened, and therefore, in step S1601, the operating state of the booster 30 is maintained as it is together with the open/closed state of the first valve 7 being switched from closed to open and the open/closed states of the second valve 11 and the third valve 18 being maintained as they are. Thus, hydrogen inside the hydrogen production apparatus 1 and inside the hydrogen storage apparatus 2 can be discharged outside the casing 5 from the first flow path 3 via the third flow path 6L. Furthermore, hydrogen inside the hydrogen production apparatus 1 can be fed to the third flow path 6L by means of the pressurizing operation of the booster 30.

Next, in step S1602, the first valve 7 is closed, and the second valve 11 and the third valve 18 are opened. Furthermore, in step S1602, the operation of the booster 30 is stopped (off). In step S1601, the booster 30 is activated together with the first valve 7, the second valve 11, and the third valve 18 being opened, and therefore, in step S1602, the operating state of the booster 30 is switched from on to off together with the open/closed state of the first valve 7 being switched from open to closed and the open/closed states of the second valve 11 and the third valve 18 being maintained as they are. Thereafter, the operation of the hydrogen system 100 may be resumed at an appropriate time.

As mentioned above, in the hydrogen system 100 of the present embodiment, when the first valve 7, the second valve 11, and the third valve 18 are opened, hydrogen inside the hydrogen production apparatus 1 can be discharged outside the casing 5 via the third flow path 6L in an appropriate manner by means of the pressurizing operation of the booster 30. Thus, a worker is able to carry out maintenance work or the like for the hydrogen production apparatus 1 quickly and easily.

Except for the aforementioned feature, the hydrogen system 100 of the present embodiment may be similar to the hydrogen system 100 of any of the first to fourth embodiments, the first and second working examples of the fourth embodiment, the modified example of the fourth embodiment, the fifth to tenth embodiments, the modified example of the tenth embodiment, the eleventh embodiment, the first and second modified examples of the eleventh embodiment, the twelfth embodiment, the thirteenth embodiment, and the modified example of the thirteenth embodiment.

FIRST MODIFIED EXAMPLE

Except for the control content of the controller 50 described hereinafter, the hydrogen system 100 of the present modified example is similar to the hydrogen system 100 of the fourteenth embodiment.

The controller 50 does not activate the booster 30 when the third valve 18 is closed together with the first valve 7 and the second valve 11 being open.

Hereinafter, an example of the operation of the hydrogen system 100 of the present embodiment will be described in detail.

Figure 16C:
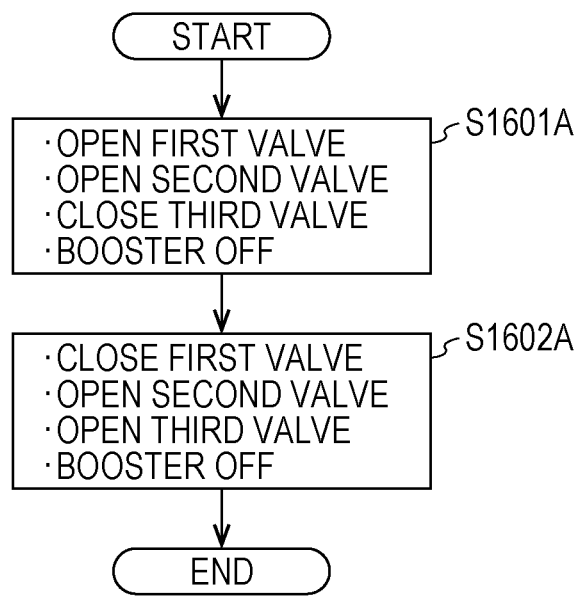
FIG. 16C is a flowchart depicting an example of the operation of a hydrogen system of a first modified example of the fourteenth embodiment.

FIG. 16C is a flowchart depicting an example of the operation of a hydrogen system of a first modified example of the fourteenth embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

The first valve 7 is closed and the second valve 11 and the third valve 18 are open during operation of the hydrogen system 100. Also, during operation of the hydrogen system 100, hydrogen produced by the hydrogen production apparatus 1 is pressurized by the booster 30 and supplied to the hydrogen storage apparatus 2. The high-pressure hydrogen supplied to the hydrogen storage apparatus 2 via the first flow path 3 is temporarily stored in the hydrogen storage apparatus 2.

Here, in step S1601A, the first valve 7 and the second valve 11 are opened and the third valve 18 is closed. Furthermore, in step S1601A, the booster 30 is not activated (off) when the first valve 7 and the second valve 11 are opened and the third valve 18 is closed. That is, the operation of the booster 30 is stopped. At such time, the operation of the hydrogen production apparatus 1 is also stopped.

During operation of the hydrogen system 100, the booster 30 is activated together with the first valve 7 being closed and the second valve 11 and the third valve 18 being opened, and therefore, in step S1601A, the operating state of the booster 30 is switched from on to off together with the open/closed state of the first valve 7 being switched from closed to open, the open/closed state of the third valve 18 being switched from open to closed, and the open/closed state of the second valve 11 being maintained as it is. Thus, hydrogen inside the hydrogen storage apparatus 2 can be discharged outside the casing 5 from the first flow path 3 via the third flow path 6L.

Next, in step S1602A, the first valve 7 is closed, and the second valve 11 and the third valve 18 are opened. Furthermore, in step S1602A, the booster 30 is not activated (off). In step S1601A, the operation of the booster 30 is stopped together with the first valve 7 and the second valve 11 being opened and the third valve 18 being closed, and therefore, in step S1602A, the operating state of the booster 30 is maintained as it is together with the open/closed state of the first valve 7 being switched from open to closed, the open/closed state of the third valve 18 being switched from closed to open, and the open/closed state of the second valve 11 being maintained as it is. Thereafter, the operation of the hydrogen system 100 may be resumed at an appropriate time.

As mentioned above, in the hydrogen system 100 of the present modified example, when the third valve 18 is closed due to maintenance of the hydrogen storage apparatus 2 or the like, the possibility of the booster 30 provided between the hydrogen production apparatus 1 and the third valve 18 being damaged can be reduced by not activating the booster 30. Furthermore, it is possible to reduce the power required for the operation of the booster 30.

Except for the aforementioned feature, the hydrogen system 100 of the present modified example may be similar to the hydrogen system 100 of the fourteenth embodiment.

SECOND MODIFIED EXAMPLE

Except for the control content of the controller 50 described hereinafter, the hydrogen system 100 of the present modified example is similar to the hydrogen system 100 of the fourteenth embodiment.

The controller 50 activates the booster 30 when the second valve 11 is closed together with the first valve 7 and the third valve 18 being open.

Hereinafter, an example of the operation of the hydrogen system 100 of the present embodiment will be described in detail.

Figure 16D:
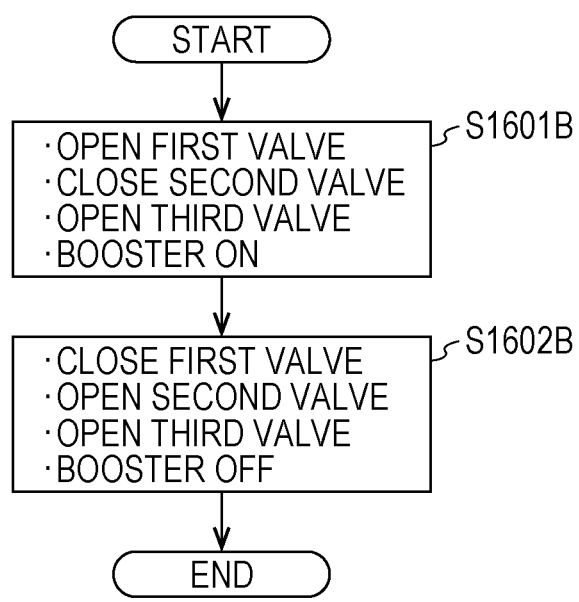
FIG. 16D is a flowchart depicting an example of the operation of a hydrogen system of a second modified example of the fourteenth embodiment.

FIG. 16D is a flowchart depicting an example of the operation of the hydrogen system of a second modified example of the fourteenth embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

The first valve 7 is closed and the second valve 11 and the third valve 18 are open during operation of the hydrogen system 100. Also, during operation of the hydrogen system 100, hydrogen produced by the hydrogen production apparatus 1 is pressurized by the booster 30 and supplied to the hydrogen storage apparatus 2. The high-pressure hydrogen supplied to the hydrogen storage apparatus 2 via the first flow path 3 is temporarily stored in the hydrogen storage apparatus 2.

Here, in step S1601B, the first valve 7 and the third valve 18 are opened and the second valve 11 is closed. Furthermore, in step S1601AB, the booster 30 is activated (on) when the first valve 7 and the third valve 18 are opened and the second valve 11 is closed. At such time, the operation of the hydrogen production apparatus 1 is stopped.

During operation of the hydrogen system 100, the booster 30 is activated together with the first valve 7 being closed and the second valve 11 and the third valve 18 being opened, and therefore, in step S1601B, the operating state of the booster 30 is maintained as it is together with the open/closed state of the first valve 7 being switched from closed to open, the open/closed state of the second valve 11 being switched from open to closed, and the open/closed state of the third valve 18 being maintained as it is. Thus, hydrogen inside the hydrogen production apparatus 1 can be discharged outside the casing 5 from the first flow path 3 via the third flow path 6L.

Next, in step S1602B, the first valve 7 is closed, and the second valve 11 and the third valve 18 are opened. Furthermore, in step S1602B, the operation of the booster 30 is stopped (off).

In step S1601B, the booster 30 is activated together with the first valve 7 and the third valve 18 being opened and the second valve 11 being closed, and therefore, in step S1602B, the operating state of the booster 30 is switched from on to off together with the open/closed state of the first valve 7 being switched from open to closed, the open/closed state of the second valve 11 being switched from closed to open, and the open/closed state of the third valve 18 being maintained as it is. Thereafter, the operation of the hydrogen system 100 may be resumed at an appropriate time.

As mentioned above, in the hydrogen system 100 of the present modified example, when the first valve 7 and the third valve 18 are opened due to maintenance of the hydrogen production apparatus 1 or the like, hydrogen inside the hydrogen production apparatus 1 can be discharged outside the casing 5 via the third flow path 6L in an appropriate manner by means of the pressurizing operation of the booster 30. Furthermore, when the first valve 7 and the third valve 18 are opened, in a case where maintenance or the like of the hydrogen storage apparatus 2 is not necessary, communication between inside the hydrogen storage apparatus 2 and outside the casing 5 is blocked by the second valve 11, and therefore the hydrogen inside the hydrogen storage apparatus 2 can be preserved.

Except for the aforementioned feature, the hydrogen system 100 of the present modified example may be similar to the hydrogen system 100 of the first modified example of the fourteenth embodiment.

Fifteenth Embodiment

Figure 17A:
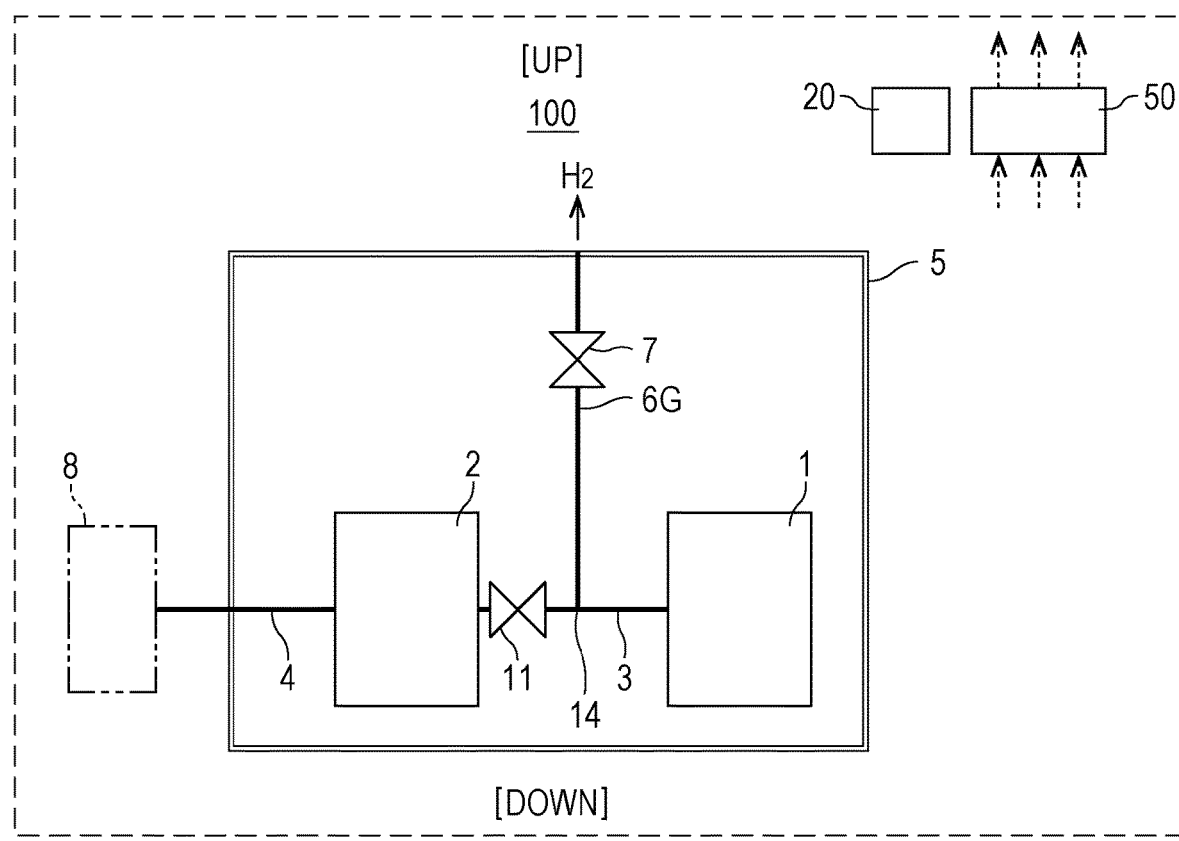
FIG. 17A is a drawing depicting an example of a hydrogen system of a fifteenth embodiment.

FIG. 17A is a drawing depicting an example of a hydrogen system of a fifteenth embodiment.

In the example depicted in FIG. 17A, the hydrogen system 100 includes the hydrogen production apparatus 1, the hydrogen storage apparatus 2, the first flow path 3, the second flow path 4, the casing 5, a third flow path 6G, the first valve 7, the second valve 11, a receiver 20, and the controller 50.

Here, the hydrogen production apparatus 1, the hydrogen storage apparatus 2, the first flow path 3, the second flow path 4, the casing 5, and the first valve 7 are similar to those in the first embodiment and therefore will not be described. The second valve 11 is similar to that in the first working example of the fourth embodiment and therefore will not be described. Furthermore, the third flow path 6G is similar to that in the tenth embodiment and therefore will not be described.

The receiver 20 is an apparatus that receives input from outside.

Also, the controller 50, based on input received by the receiver 20, executes either of a first mode in which the first valve 7 and the second valve 11 are opened and a second mode in which the second valve 11 is closed and the first valve 7 is opened.

Here, the receiver 20 may have any kind of configuration provided that external input can be received.

A possible example of the receiver 20 is an operation apparatus such as a touch panel. In this case, input units for executing the first mode and the second mode are provided on a screen of the operation apparatus, and, by a worker touching either of the input units on the screen, external input for executing either of the first mode and the second mode is received in the operation apparatus.

Furthermore, a possible example of the receiver 20 is a wireless communication device. In this case, a worker operates an information mobile terminal (for example, a smartphone), and external input for executing either of the first mode and the second mode is thereby received by wireless communication in the communication device.

Hereinafter, an example of the operation of the hydrogen system 100 of the present embodiment will be described in detail.

Figure 17B:
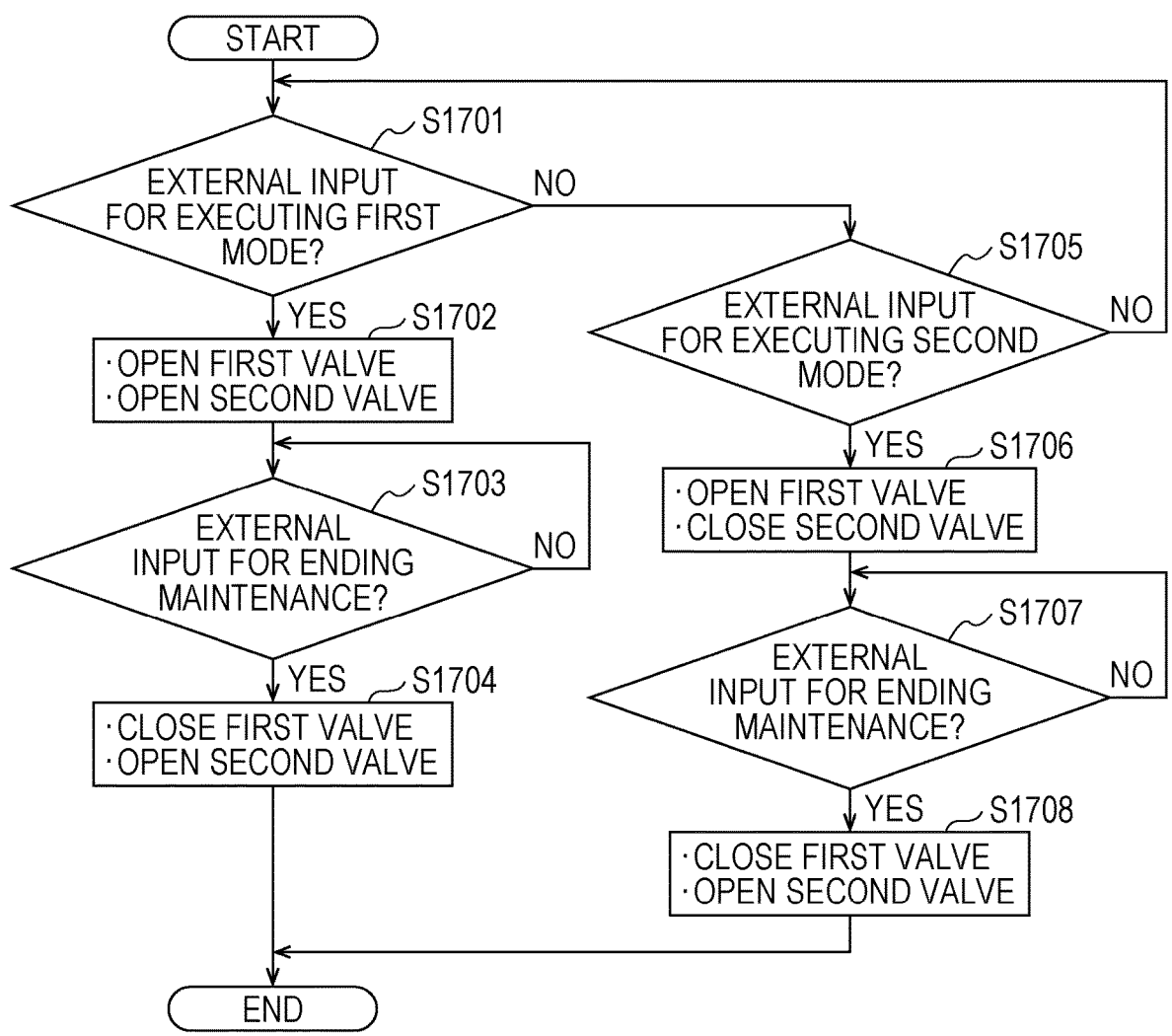
FIG. 17B is a flowchart depicting an example of the operation of the hydrogen system of the fifteenth embodiment.

FIG. 17B is a flowchart depicting an example of the operation of the hydrogen system of the fifteenth embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

The first valve 7 is closed and the second valve 11 is open during operation of the hydrogen system 100. Then, during operation of the hydrogen system 100, hydrogen produced by the hydrogen production apparatus 1 is supplied to the hydrogen storage apparatus 2 via the first flow path 3 and temporarily stored in the hydrogen storage apparatus 2.

Here, when maintenance of the hydrogen system 100 is to be carried out, as depicted in FIG. 17B, in step S1701, it is determined whether or not the receiver 20 has received external input for executing the first mode.

If the receiver 20 has received external input for executing the first mode ("yes" in step S1701), in step S1702, the open/closed state of the second valve 11 is maintained as being open together with the first valve 7 being opened. Thereupon, by executing the first mode, the inside of the hydrogen production apparatus 1 and the inside of the hydrogen storage apparatus 2 are in communication with outside the casing 5 (for example, the atmosphere). It thereby becomes possible for hydrogen inside the hydrogen production apparatus 1 and inside the hydrogen storage apparatus 2 to be discharged outside the casing 5 via the third flow path 6G.

Next, in step S1703, it is determined whether or not the receiver 20 has received external input for ending the maintenance.

If the receiver 20 does not receive external input for ending the maintenance ("no" in step S1703), the present state is maintained.

If the receiver 20 has received external input for ending the maintenance ("yes" in step S1703), in step S1704, the open/closed state of the second valve 11 is maintained as being open together with the first valve 7 being closed. Thereafter, the operation of the hydrogen system 100 may be resumed at an appropriate time.

In step S1701, if the receiver 20 does not receive external input for executing the first mode ("no" in step S1701), processing proceeds to step S1705, and, in step S1705, it is determined whether or not the receiver 20 has received external input for executing the second mode.

If the receiver 20 does not receive external input for executing the second mode ("no" in step S1705), processing returns to step S1701, and the determination operation of step S1701 is carried out at an appropriate time.

If the receiver 20 has received external input for executing the second mode ("yes" in step S1705), in step S1706, the second valve 11 is closed together with the first valve 7 being opened. Thereupon, by executing the second mode, inside the hydrogen production apparatus 1 is in communication with outside the casing 5 together with communication between inside the hydrogen storage apparatus 2 and outside the casing 5 being blocked by the second valve 11. It thereby becomes possible for hydrogen inside the hydrogen production apparatus 1 to be discharged outside the casing 5 via the third flow path 6G.

Next, in step S1707, it is determined whether or not the receiver 20 has received external input for ending the maintenance.

If the receiver 20 does not receive external input for ending the maintenance ("no" in step S1707), the present state is maintained.

If the receiver 20 has received external input for ending the maintenance ("yes" in step S1707), in step S1708, the first valve 7 is closed together with the second valve 11 being opened. Thereafter, the operation of the hydrogen system 100 may be resumed at an appropriate time.

As mentioned above, in the hydrogen system 100 of the present embodiment, the discharge of hydrogen that accompanies maintenance can be carried out in a more appropriate manner than with a conventional hydrogen system.

For example, in the hydrogen system 100 of the present embodiment, when maintenance of the hydrogen production apparatus 1 of the hydrogen system 100 is to be carried out, the controller 50 executes the second mode in which the first valve 7 is opened and the second valve 11 is closed, on the basis of input received by the receiver 20. Thereupon, communication between inside the hydrogen storage apparatus 2 and outside the casing 5 is blocked by the second valve 11, and therefore the hydrogen inside the hydrogen storage apparatus 2 is not discharged outside the casing 5 via the third flow path 6G.

Thus, in the hydrogen system 100 of the present embodiment, in a case where maintenance of the hydrogen storage apparatus 2 is not necessary when maintenance of the hydrogen production apparatus 1 of the hydrogen system 100 is to be carried out, the hydrogen inside the hydrogen storage apparatus 2 can be preserved.

Except for the aforementioned feature, the hydrogen system 100 of the present embodiment may be similar to the hydrogen system 100 of any of the first to fourth embodiments, the first and second working examples of the fourth embodiment, the modified example of the fourth embodiment, the fifth to tenth embodiments, the modified example of the tenth embodiment, the eleventh embodiment, the first and second modified examples of the eleventh embodiment, the twelfth embodiment, the thirteenth embodiment, the modified example of the thirteenth embodiment, the fourteenth embodiment, and the first and second modified examples of the fourteenth embodiment.

Sixteenth Embodiment

Figure 18A:
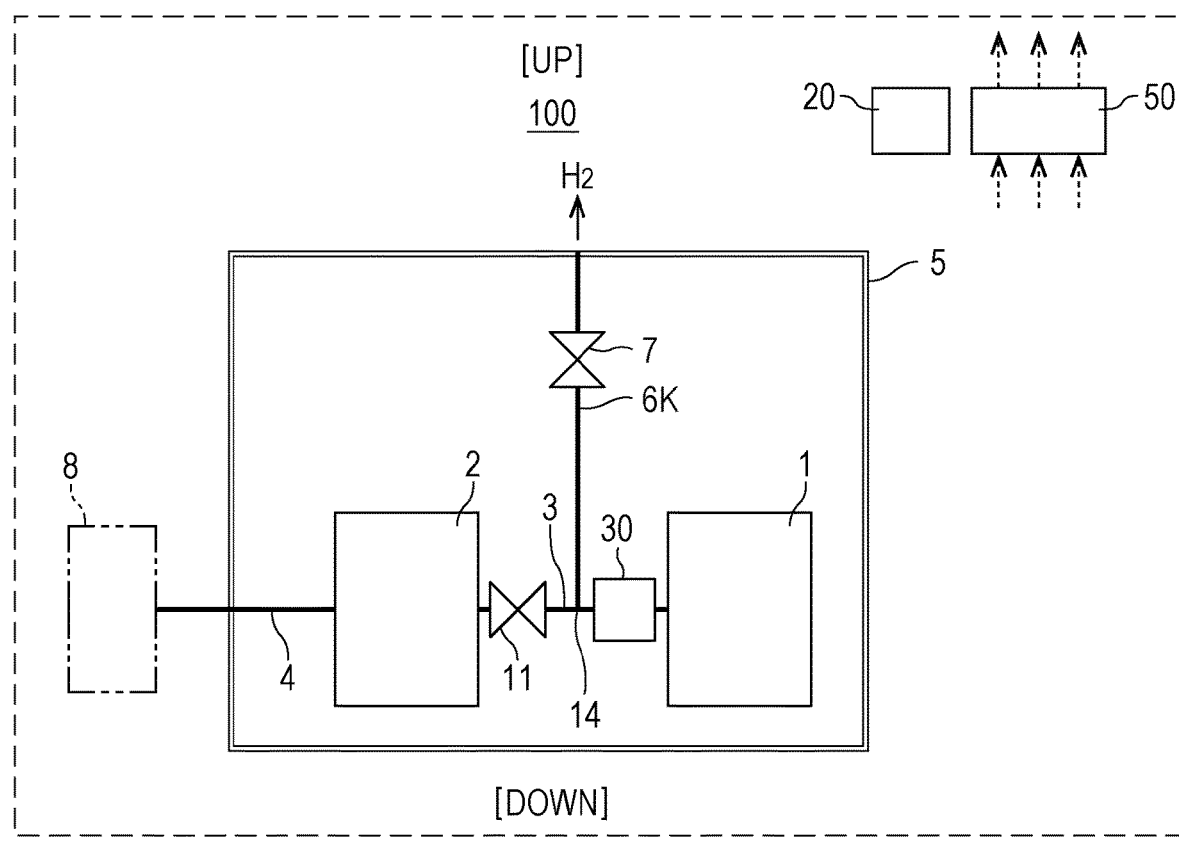
FIG. 18A is a drawing depicting an example of a hydrogen system of a sixteenth embodiment.

FIG. 18A is a drawing depicting an example of a hydrogen system of a sixteenth embodiment.

In the example depicted in FIG. 18A, the hydrogen system 100 includes the hydrogen production apparatus 1, the hydrogen storage apparatus 2, the first flow path 3, the second flow path 4, the casing 5, the third flow path 6K, the first valve 7, the second valve 11, the booster 30, the receiver 20, and the controller 50.

Here, the hydrogen production apparatus 1, the hydrogen storage apparatus 2, the first flow path 3, the second flow path 4, the casing 5, and the first valve 7 are similar to those in the first embodiment and therefore will not be described. The second valve 11 is similar to that in the first working example of the fourth embodiment and therefore will not be described. Furthermore, the third flow path 6K is similar to that in the thirteenth embodiment and therefore will not be described. The booster 30 is similar to that in the eighth embodiment and therefore will not be described. The receiver 20 is similar to that in the fifteenth embodiment and therefore will not be described.

The controller 50 activates the booster 30 in the first mode in which the first valve 7 and the second valve 11 are opened and the second mode in which the second valve 11 is closed and the first valve 7 is opened.

Hereinafter, an example of the operation of the hydrogen system 100 of the present embodiment will be described in detail.

Figure 18B:
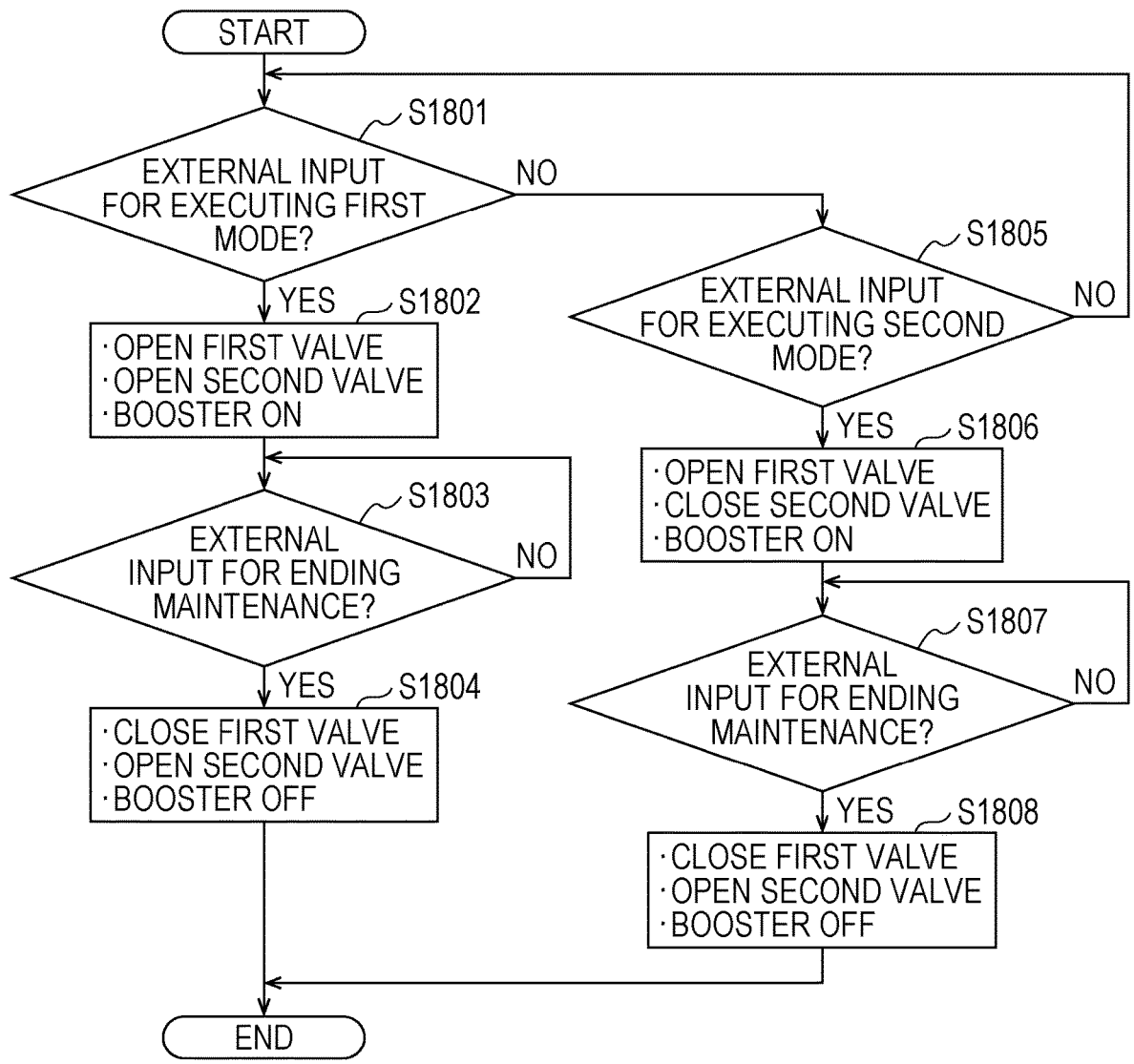
FIG. 18B is a flowchart depicting an example of the operation of the hydrogen system of the sixteenth embodiment.

FIG. 18B is a flowchart depicting an example of the operation of the hydrogen system of the sixteenth embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

Here, steps S1801, S1803, S1805, and S1807 of FIG. 18B are similar to steps S1701, S1703, S1705, and S1707 of FIG. 17B and therefore will not be described in detail.

The first valve 7 is closed and the second valve 11 is open during operation of the hydrogen system 100. Also, during operation of the hydrogen system 100, hydrogen produced by the hydrogen production apparatus 1 is pressurized by the booster 30 and supplied to the hydrogen storage apparatus 2. The high-pressure hydrogen supplied to the hydrogen storage apparatus 2 via the first flow path 3 is temporarily stored in the hydrogen storage apparatus 2.

When maintenance of the hydrogen system 100 is to be carried out, if the receiver 20 has received external input for executing the first mode ("yes" in step S1801), in step S1802, the open/closed state of the second valve 11 is maintained as being open and the booster 30 is activated (on) together with the first valve 7 being opened. Thereupon, by executing the first mode, the inside of the hydrogen production apparatus 1 and the inside of the hydrogen storage apparatus 2 are in communication with outside the casing 5 (for example, the atmosphere). It thereby becomes possible for hydrogen inside the hydrogen production apparatus 1 and inside the hydrogen storage apparatus 2 to be discharged outside the casing 5 via the third flow path 6K. Furthermore, in the first mode, hydrogen inside the hydrogen production apparatus 1 can made to flow to the third flow path 6K by means of the pressurizing operation of the booster 30.

Then, if the receiver 20 has received external input for ending the maintenance ("yes" in step S1803), in step S1804, the open/closed state of the second valve 11 is maintained as being open together with the first valve 7 being closed. Furthermore, the operation of the booster 30 is stopped (off). Thereafter, the operation of the hydrogen system 100 may be resumed at an appropriate time.

Furthermore, if the receiver 20 has received external input for executing the second mode ("yes" in step S1805), in step S1806, the second valve 11 is closed together with the first valve 7 being opened. Furthermore, the booster 30 is activated (on). Thereupon, by executing the second mode, inside the hydrogen production apparatus 1 is in communication with outside the casing 5 together with communication between inside the hydrogen storage apparatus 2 and outside the casing 5 being blocked by the second valve 11. It thereby becomes possible for hydrogen inside the hydrogen production apparatus 1 to be discharged outside the casing 5 via the third flow path 6K. Furthermore, in the second mode, hydrogen inside the hydrogen production apparatus 1 can made to flow to the third flow path 6K by means of the pressurizing operation of the booster 30.

Then, if the receiver 20 has received external input for ending the maintenance ("yes" in step S1807), in step S1808, the second valve 11 is opened together with the first valve 7 being closed. Furthermore, the operation of the booster 30 is stopped (off). Thereafter, the operation of the hydrogen system 100 may be resumed at an appropriate time.

As mentioned above, in the hydrogen system 100 of the present embodiment, in the first mode and the second mode, hydrogen inside the hydrogen production apparatus 1 can be discharged outside the casing 5 via the third flow path 6K in an appropriate manner by means of the pressurizing operation of the booster 30.

Except for the aforementioned feature, the hydrogen system 100 of the present embodiment may be similar to the hydrogen system 100 of any of the first to fourth embodiments, the first and second working examples of the fourth embodiment, the modified example of the fourth embodiment, the fifth to tenth embodiments, the modified example of the tenth embodiment, the eleventh embodiment, the first and second modified examples of the eleventh embodiment, the twelfth embodiment, the thirteenth embodiment, the modified example of the thirteenth embodiment, the fourteenth embodiment, the first and second modified examples of the fourteenth embodiment, and the fifteenth embodiment.

Seventeenth Embodiment

Figure 19A:
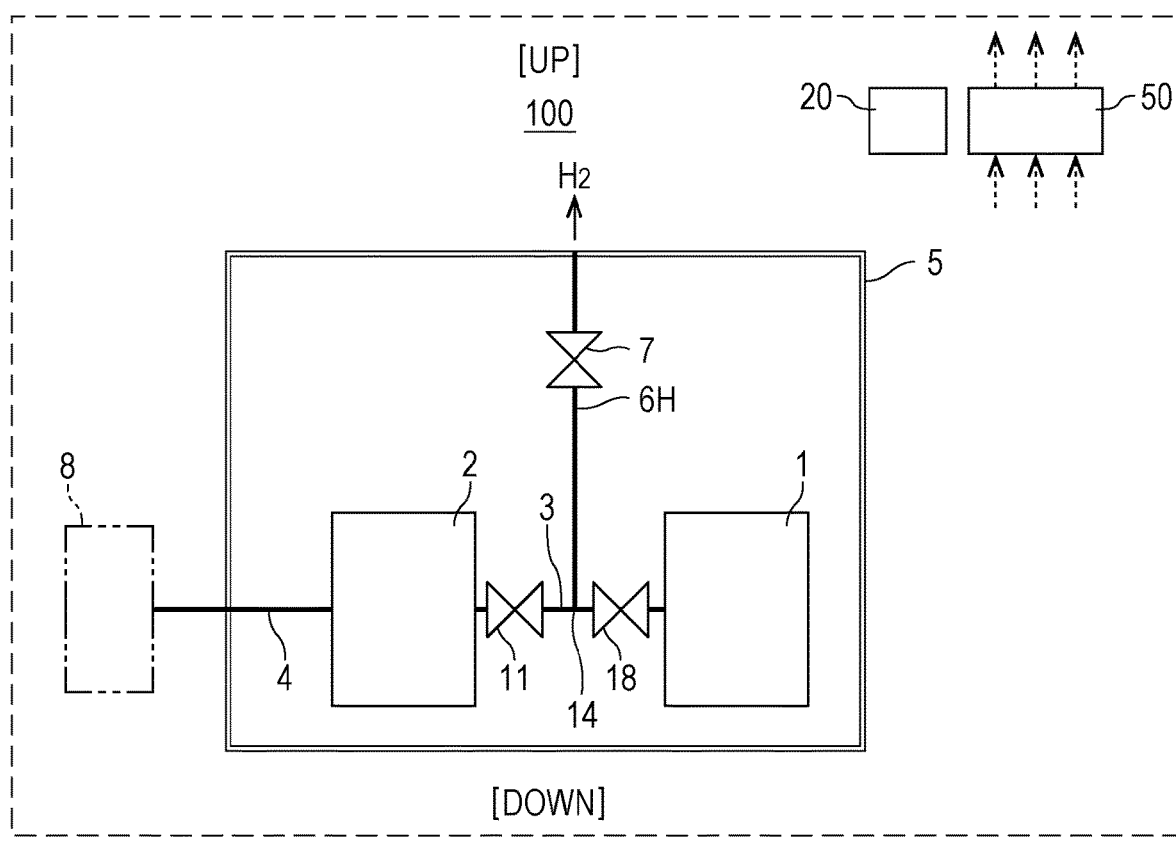
FIG. 19A is a drawing depicting an example of a hydrogen system of a seventeenth embodiment.

FIG. 19A is a drawing depicting an example of a hydrogen system of a seventeenth embodiment.

In the example depicted in FIG. 19A, the hydrogen system 100 includes the hydrogen production apparatus 1, the hydrogen storage apparatus 2, the first flow path 3, the second flow path 4, the casing 5, the third flow path 6H, the first valve 7, the second valve 11, the third valve 18, the receiver 20, and the controller 50.

Here, the hydrogen production apparatus 1, the hydrogen storage apparatus 2, the first flow path 3, the second flow path 4, the casing 5, and the first valve 7 are similar to those in the first embodiment and therefore will not be described. The second valve 11 is similar to that in the first working example of the fourth embodiment and therefore will not be described. The third valve 18 is similar to that in the ninth embodiment and therefore will not be described. The third flow path 6H is similar to that in the eleventh embodiment and therefore will not be described. The receiver 20 is similar to that in the fifteenth embodiment and therefore will not be described.

The controller 50, based on input received by the receiver 20, executes any of a first mode in which the first valve 7, the second valve 11, and the third valve 18 are opened, a second mode in which the second valve 11 is closed and the first valve 7 and the third valve 18 are opened, and a third mode in which the third valve 18 is closed and the first valve 7 and the second valve 11 are opened.

Hereinafter, an example of the operation of the hydrogen system 100 of the present embodiment will be described in detail.

Figure 19B:
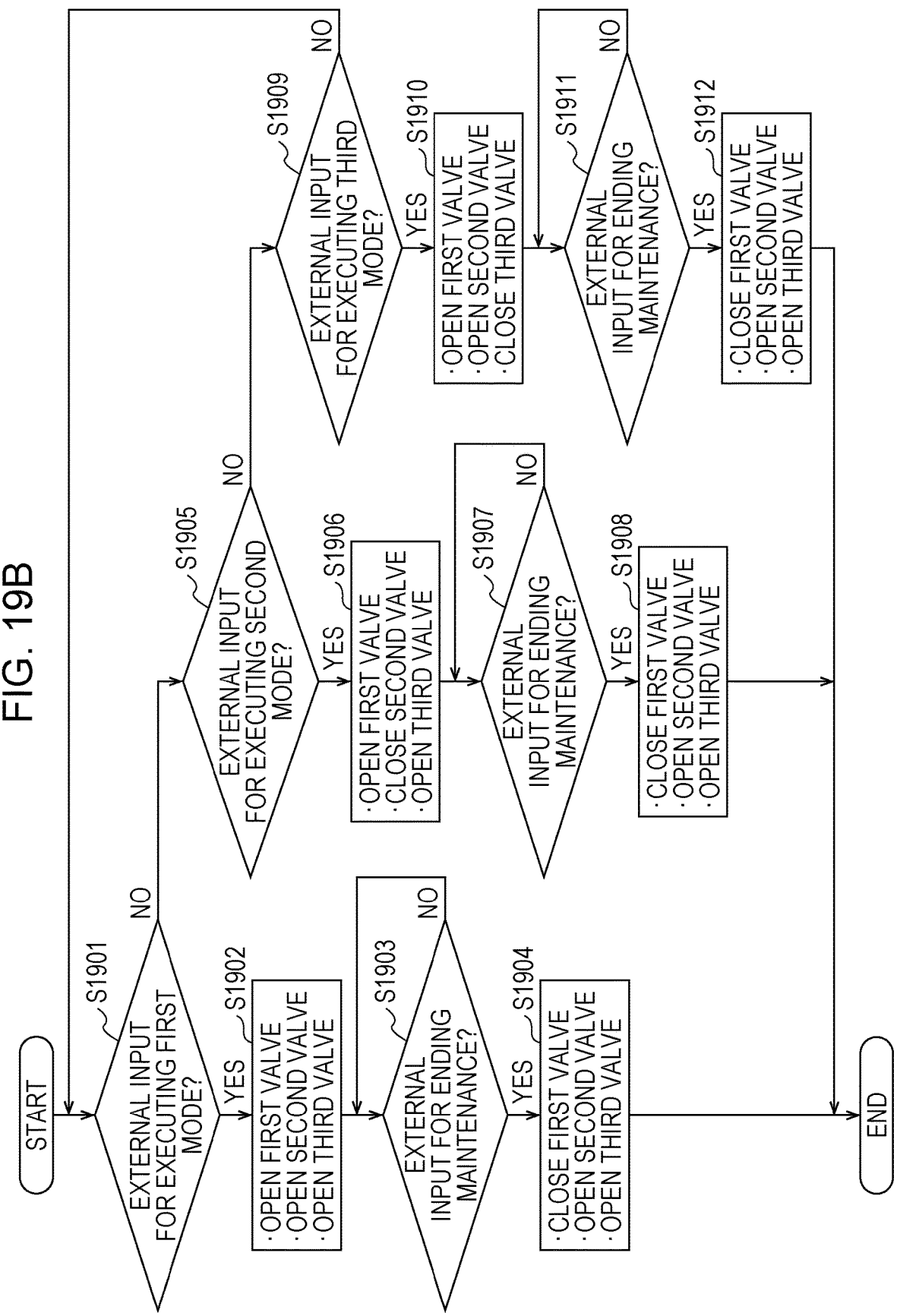
FIG. 19B is a flowchart depicting an example of the operation of the hydrogen system of the seventeenth embodiment.

FIG. 19B is a flowchart depicting an example of the operation of the hydrogen system of the seventeenth embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

Here, steps S1901, S1903, and S1907 of FIG. 19B are similar to steps S1701, S1703, and S1707 of FIG. 17B and therefore will not be described in detail.

The first valve 7 is closed and the second valve 11 and the third valve 18 are open during operation of the hydrogen system 100. Then, during operation of the hydrogen system 100, hydrogen produced by the hydrogen production apparatus 1 is supplied to the hydrogen storage apparatus 2 via the first flow path 3 and temporarily stored in the hydrogen storage apparatus 2.

When maintenance of the hydrogen system 100 is to be carried out, if the receiver 20 has received external input for executing the first mode ("yes" in step S1901), in step S1902, the open/closed states of the second valve 11 and the third valve 18 are maintained as being open together with the first valve 7 being opened. Thereupon, by executing the first mode, the inside of the hydrogen production apparatus 1 and the inside of the hydrogen storage apparatus 2 are in communication with outside the casing 5 (for example, the atmosphere). It thereby becomes possible for hydrogen inside the hydrogen production apparatus 1 and inside the hydrogen storage apparatus 2 to be discharged outside the casing 5 via the third flow path 6H.

Then, if the receiver 20 has received external input for ending the maintenance ("yes" in step S1903), in step S1904, the open/closed states of the second valve 11 and the third valve 18 are maintained as being open together with the first valve 7 being closed. Thereafter, the operation of the hydrogen system 100 may be resumed at an appropriate time.

In step S1901, if the receiver 20 does not receive external input for executing the first mode ("no" in step S1901), processing proceeds to step S1905, and, in step S1905, it is determined whether or not the receiver 20 has received external input for executing the second mode.

If the receiver 20 has received external input for executing the second mode ("yes" in step S1905), in step S1906, the open/closed state of the third valve 18 is maintained as being open and the second valve 11 is closed together with the first valve 7 being opened. Thereupon, by executing the second mode, inside the hydrogen production apparatus 1 is in communication with outside the casing 5 together with communication between inside the hydrogen storage apparatus 2 and outside the casing 5 being blocked by the second valve 11. It thereby becomes possible for hydrogen inside the hydrogen production apparatus 1 to be discharged outside the casing 5 via the third flow path 6H.

Then, if the receiver 20 has received external input for ending the maintenance ("yes" in step S1907), in step S1908, the open/closed state of the third valve 18 is maintained as being open together with the first valve 7 being closed and the second valve 11 being opened. Thereafter, the operation of the hydrogen system 100 may be resumed at an appropriate time.

In step S1905, if the receiver 20 does not receive external input for executing the second mode ("no" in step S1905), processing proceeds to step S1909, and, in step S1909, it is determined whether or not the receiver 20 has received external input for executing the third mode.

If the receiver 20 does not receive external input for executing the third mode ("no" in step S1909), processing returns to step S1901, and the determination operation of step S1901 is carried out at an appropriate time.

If the receiver 20 has received external input for executing the third mode ("yes" in step S1909), in step S1910, the open/closed state of the second valve 11 is maintained as being open and the first valve 7 is opened together with the third valve 18 being closed. Thereupon, by executing the third mode, inside the hydrogen storage apparatus 2 is in communication with outside the casing 5 together with communication between inside the hydrogen production apparatus 1 and outside the casing 5 being blocked by the third valve 18. It thereby becomes possible for hydrogen inside the hydrogen storage apparatus 2 to be discharged outside the casing 5 via the third flow path 6H.

Next, in step S1911, it is determined whether or not the receiver 20 has received external input for ending the maintenance.

If the receiver 20 does not receive external input for ending the maintenance ("no" in step S1911), the present state is maintained.

If the receiver 20 has received external input for ending the maintenance ("yes" in step S1911), in step S1912, the open/closed state of the second valve 11 is maintained as being open together with the first valve 7 being closed and the third valve 18 being opened. Thereafter, the operation of the hydrogen system 100 may be resumed at an appropriate time.

As mentioned above, in the hydrogen system 100 of the present embodiment, when a worker is to carry out maintenance of either one or both of the hydrogen production apparatus 1 and the hydrogen storage apparatus 2, it is possible for the hydrogen production apparatus 1 and/or the hydrogen storage apparatus 2 to be set to a state in which hydrogen can be discharged outside the casing 5 by executing any of the first mode, the second mode, and the third mode. Thus, the worker is able to carry out maintenance work for the hydrogen production apparatus 1 and/or the hydrogen storage apparatus 2 without hindrance.

Specifically, when maintenance of both the hydrogen production apparatus 1 and the hydrogen storage apparatus 2 is to be carried out, by executing the first mode, the inside of the hydrogen production apparatus 1 and the inside of the hydrogen storage apparatus 2 are in communication with outside the casing 5. It thereby becomes possible for hydrogen inside the hydrogen production apparatus 1 and inside the hydrogen storage apparatus 2 to be discharged outside the casing 5 via the third flow path 6H.

Furthermore, when maintenance of the hydrogen production apparatus 1 is to be carried out, by executing the second mode, inside the hydrogen production apparatus 1 is in communication with outside the casing 5 together with communication between inside the hydrogen storage apparatus 2 and outside the casing 5 being blocked by the second valve 11. It thereby becomes possible for hydrogen inside the hydrogen production apparatus 1 to be discharged outside the casing 5 via the third flow path 6H.

Furthermore, when maintenance of the hydrogen storage apparatus 2 is to be carried out, by executing the third mode, inside the hydrogen storage apparatus 2 is in communication with outside the casing 5 together with communication between inside the hydrogen production apparatus 1 and outside the casing 5 being blocked by the third valve 18. It thereby becomes possible for hydrogen inside the hydrogen storage apparatus 2 to be discharged outside the casing via the third flow path 6H.

Except for the aforementioned feature, the hydrogen system 100 of the present embodiment may be similar to the hydrogen system 100 of any of the first to fourth embodiments, the first and second working examples of the fourth embodiment, the modified example of the fourth embodiment, the fifth to tenth embodiments, the modified example of the tenth embodiment, the eleventh embodiment, the first and second modified examples of the eleventh embodiment, the twelfth embodiment, the thirteenth embodiment, the modified example of the thirteenth embodiment, the fourteenth embodiment, the first and second modified examples of the fourteenth embodiment, the fifteenth embodiment, and the sixteenth embodiment.

Eighteenth Embodiment

Figure 20A:
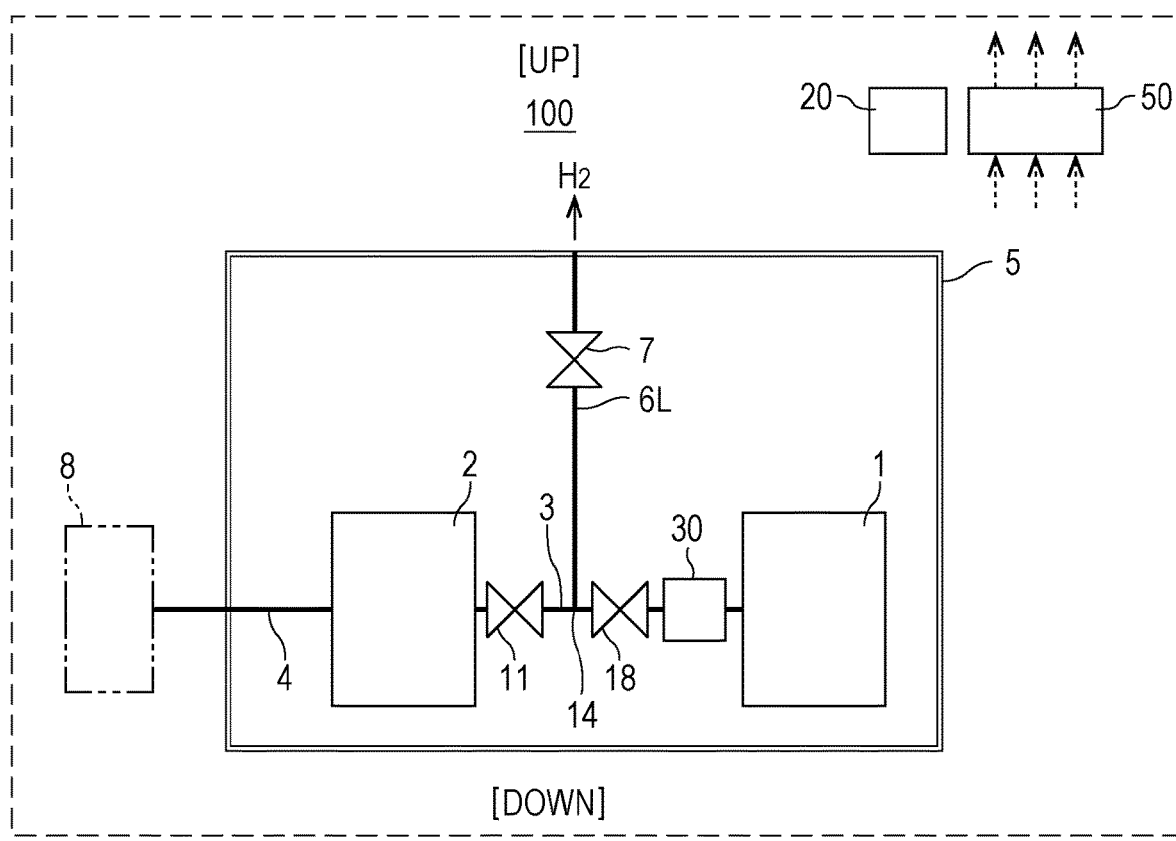
FIG. 20A is a drawing depicting an example of a hydrogen system of an eighteenth embodiment.

FIG. 20A is a drawing depicting an example of a hydrogen system of an eighteenth embodiment.

In the example depicted in FIG. 20A, the hydrogen system 100 includes the hydrogen production apparatus 1, the hydrogen storage apparatus 2, the first flow path 3, the second flow path 4, the casing 5, the third flow path 6L, the first valve 7, the second valve 11, the third valve 18, the receiver 20, the booster 30, and the controller 50.

Here, the hydrogen production apparatus 1, the hydrogen storage apparatus 2, the first flow path 3, the second flow path 4, the casing 5, and the first valve 7 are similar to those in the first embodiment and therefore will not be described. The second valve 11 is similar to that in the first working example of the fourth embodiment and therefore will not be described. The third valve 18 is similar to that in the ninth embodiment and therefore will not be described. The third flow path 6L is similar to that in the fourteenth embodiment and therefore will not be described. The booster 30 is similar to that in the eighth embodiment and therefore will not be described. The receiver 20 is similar to that in the fifteenth embodiment and therefore will not be described.

The controller 50 activates the booster 30 in the first mode in which the first valve 7, the second valve 11, and the third valve 18 are opened and in the second mode in which the second valve 11 is closed and the first valve 7 and the third valve 18 are opened, and does not activate the booster 30 in the third mode in which the third valve 18 is closed and the first valve 7 and the second valve 11 are opened.

Hereinafter, an example of the operation of the hydrogen system 100 of the present embodiment will be described in detail.

Figure 20B:
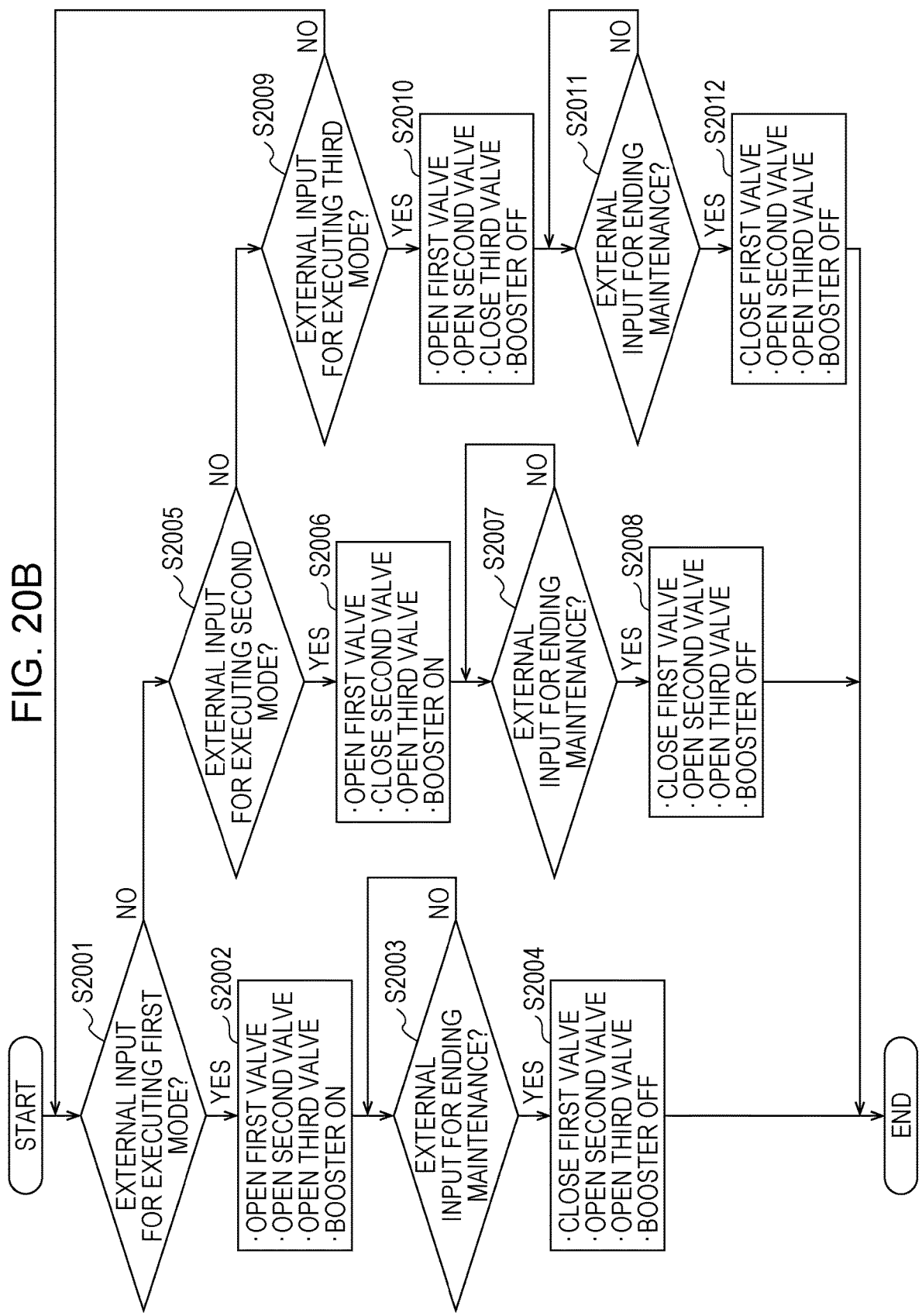
FIG. 20B is a flowchart depicting an example of the operation of the hydrogen system of the eighteenth embodiment.

FIG. 20B is a flowchart depicting an example of the operation of the hydrogen system of the eighteenth embodiment.

The operation described hereinafter may be carried out by the arithmetic circuit of the controller 50 reading the control program from the storage circuit of the controller 50. However, it is not necessarily essential for the operation described hereinafter to be carried out by the controller 50. An operator may carry out part of the operation.

Here, steps S2001, S2003, S2005, S2007, S2009, and S2011 of FIG. 20B are similar to steps S1901, S1903, S1905, S1907, S1909, and S1911 of FIG. 19B and therefore will not be described in detail.

The first valve 7 is closed and the second valve 11 and the third valve 18 are open during operation of the hydrogen system 100. Also, during operation of the hydrogen system 100, hydrogen produced by the hydrogen production apparatus 1 is pressurized by the booster 30 and supplied to the hydrogen storage apparatus 2. The high-pressure hydrogen supplied to the hydrogen storage apparatus 2 via the first flow path 3 is temporarily stored in the hydrogen storage apparatus 2.

When maintenance of the hydrogen system 100 is to be carried out, if the receiver 20 has received external input for executing the first mode ("yes" in step S2001), in step S2002, the open/closed states of the second valve 11 and the third valve 18 are maintained as being open and the booster 30 is activated (on) together with the first valve 7 being opened. Thereupon, by executing the first mode, the inside of the hydrogen production apparatus 1 and the inside of the hydrogen storage apparatus 2 are in communication with outside the casing 5 (for example, the atmosphere). It thereby becomes possible for hydrogen inside the hydrogen production apparatus 1 and inside the hydrogen storage apparatus 2 to be discharged outside the casing 5 via the third flow path 6L. Furthermore, in the first mode, hydrogen inside the hydrogen production apparatus 1 can made to flow to the third flow path 6L by means of the pressurizing operation of the booster 30.

Then, if the receiver 20 has received external input for ending the maintenance ("yes" in step S2003), in step S2004, the open/closed states of the second valve 11 and the third valve 18 are maintained as being open together with the first valve 7 being closed. Furthermore, the operation of the booster 30 is stopped (off). Thereafter, the operation of the hydrogen system 100 may be resumed at an appropriate time.

Furthermore, if the receiver 20 has received external input for executing the second mode ("yes" in step S2005), in step S2006, the open/closed state of the third valve 18 is maintained as being open and the first valve 7 is opened together with the second valve 11 being closed. Furthermore, the booster 30 is activated (on). Thereupon, by executing the second mode, inside the hydrogen production apparatus 1 is in communication with outside the casing 5 together with communication between inside the hydrogen storage apparatus 2 and outside the casing 5 being blocked by the second valve 11. It thereby becomes possible for hydrogen inside the hydrogen production apparatus 1 to be discharged outside the casing 5 via the third flow path 6L. Furthermore, in the second mode, hydrogen inside the hydrogen production apparatus 1 can made to flow to the third flow path 6L by means of the pressurizing operation of the booster 30.

Then, if the receiver 20 has received external input for ending the maintenance ("yes" in step S2007), in step S2008, the open/closed state of the third valve 18 is maintained as being open together with the first valve 7 being closed and the second valve 11 being opened. Furthermore, the operation of the booster 30 is stopped (off). Thereafter, the operation of the hydrogen system 100 may be resumed at an appropriate time.

Furthermore, if the receiver 20 has received external input for executing the third mode ("yes" in step S2009), in step S2010, the open/closed state of the second valve 11 is maintained as being open and the first valve 7 is opened together with the third valve 18 being closed. Furthermore, the booster 30 is not activated (off) when the first valve 7 and the second valve 11 are opened and the third valve 18 is closed. That is, the operation of the booster 30 is stopped. Thereupon, by executing the third mode, inside the hydrogen storage apparatus 2 is in communication with outside the casing 5 together with communication between inside the hydrogen production apparatus 1 and outside the casing 5 being blocked by the third valve 18. It thereby becomes possible for hydrogen inside the hydrogen storage apparatus 2 to be discharged outside the casing 5 via the third flow path 6H.

Then, if the receiver 20 has received external input for ending the maintenance ("yes" in step S2011), in step S2012, the open/closed state of the second valve 11 is maintained as being open together with the first valve 7 being closed and the third valve 18 being opened. Furthermore, the operating state of the booster 30 is maintained as being off. Thereafter, the operation of the hydrogen system 100 may be resumed at an appropriate time.

As mentioned above, in the hydrogen system 100 of the present embodiment, in the first mode and the second mode, hydrogen inside the hydrogen production apparatus 1 can be discharged outside the casing 5 via the third flow path 6L by means of the pressurizing operation of the booster 30.

Furthermore, it is often the case that hydrogen is stored in a high pressure state in the hydrogen storage apparatus 2. In this case, in the third mode, when the first valve 7 and the second valve 11 are opened while the third valve 18 is closed, the hydrogen inside the hydrogen storage apparatus 2 can be discharged outside the casing 5 via the third flow path 6L by means of the gas pressure in the hydrogen storage apparatus 2. Thus, in the hydrogen system 100 of the present embodiment, in the third mode, the power required for the operation of the booster 30 can be reduced by not activating the booster 30. Furthermore, in the third mode, when the third valve 18 is closed, the possibility of the booster 30 provided between the hydrogen production apparatus 1 and the third valve 18 being damaged can be reduced by not activating the booster 30.

Except for the aforementioned feature, the hydrogen system 100 of the present embodiment may be similar to the hydrogen system 100 of any of the first to fourth embodiments, the first and second working examples of the fourth embodiment, the modified example of the fourth embodiment, the fifth to tenth embodiments, the modified example of the tenth embodiment, the eleventh embodiment, the first and second modified examples of the eleventh embodiment, the twelfth embodiment, the thirteenth embodiment, the modified example of the thirteenth embodiment, the fourteenth embodiment, the first and second modified examples of the fourteenth embodiment, and the fifteenth to seventeenth embodiments.

It should be noted that the first to fourth embodiments, the first and second working examples of the fourth embodiment, the modified example of the fourth embodiment, the fifth to tenth embodiments, the modified example of the tenth embodiment, the eleventh embodiment, the first and second modified examples of the eleventh embodiment, the twelfth embodiment, the thirteenth embodiment, the modified example of the thirteenth embodiment, the fourteenth embodiment, the first and second modified examples of the fourteenth embodiment, and the fifteenth to eighteenth embodiments may be carried combined with each other provided they do not exclude each another.

It should be noted that many improvements and other embodiments of the present disclosure will be clear to a person skilled in the art from the aforementioned description. Consequently, the above description is to be interpreted merely as an exemplification, and has been provided for the purpose of instructing the best mode for carrying out the present disclosure to persons skilled in the art. The details of the structure and/or function of the present disclosure can be substantially altered without deviating from the spirit of the present disclosure.

An aspect of the present disclosure can be used for a hydrogen system in which hydrogen can be discharged from inside an apparatus to outside a casing in an appropriate manner compared to a conventional hydrogen system.

What is claimed is:
1. A hydrogen system comprising:
a hydrogen production apparatus that produces hydrogen;
a hydrogen storage apparatus that stores hydrogen produced by the hydrogen production apparatus;
a first flow path, wherein hydrogen that is discharged from the hydrogen production apparatus flows into the hydrogen storage apparatus through the first flow path;

a second flow path, wherein hydrogen that is discharged from the hydrogen storage apparatus flows into a hydrogen-using apparatus through the second flow path;
a casing that houses the hydrogen production apparatus, the hydrogen storage apparatus, the first flow path and at least part of the second flow path;
a third flow path, wherein hydrogen that is discharged from at least one of the hydrogen production apparatus, the hydrogen storage apparatus, the first flow path and the at least part of the second flow path flows directly outside the casing through the third flow path;
a first valve that is provided in the third flow path;
a detector that detects a hydrogen leak inside the casing; and
a controller, wherein:
the controller includes a processor and a memory storing a program, and
the program, when executed by the processor, causes the controller to control the first valve, and if a hydrogen leak is detected by the detector, to open the first valve.

2. The hydrogen system according to claim 1, further comprising a ventilator that ventilates inside the casing,
wherein the executed program causes the controller, if a hydrogen leak is detected by the detector, to stop an operation of the hydrogen production apparatus and to activate the ventilator, and thereafter, to open the first valve.

3. The hydrogen system according to claim 1,
wherein the third flow path branches from the first flow path.

4. The hydrogen system according to claim 3, further comprising a second valve that is provided in the first flow path downstream from a branching location to the third flow path.

5. The hydrogen system according to claim 4,
wherein the executed program causes the controller, if a hydrogen leak is detected by the detector, to stop operation of the hydrogen production apparatus and to open the first valve, and thereafter, to open the second valve.

6. The hydrogen system according to claim 5,
wherein the executed program causes the controller to open the first valve and the second valve.

7. The hydrogen system according to claim 6,
wherein the executed program causes the controller, if a hydrogen leak is detected by the detector, to open the first valve and the second valve.

8. The hydrogen system according to claim 4,
wherein the executed program causes the controller to close the second valve together with opening the first valve.

9. The hydrogen system according to claim 8,
wherein the executed program causes the controller, if a hydrogen leak is detected by the detector, to close the second valve together with opening the first valve.

10. The hydrogen system according to claim 4, further comprising a receiver that receives a signal from outside,
wherein the executed program causes the controller, based on input received by the receiver, to execute either of a first mode in which the first valve and the second valve are opened, or a second mode in which the second valve is closed and the first valve is opened.

11. The hydrogen system according to claim 4, further comprising:
a receiver that receives a signal from outside; and
a third valve that is provided in the first flow path upstream from the branching location to the third flow path,
the executed program causes the controller, based on input received by the receiver, executes any of a first mode in which the first valve and the second valve are opened, a second mode in which the second valve is closed and the first valve is opened, or a third mode in which the third valve is closed and the first valve and the second valve are opened, and
in the first mode, the third valve is also opened in addition to the first valve and, in the second mode, the third valve is also opened in addition to the first valve.

12. The hydrogen system according to claim 3,
wherein a first coupling and a second coupling are provided in the first flow path, and the third flow path branches from the first flow path between the first coupling and the second coupling.

13. The hydrogen system according to claim 1,
wherein the third flow path is connected to an upper section of the casing.

14. The hydrogen system according to claim 13,
wherein the third flow path is connected to an upper surface of the casing.

15. The hydrogen system according to claim 1,
wherein the detector is provided on an upper surface of the casing.

16. The hydrogen system according to claim 1, further comprising a third valve that is provided in the first flow path upstream from a branching location to the third flow path.

17. The hydrogen system according to claim 16, further comprising a second valve that is provided in the first flow path downstream from a branching location to the third flow path,
wherein the executed program causes the controller to open the first valve, the second valve, and the third valve.

18. The hydrogen system according to claim 17,
wherein the executed program causes the controller, if a hydrogen leak is detected by the detector, to open the first valve, the second valve, and the third valve.

19. The hydrogen system according to claim 16, further comprising a second valve that is provided in the first flow path downstream from a branching location to the third flow path,
wherein the executed program causes the controller to close the third valve together with opening the first valve and the second valve.

20. The hydrogen system according to claim 19,
wherein the executed program causes the controller, if a hydrogen leak is detected by the detector, to close the third valve together with opening the second valve.

21. The hydrogen system according to claim 16, further comprising a second valve that is provided in the first flow path downstream from a branching location to the third flow path,
wherein the executed program causes the controller to close the second valve, together with opening the first valve and the third valve.

22. The hydrogen system according to claim 21,
wherein the executed program causes the controller, if a hydrogen leak is detected by the detector, to close the second valve together with opening the first valve and the third valve.

23. The hydrogen system according to claim 1, wherein the first valve is located inside the housing.

24. A hydrogen system comprising:
a hydrogen production apparatus that produces hydrogen;
a hydrogen storage apparatus that stores hydrogen produced by the hydrogen production apparatus;
a first flow path, wherein hydrogen that is discharged from the hydrogen production apparatus flows into the hydrogen storage apparatus through the first flow path;
a second flow path, wherein hydrogen that is discharged from the hydrogen storage apparatus flows into a hydrogen-using apparatus through the second flow path;
a casing that houses the hydrogen production apparatus, the hydrogen storage apparatus, the first flow path and at least part of the second flow path;
a third flow path, wherein hydrogen that is discharged from at least one of the hydrogen production apparatus, the hydrogen storage apparatus, the first flow path and the at least part of the second flow path flows directly outside the casing through the third flow path;
a first valve that is provided in the third flow path;
a booster with which hydrogen produced by the hydrogen production apparatus is pressurized and supplied to the hydrogen storage apparatus; and
a controller, wherein:
the controller includes a processor and a memory storing a program, and the program, when executed by the processor, causes the controller to control the first valve, and
the third flow path branches from the first flow path downstream from the booster.

25. The hydrogen system according to claim 24,
wherein the executed program causes the controller to activate the booster when the first valve is open.

26. The hydrogen system according to claim 24, further comprising a second valve that is provided in the first flow path downstream from a branching location to the third flow path,
wherein the executed program causes the controller to activate the booster when the first valve and the second valve are open.

27. The hydrogen system according to claim 24, further comprising a second valve that is provided in the first flow path downstream from a branching location to the third flow path,
wherein the executed program causes the controller to activate the booster when the first valve is open and the second valve is closed.

28. The hydrogen system according to claim 24, further comprising:
a second valve that is provided in the first flow path downstream from a branching location to the third flow path; and
a third valve that is provided in the first flow path upstream from the branching location to the third flow path,
wherein the executed program causes the controller to activate the booster when the first valve, the second valve, and the third valve are open.

29. The hydrogen system according to claim 24, further comprising:
a third valve that is provided in the first flow path upstream from a branching location to the third flow path; and
a second valve that is provided in the first flow path downstream from the branching location to the third flow path,
wherein the executed program causes the controller not to activate the booster when the third valve is closed together with the first valve and the second valve being open.

30. The hydrogen system according to claim 24, further comprising:
a second valve that is provided in the first flow path downstream from a branching location to the third flow path; and
a third valve that is provided in the first flow path upstream from the branching location to the third flow path,
wherein the executed program causes the controller to activate the booster when the second valve is closed together with the first valve and the third valve being open.

31. The hydrogen system according to claim 24, further comprising:
a second valve that is provided in the first flow path downstream from a branching location to the third flow path;
a receiver that receives a signal from outside; and
a booster with which hydrogen produced by the hydrogen production apparatus is pressurized and supplied to the hydrogen storage apparatus, wherein:
the third flow path branches from the first flow path downstream from the booster, and
the executed program causes the controller, based on input received by the receiver, to execute either of a first mode in which the first valve and the second valve are opened, or a second mode in which the second valve is closed and the first valve is opened, and to activate the booster in the first mode and the second mode.

32. The hydrogen system according to claim 24, further comprising:
a second valve that is provided in the first flow path downstream from a branching location to the third flow path;
a receiver that receives a signal from outside;
a third valve that is provided in the first flow path upstream from the branching location to the third flow path; and
a booster with which hydrogen produced by the hydrogen production apparatus is pressurized and supplied to the hydrogen storage apparatus, wherein:
the executed program causes the controller, based on input received by the receiver, executes any of a first mode in which the first valve and the second valve are opened, a second mode in which the second valve is closed and the first valve is opened, or a third mode in which the third valve is closed and the first valve and the second valve are opened,
in the first mode, the third valve is also opened in addition to the first valve and, in the second mode, the third valve is also opened in addition to the first valve,
the third flow path branches from the first flow path downstream from the booster,
the third valve is provided in the first flow path between the booster and the branching location to the third flow path, and the executed program causes the controller to activate the booster in the first mode and the second mode, and not to activate the booster in the third mode.

\* \* \* \* \*